United States Patent
Yeh et al.

(10) Patent No.: US 12,389,273 B2
(45) Date of Patent: Aug. 12, 2025

(54) MULTI-RADIO ACCESS TECHNOLOGY TRAFFIC MANAGEMENT

(71) Applicant: Intel Corporation, Santa Clara, CA (US)

(72) Inventors: Shu-ping Yeh, Campbell, CA (US); Jingwen Bai, San Jose, CA (US); Jing Zhu, Portland, OR (US); Menglei Zhang, Portland, OR (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 17/797,661

(22) PCT Filed: Dec. 23, 2020

(86) PCT No.: PCT/US2020/066969
§ 371 (c)(1),
(2) Date: Aug. 4, 2022

(87) PCT Pub. No.: WO2021/201933
PCT Pub. Date: Oct. 7, 2021

(65) Prior Publication Data
US 2023/0072769 A1 Mar. 9, 2023

Related U.S. Application Data

(60) Provisional application No. 63/003,834, filed on Apr. 1, 2020.

(51) Int. Cl.
*H04W 28/08* (2023.01)
*H04W 28/02* (2009.01)
*H04W 28/084* (2023.01)

(52) U.S. Cl.
CPC ..... *H04W 28/0858* (2020.05); *H04W 28/0247* (2013.01); *H04W 28/084* (2023.05); *H04W 28/0958* (2020.05)

(58) Field of Classification Search
CPC ......... H04W 28/0858; H04W 28/0958; H04W 28/084; H04W 28/0247
See application file for complete search history.

(56) References Cited

U.S. PATENT DOCUMENTS 6,957,212 B2  10/2005  Peng
8,949,501 B1  2/2015  Akhter et al.
(Continued)

FOREIGN PATENT DOCUMENTS

EP           3414932 A1    12/2018
WO   WO 2015-152787 A1   10/2015
(Continued)

OTHER PUBLICATIONS

Nikc McKeown et al., "Tiny Tera: A Packet Switch Core", IEEE Micro, IEEE Service Center, Los Alamitos, CA, US deel 17, nr.1, (Jan. 1, 1997), 8 pages.
(Continued)

*Primary Examiner* — Michael Thier
*Assistant Examiner* — Tracy Lauren Colbert
(74) *Attorney, Agent, or Firm* — Schwabe, Williamson & Wyatt, P.C.

(57) ABSTRACT

Disclosed embodiments generally relate to edge-based multi-Radio Access Technology (RAT) traffic management (TM) solutions to support delay-sensitive traffic over heterogeneous networks. Embodiments include delay-aware TM implementations that split and/or steer network traffic across different RATs for the edge network control plane. Embodiments also include utilization threshold-based implementations to achieve delay-aware multi-path TM at (Continued)

the network's edge. The multi-path TM includes multi-RAT, multi-access, or multi-connectivity traffic routes. Embodiments include strategies to sort users (or devices) for making multi-RAT traffic distribution decisions and to determinate the utilization thresholds. Embodiments also include message exchange mechanisms or learning utilization thresholds and other useful system properties. Other embodiments may be described and/or claimed.

24 Claims, 18 Drawing Sheets

(56) References Cited

U.S. PATENT DOCUMENTS

| | | | |
|---|---|---|---|
| 9,398,121 | B1 | 7/2016 | Brandwine |
| 2003/0091054 | A1 | 5/2003 | Futenma |
| 2006/0168336 | A1 | 7/2006 | Koyanagi |
| 2010/0202323 | A1 | 8/2010 | Nishida |
| 2013/0246672 | A1 | 9/2013 | Saputra |
| 2014/0269300 | A1* | 9/2014 | Bennis ............... H04W 28/082 370/235 |
| 2014/0307593 | A1 | 10/2014 | Zhao et al. |
| 2015/0029879 | A1 | 1/2015 | Chou et al. |
| 2015/0078359 | A1 | 3/2015 | Scahill et al. |
| 2015/0215835 | A1 | 7/2015 | Sirotkin |
| 2016/0112896 | A1 | 4/2016 | Karampatsis |
| 2016/0192258 | A1* | 6/2016 | Ciullo ............... H04L 43/0852 370/331 |
| 2016/0270145 | A1 | 9/2016 | Srinivasa Gopalan et al. |
| 2016/0381491 | A1 | 12/2016 | Watfa et al. |
| 2017/0019830 | A1* | 1/2017 | Lindoff ............... H04W 40/22 |
| 2017/0093541 | A1 | 3/2017 | Pan et al. |
| 2018/0027508 | A1 | 1/2018 | Tanaka |
| 2018/0077022 | A1 | 3/2018 | Van Oost et al. |
| 2018/0092085 | A1* | 3/2018 | Shaheen ............ H04W 36/0094 |
| 2018/0018385 | A1 | 6/2018 | Sabella et al. |
| 2018/0270742 | A1 | 9/2018 | Bergstrom et al. |
| 2019/0036841 | A1 | 1/2019 | Nolan |
| 2019/0306749 | A1 | 10/2019 | Bergstrom et al. |
| 2019/0306752 | A1 | 10/2019 | Lai |
| 2019/0394833 | A1 | 12/2019 | Talebi Fard et al. |
| 2020/0045612 | A1 | 2/2020 | Stauffer et al. |
| 2020/0053018 | A1 | 2/2020 | White et al. |
| 2020/0178196 | A1 | 6/2020 | Wang et al. |
| 2021/0051104 | A1 | 2/2021 | He |
| 2021/0058936 | A1 | 2/2021 | Gordaychik |
| 2021/0100047 | A1 | 4/2021 | Chiba et al. |
| 2021/0144590 | A1 | 5/2021 | Li |
| 2021/0211914 | A1 | 7/2021 | De La Oliva et al. |
| 2021/0306900 | A1 | 9/2021 | Mehta |
| 2021/0385865 | A1 | 12/2021 | Mueck |
| 2021/0400537 | A1 | 12/2021 | Zhang et al. |
| 2021/0409335 | A1 | 12/2021 | Zhu et al. |
| 2022/0014475 | A1* | 1/2022 | Sun .................. H04W 28/0236 |
| 2022/0191733 | A1 | 6/2022 | Ali et al. |
| 2023/0056442 | A1* | 2/2023 | Ly .................... H04W 24/08 |
| 2023/0189368 | A1 | 6/2023 | Zhou |
| 2023/0276483 | A1 | 8/2023 | Xu et al. |

FOREIGN PATENT DOCUMENTS

| | | |
|---|---|---|
| WO | WO2017/139699 A1 | 8/2017 |
| WO | WO 2017-189176 A2 | 11/2017 |
| WO | WO 2019-076440 A1 | 4/2019 |
| WO | WO 2019-192528 A1 | 10/2019 |
| WO | WO2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

S. Kanugovi et al., "Multi-Access Management Services (MAMS)", rtc8743.txt, Multi-Access Management Services (Mams); RFC8743. TXT, Internet Engineering Task Force, IETF; Standard, Internei Society (ISOC) 4, Rue Des Falaises CH-1205 Geneva, Switzerland, (Mar. 25, 2020), 73 pages.

J. Zhu et al., "Generic Multi-Access (GMA) Encapsulation Protocol", IETF, draft-zhu-intarea-gma-07, 13 pages (May 14, 2020).

Kanugovi et al., "Multi-Access Management Services (MAMS)", IETF RFC 8743, 143 pages (Mar. 2020).

International Search Report and Written Opinion mailed Oct. 6, 2021 for International Patent Application No. PCT/US2021/038063, 14 pages.

"3GPP; TSG SA; Study on enhanced support of Industrial Internet of Things (IIoT) in 5G System (Release 17)", 3GPP TR 23.700-20 V0.3.0 (Jan. 28, 2020).

Hsieh et al., "5G Virtualized Multi-access Edge Computing Platform for IoT Applications", Journal of Network and Computer Applications, vol. 115, pp. 94-102 (available online: May 10, 2018), http://www.abderrahimbenslimane.org/public/pdf/180.pdf.

Kanugovi et al., "Control Plane Protocols and Procedures for Multiple Access Management Services", IETF, draft-zhu-intarea-mams-control-protocol-02 (Jul. 3, 2017), 31 pages.

Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).

"TCP Keep-Alives" in Braden, "Requirements for Internet Hosts—Communication Layers", IETF RFC 1122, section 4.2.3.6, pp. 101-102 (Oct. 1, 1989), 2 pages.

Nádas et al., "Per Packet Value: A Practical Concept for Network Resource Sharing", 2016 IEEE Global Communications Conference (GLOBECOM), pp. 1-7 (Dec. 4, 2016).

Laki et al., "Take your own share of the PIE", Proceedings of the Applied Networking Research Workshop, pp. 27-32 (Jul. 15, 2017).

Nádas et al., "Towards a congestion control-independent core-stateless AQM", Proceedings of the Applied Networking Research Workshop, pp. 84-90 (Jul. 16, 2018).

Laki et al., "Scalable Per Subscriber QoS with Core-Stateless Scheduling", ACM SIGCOMM Industrial Demos, 2 pages (2018).

Nádas et al., "Stateless resource sharing in networks with multi-layer virtualization", 2019 IEEE International Conference on Communications (ICC), pp. 1-7, (May 20, 2019).

Nádas et al., "Towards core-stateless fairness on multiple timescales", Proceedings of the Applied Networking Research Workshop, pp. 30-36 (Jul. 22, 2019).

Fejes et al., "Decoupling delay and resource sharing targets with efficient core-stateless AQM", Proceedings of the ACM SIGCOMM 2019 Conference Posters and Demos, pp. 128-130 (Aug. 19, 2019).

Fejes et al., "Who will Save the Internet from the Congestion Control Revolution?", Workshop on Buffer Sizing, Stanford University, 6 pages (2019), http://ppv.elte.hu/buffer-sizing/.

Fejes et al., "On the Incompatibility of Scalable Congestion Controls over the Internet", 2020 IFIP Networking Conference (Networking), IEEE, pp. 749-754 (Jun. 22, 2020), http://ppv.elte.hu/scalable-cc-comp/.

Nádas et al., "A congestion control independent L4S scheduler", Proceedings of the Applied Networking Research Workshop, pp. 45-51 (Jul. 27, 2020).

Laki et al., "Core-Stateless Forwarding With QoS Revisited: Decoupling Delay and Bandwidth Requirements", IEEE/ACM Transactions on Networking 29, No. 2, pp. 503-516 (Dec. 9, 2020).

Fejes et al., "A Core-Stateless LAS Scheduler for P4-enabled hardware switches with emulated HQoS", IEEE INFOCOM 2021 Demo (Virtual), 2 pages (2021), http://ppv.elte.hu/ic21/.

Bemten et al., "Network Calculus: A Comprehensive Guide", Technische Universität München, Lehrstuhl für Kommunikationsnetze, Technical Report No. 201603, 57 pages (Oct. 8, 2016).

Charny et al., "Delay Bounds in a Network with Aggregate Scheduling", 12 pages (Apr. 14, 2000) https://infoscience.epfl.ch/record/52353/files/IC_TECH_REPORT_200022.pdf.

Zhu et al., "Generic Multi-Access (GMA) Encapsulation Protocol", IETF, INTAREA/Network Working Group, draft-zhu-intarea-gma-07, 13 pages (May 14, 2020).

(56) References Cited

OTHER PUBLICATIONS

Feng et al, "The BLUE active queue management algorithms", IEEE/ACM Transactions on Networking, vol. 10, No. 4, pp. 513-528 (Aug. 2002), https://ieeexplore.ieee.org/document/1026008.

Hamdi et al., "A review on Queue Management Algorithms in Large Networks", 2nd International Scientific Conference of Engineering Sciences (ISCES 2020), IOP Conference Series: Materials Science and Engineering, vol. 1076, No. 1, p. 012034, 12 pages (Feb. 1, 2021).

Nichols et al., "Definition of the Differentiated Services Field (DS Field) in the IPV4 and IPV6 Headers", IETF RFC 2474, 20 pages (Dec. 1998).

Ramakrishnan et al., "The Addition of Explicit Congestion Notification (ECN) to IP", IETF RFC 3168, 63 pages (Sep. 2001).

Amante et al., "IPv6 Flow Label Specification", IETF RFC 6437, 15 pages (Nov. 2011).

D. Black, "Relaxing Restrictions on Explicit Congestion Notification (ECN) Experimentation", IETF RFC 8311, 20 pages (Jan. 2018).

G. Fairhurst, "Update to IANA Registration Procedures for Pool 3 Values in the Differentiated Services Field Codepoints (DSCP) Registry", IETF RFC 8436, 7 pages (Aug. 2018).

Zhu et al., "Improving QoE for Skype Video Call in Mobile Broadband Network", 2012 IEEE Global Communications Conference (GLOBECOM), pp. 1938-1943 (Dec. 3, 2012).

International Preliminary Report on Patentability mailed Oct. 13, 2022 for International Patent Application PCT/US2020/066969, 8 pages.

International Search Report and Written Opinion mailed Aug. 31, 2020 for International Patent Application No. PCT/US2020/033261, 14 pages.

International Preliminary Report on Patentability mailed Nov. 25, 2021 for International Patent Application No. PCT/US2020/033261, 10 pages.

3GPP; TSG SA "Study on access traffic steering, switch and splitting support in the 5G system architecture (Release 16)", 3GPP TR 23.793 V16.0.0, Dec. 19, 2018, 115 pages.

S. Kanugovi et al., Multiple Access Management Services, draft-kanugovi-intarea-mams-framework-03, Feb. 28, 2019, 156 pages.

S. Kanugovi et al., "Multiple Access Management Services, draft-kanugovi-intarea-mams-framework-04", May 31, 2019, 122 pages.

J. Zhu et al., "User-Plane Protocols for Multiple Access Management Service, draft-zhu-intarea-mams-user-protocol-07", Apr. 3, 2019, 14 pages.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, 368 pages.

3GPP, "3rd Generation Partnership Project; Technical Specification Group Core Network and Terminals; 5G System; Access and Mobility Management Services; Stage 3 (Release 16)", 3GPP TS 29.518 V16.0.0, Jun. 2019, 199 pages.

ETSI, "Multi-access Edge Computing (MEC); Framework and Reference Architecture Disclaimer", Jan. 2019, 21 pages, ETSI GS MEC 003 V2.1.1.

ETSI, "Multi-access Edge Computing (MEC); Phase 2: Use Cases and Requirements", Oct. 2018, 66 pages, ETSI GS MEC 002 V2.1.1.

ETSI, "Mobile Edge Computing(MEC); Bandwidth Management API", Oct. 2017, 20 pages, ETSI GS MEC 015 V1.1.1.

3GPP, "3rd Generation Partnership Project; Technical Specification Group Core Network and Terminals; 5G System; Network Exposure Function Northbound APIs; Stage 3 (Release 16)", 3GPP TS 29.522 V16.0.0, Jun. 2019, 43 pages.

ETSI, "Multi-access Edge Computing (MEC); General principles for MEC Service APIs Disclaimer", Jan. 2019, 64 pages, ETSI GS MEC 009 V2.1.1.

3GPP, "3rd Generation Partnership Project; Technical Specification Group Services and System Aspects; System Architecture for the 5G System; Stage 2 (Release 16)" 3GPP TS 23.501 V16.0.2, Apr. 2019, 317 pages.

3GPP, "3rd Generation Partnership Project; Technical Specification Group Core Network and Terminals; 5G System; Access and Mobility Management Services; Stage 3 (Release 15)", 3GPP TS 29.518 V15.3.0 , Mar. 2019, 195 pages.

ETSI, "Mobile Edge Computing (MEC); Radio Network Information API Disclaimer", Jul. 2017, 57 pages, ETSI GS MEC 012 V1.1.1.

Extended European Search Report mailed Apr. 14, 2023 for European Patent Application No. 22203400.1, 13 pages.

Boyd et al., "Convex Optimization", Cambridge University Press, Cambridge, UK, ISBN: 978-0-521-83378-3, 730 pages (Mar. 2004).

"Mobile Edge Computing (MEC); Radio Network Information API", ETSI GS MEC 012 V1.1.1, 57 pages (Jul. 2017).

"Multi-access Edge Computing (MEC); Radio Network Information API", ETSI GS MEC 012 V2.1.1, 66 pages (Dec. 2019).

"Mobile Edge Computing(MEC); Bandwidth Management API", ETSI GS MEC 015 V1.1.1, 20 pages (Oct. 2017).

Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-ietf-mptcp-multiaddressed-09.

"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.

"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.

"O-RAN Architecture Description", O-RAN Alliance, O-RAN-WG1-O-RAN Architecture Description, v01.00.00, 24 pages (Feb. 2020).

"O-RAN Working Group 2, AI/ML workflow description and requirements", O-RAN Alliance, ORAN-WG2.AIML, v01.00, 34 pages (Dec. 2019).

Singh et al., "Optimal Traffic Aggregation in Multi-RAT Heterogeneous Wireless Networks", IEEE ICC2016—Workshops: W09-Workshop on 5G RAN Design, 6 pages (Mar. 7, 2016).

Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.

Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.

International Search Report and Written Opinion mailed Apr. 15, 2021 for International Patent Application PCT/US2020/066969, 13 pages.

Office Action mailed Mar. 6, 2024 for U.S. Appl. No. 17/469,331, 96 pages.

G. Dommety, "Key and Sequence Number Extensions to GRE", Internet Engineering Task Force (IETF) RFC 2890, 7 pages (Sep. 2000).

A. Huttunen et al., "UDP Encapsulation of IPsec ESP Packets", Internet Engineering Task Force (IETF) RFC 3984, 15 pages (Jan. 2005).

A. Ford et al., "TCP Extensions for Multipath Operation with Multiple Addresses", Internet Engineering Task Force (IETF) RFC 6824, 64 pages (Jan. 2013).

N. Leymann et al., "Huawei's GRE Tunnel Bonding Protocol", Internet Engineering Task Force (IETF) RFC 81557, 44 pages (May 2017).

S. Kanugovi et al., "Multi-Access Management Services (MAMS)", Internet Engineering Task Force (IETF) RFC 8743, 143 pages (Mar. 2020).

J. Zhu et al., "Generic Multi-Access (GMA) Encapsulation Protocol", Internet Engineering Task Force (IETF) RFC 9188, 15 pages (Feb. 2022).

(56) References Cited

OTHER PUBLICATIONS

Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.
"Wi-Fi Roaming Aggressiveness Setting", Intel Corporation, Article ID 000005546, 2 pages (Oct. 28, 2021).
Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.
Q. De Coninck et al., "Multipath Extensions for QUIC (MP-QUIC)", IETF, draft-deconinck-quic-multipath-07, 36 pages (May 3, 2021), https://datatracker.ietf.org/doc/html/draft-deconinck-quic-multipath-07.
J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.
J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Jul. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Jul. 24, 2020), 10 pages.
International Preliminary Report on Patentability mailed Dec. 29, 2022 for International Patent Application PCT/US2021/038063, 10 pages.
Extended European Search Report mailed May 10, 2023 for European Patent Application No. 20806061.6, 11 pages.
S. Kanugovi Nokia e al., "Multiple Access Management Services; Draft-Kanugovi-intarea-mams-fraaework-03", (Feb. 28, 2019), 141 pages.
3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.
International Search Report and Written Opinion mailed Oct. 8, 2021 for International Patent Application No. PCT/US2021/039253, 12 pages.
"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.
"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.
International Preliminary Report on Patentability mailed Jan. 12, 2023 for International Patent Application No. PCT/US2021/039253, 7 pages.
International Search Report and Written Opinion mailed Nov. 19, 2021 for International Patent Application No. PCT/US2021/039252, 13 pages.
International Preliminary Report on Patentability mailed Jan. 12, 2023 for International Patent Application No. PCT/US2021/039252, 8 pages.
U.S. Appl. No. 63/025,086 "Dynamic Traffic Management in Next Generation Multi-Access Management Service Frameworks", filed May 14, 2020, 78 pages.
U.S. Appl. No. 17/922,947 "RAN-Aware Traffic Distribution Rules and RAN Measurements for Enhanced Access Traffic Steering Switching and Splitting", filed Nov. 2, 2022, 92 pages.
U.S. Appl. No. 17/925,430 "Wireless Local Area Network Enhancements for Access Traffic Steering Switching Splitting", filed Nov. 15, 2022, 64 pages.
"3rd Generation Partnership Project; Technical Specification Group Services and System Aspects; System architecture for the 5G System (5GS); Stage 2 (Release 15)", 3GPP Ts 23.501 V15.9.0 (Mar. 27, 2020), 248 pages.
A. Ford et al., "RFC 8684 TCP Extensions for Multipath Operation with Multiple Addresses": http://tools.ietf.org/html/draft-ietf-mptcp-multiaddressed-09, 6 pages (Mar. 2020).
"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.
"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.
"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016, 3534 pages (Dec. 14, 2016).
Wi-Fi Alliance, "Wi-Fi Agile Multiband Technical Specification", Version 1.5, 32 pages (2020).
Wi-Fi Alliance, "Optimized Connectivity Specification", Version 1.1.6, 26 pages (2020).
Extended European Search Report issued Jun. 14, 2024 for EP Application No. 21825017.3, 4 pages.
Deutsche Bahn AG, "Exemplary Mapping of 3GPP Building Blocks to FRMCS Logical Architecture Draft," ETSI Draft RT(19)075028r3, ETSI, Dec. 12, 2019, 13 pages.
Office Action mailed Jun. 21, 2024 for U.S. Appl. No. 17/437,711, 96 pages.
Notice of Allowance mailed Aug. 2, 2024 for U.S. Appl. No. 17/923,170, 71 pages.
Notice of Allowance mailed Aug. 20, 2024 for U.S. Appl. No. 17/469,331, 21 pages.

* cited by examiner

MULTI-RADIO ACCESS TECHNOLOGY TRAFFIC MANAGEMENT

CROSS-REFERENCE TO RELATED APPLICATIONS

The present application is a national phase entry under 37 U.S.C. § 371 of Int'l App. No. PCT/US2020/066969 filed Dec. 23, 2020, which designated, among the various States, the United States of America, and which claims priority to U.S. Provisional App. No. 63/003,834 filed Apr. 1, 2020, the contents of each of which are hereby incorporated by reference in their entireties and for all purposes.

TECHNICAL FIELD

Embodiments described herein generally relate to edge computing, network communication, communication system and reconfigurable radio equipment system implementations, and in particular, to Multi-Radio Access Technology (RAT) Traffic Management.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
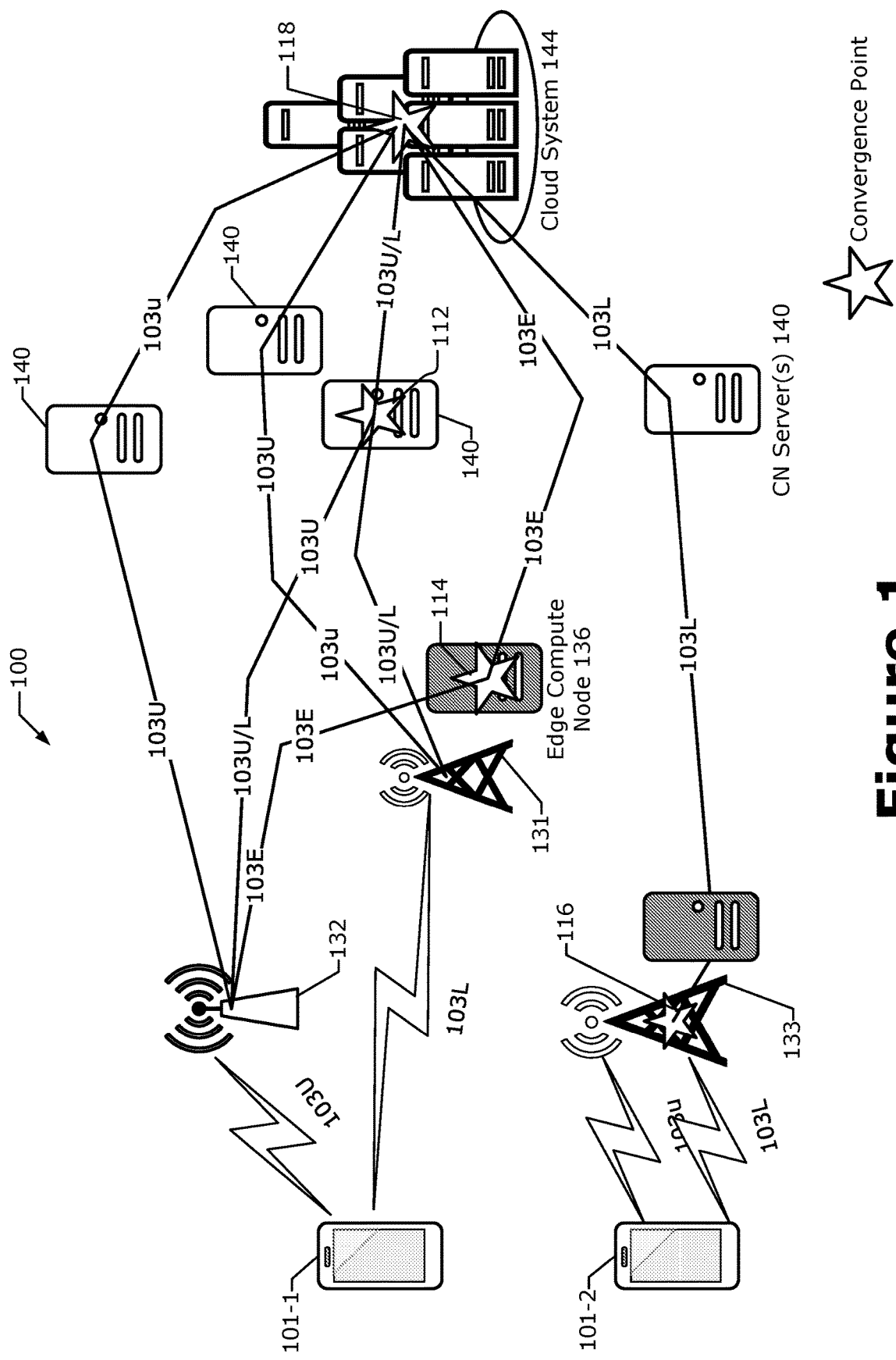
FIG. 1 illustrates an example edge computing network according to various embodiments.

The following embodiments generally relate to edge-based multi-Radio Access Technology (RAT) traffic management (TM) solutions to support delay-sensitive traffic over heterogeneous networks. Embodiments include delay-aware TM implementations that split and/or steer network traffic across different RATs for the edge network control plane. Embodiments also include utilization threshold-based implementations to achieve delay-aware multi-path TM at the network's edge. The multi-path TM includes multi-RAT, multi-access, or multi-connectivity traffic routes. Embodiments include strategies to sort users (or devices) for making multi-RAT traffic distribution decisions and to determinate the utilization thresholds. Embodiments also include message exchange mechanisms for learning utilization thresholds and other useful system properties. Other embodiments may be described and/or claimed herein.

The various embodiments discussed herein are applicable to any kind of edge computing equipment, wireless/radio equipment, and/or components thereof, including, for example, processors/CPUs with (or capable of accessing) connectivity features, mobile devices (e.g., smartphones, feature phones, tablets, wearables (e.g., smart watches or the like), IoT devices, laptops, wireless equipment in vehicles, industrial automation equipment, etc.), network or infrastructure equipment (e.g., Macro/Micro/Femto/Pico Base Stations, repeaters, relay stations, WiFi access points, RSUs, RAN nodes, backbone equipment, routing equipment, any type of Information and Communications Technology (ICT) equipment, any type of Information Technology (IT) equipment, etc.), and systems/applications that are not classically part of a communications network (e.g., medical systems/applications (e.g., remote surgery, robotics, etc.), tactile internet systems/applications, satellite systems/applications, aviation systems/applications, vehicular communications systems/applications, autonomous driving systems/applications, industrial automation systems/applications, robotics systems/applications, etc.). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

1. Edge-Based Delay-Aware Multi-RAT Traffic Management Embodiments 1.1. Introduction Drastically increasing demand for wireless data and devices has led to an increasing requirement for both peak rates and area spectral efficiency. This, in turn, has led to an increasingly denser and heterogeneous deployment of wireless infrastructure, where the deployed networks are disparate in various features, such as access technology (RAT), coverage area per access network node, deployed frequency band and bandwidth, and backhaul capabilities. As a result, most of the UEs in a dense wireless network are usually located in overlapping coverage areas of multiple access network nodes of differing RATs. UEs (e.g., UEs 911, 912 of FIG. 9) with the ability to aggregate traffic from multiple radio links or RATs (e.g. 5G, LTE, WLAN, WiMAX, Bluetooth®, etc.) can leverage multi-link aggregation to boost their throughput and QoS. The rise of heterogeneous wireless network (HetNet) deployments with mixed topologies and different RATs along with UEs with multiple radio interfaces being commonplace, have opened up opportunities to increase the network throughput and reliability by transmitting and aggregating traffic from multiple RATs.

Edge computing technologies can support applications with low latency requirements and/or high QoS requirements (e.g., AR/VR, cloud gaming, and the like) by placing the distributed computing and storage resources in proximity to data providers and consumers. One such emerging edge computing technology is Multi-access Edge Computing (MEC) (see e.g., ETSI GS MEC 003 v2.2.1 (2020-12) ("[MEC003]")). An example edge network 100 is shown by FIG. 1, which may correspond to the edge cloud 1010 of FIG. 10 and/or the edge computing system configurations depicted in FIGS. 9 to 12). The edge network 100 includes compute nodes 101 (or user equipment (UEs) 101), which are computing systems/devices within an edge computing network 100 that offload computational workloads/tasks to edge compute node 136 or otherwise obtain services from the edge computing network 100 and/or cloud system 144 (which may correspond to cloud 944 of FIG. 9). Edge network 100 also includes edge compute node 136 (or edge server 136), which is one or more computing systems or servers from which the compute nodes 101 consume services. The edge server 136 is co-located with network access node (NAN) 133 in FIG. 1 (which may be the same or similar as any of NANs 931, 932, 933 of FIG. 9). Furthermore, the compute nodes 101 may obtain services from cloud system 144 over licensed access or unlicensed access 103U via a core network (including core network (CN) server(s) 140). The licensed access is represented by a series of connections/links 103L (e.g., making up respective paths 103L) and the unlicensed access is represented by a series of connections/links 103U (e.g., making up respective paths 103U). The connections 103U/L may be used for either licensed or unlicensed access.

The edge compute node 136 is a physical computer system(s) that may include an edge platform and/or virtualization infrastructure, and provides compute, storage, and network resources to edge computing applications. The edge server 136 is disposed at an edge of a corresponding access network (e.g., networks provided by NANs 131, 132, 133), and provides computing resources and/or various services (e.g., computational task and/or workload offloading, cloud-computing capabilities, IT services, and other like resources and/or services as discussed herein) in relatively close proximity to network subscribers (e.g., compute nodes 101 also referred to as "UEs," "edge users," and/or the like). The virtualization infrastructure (VI) of the edge server 136 provides virtualized environments and virtualized resources for the edge hosts (e.g., edge server 136), and the edge computing applications may run as VMs and/or application containers on top of the VI. The edge compute node 136 may correspond to edge compute nodes 936 of FIG. 9 within edge system/network 935 of FIG. 9.

One example implementation of the edge system/network 100 is a Multi-access Edge Computing (MEC) system/framework, where the edge server 136 is implemented as a MEC host according to the MEC architectures depicted and described by FIGS. 25 to 41 of [AC6388Z] executing computing services (e.g., edge services and functions depicted and described with relation to FIGS. 9 to 12). MEC is a network architecture that allows cloud computing capabilities and computing services to be performed at the edge of a cellular network, including application computation offloading. MEC provides mechanisms that allow applications to be run and to perform related processing tasks closer to network subscribers (also referred to as "edge users," "edge compute nodes," "edge nodes," or the like). In this way, network congestion may be reduced and applications may have better performance. MEC technology is designed to be implemented at the cellular base stations, and may enable flexible and rapid deployment of new applications and services for subscribers. Combining elements of information technology and telecommunications networking, MEC also allows cellular operators to open their RANs to authorized third-parties, such as application developers and content providers. Other edge network implementations may be used in other embodiments.

When a compute node 101 has multiple radio interfaces (or multiple communication chips/circuitries), the compute node 101 can transmit and/or receive data through multiple paths. This means that there can be different multi-radio or multi-path convergence points 112, 114, 116, 118 to aggregate and/or distribute traffic between e2e communication link(s). According to various embodiments, when a compute node 101 has multiple radio interfaces, a new multi-radio convergence point 114 can take place at the edge of the network (e.g., at edge server 136 in FIG. 1) to offer multi-path traffic management for low latency communication as envisioned for 3GPP 5G/NR networks (see e.g., FIGS. 23 to 41 of [AC6388Z]). With new intelligence enabled by edge-computing, multi-RAT deployments can be utilized more efficiently by cleverly distributing traffic to multiple network paths based on edge measurements.

Algorithms and techniques to optimally leverage such multi-link aggregation may boost both the peak rates as well as the area spectral efficiency in 3GPP NR/5G wireless networks. Smart UE to AP association strategies in multi-RAT HetNets have attracted significant interest from both academia and industry. Most of the work in this area, however, does not leverage UE multi-link aggregation capabilities, and does not account for dynamic distribution of traffic and resource allocation across multiple RATs.

There are multiple existing solutions to realize multi-radio convergence. As shown in FIG. 1, the convergence point 116 can be at the NAN 133 in FIG. 1, which may involve a WLAN access point (AP) or a small cell base station. The NAN 133 may operate according to LTE-WiFi aggregation as discussed ivy Sirotkin, "LTE-WLAN Aggregation (LWA): Benefits and Deployment Considerations," Intel® White Paper, available at: http://www.intel.com/content/www/us/en/wireless-network/lte-wlan-aggregation-deployment-white-paper.html ("[SIROTKIN]"). Such architectures that are currently being standardized for distributing traffic across LTE and WLAN HetNets include LTE-WLAN Aggregation (LWA) (see e.g., [SIROTKIN], 3GPP TS 36.465 v15.0.0 (2018-06-22), LTE-WLAN Radio Level Integration Using IPsec Tunnel (LWIP) (see e.g., 3GPP TS 36.361 v15.0.0 (2018-07-09)), and Multi-Radio Dual Connectivity (MR-DC) (see e.g., 3GPP TS 37.340 v16.0.0 (2020-01-07)). These architectural frameworks not only allow dynamic traffic aggregation, but also enable seamless offloading across RATs.

Another existing multi-radio convergence solution takes place at the TCP layer or application layer such as in multi-path TCP (MPTCP) (see e.g., Ford et al, "TCP Extensions for Multipath Operation with Multiple Addresses", Internet Engineering Task Force (IETF) RFC 6824 (January 2013) and IETF Multipath TCP working group, available at: https://datatracker.ietf.org/wg/mptcp/documents/(collectively "[MPTCP]")), and QUIC (see e.g., Iyengar et al., "QUIC: A UDP-Based Multiplexed and Secure Transport", draft-ietf-quic-transport-27, Standards Track (21 Feb. 2020) ("[QUIC]"). The multi-RAT traffic scheduling approach in [MPTCP] utilizes e2e feedback from UEs to manage traffic. It has been shown that MPTCP can achieve optimal goodput (e.g., (a portmanteau of "good" and "throughput") if the delay difference across multiple RATs are equalized (see e.g., Zhou et al., "Goodput improvement of multipath TCP with congestion window adaptation for multi-radio devices," *IEEE Communications and Networking Conference (CCNC)*, Las Vegas, NV, (11-14 Jan. 2013)). However, in practice, MPTCP is worse than delay equalization due to imperfect estimation of link throughput and congestion levels over e2e network links. MPTCP upper-bound can be modelled as split bearers with delay equalization across RATs. Another existing multi-radio convergence solution takes place at arbitrary servers within the network via generic Generic Multi-Access (GMA) (see e.g., Zhu et al., "Generic Multi-Access (GMA) Convergence Encapsulation Protocols," IETF INTAREA/Network Working Group, version 5, available at: https://tools.ietf.org/pdf/draft-zhu-intarea-gma-05.pdfhttps://tools.ietf.org/html/draft-zhu-intarea-gma-04 (16 Dec. 2019) ("[GMA]"). Regarding strategies to distribute traffic across multiple radio paths, past solutions, such as those discussed in Singh et al., "Optimal Traffic Aggregation in Multi-RAT Heterogeneous Wireless Networks," 2016 *IEEE International Conference on Communications Workshops (ICC)*, Kuala Lumpur (2016) ("[SINGH]"), focused on optimizing throughput performance for best-effort traffic only. The approach discussed in [SINGH], focuses on multi-radio convergence at the RAN or access point (e.g., convergence point 116 in FIG. 1).

For the emerging paradigm of edge computing, little has been explored for multi-radio traffic management with QoS taken into consideration. The existing/previous approaches to multi-radio traffic management focused on maximizing throughput for best effort traffic. However, QoS requirements are not considered in the existing/previous approaches. As for TCP layer or application layer approaches such as [MPTCP], it depends on e2e feedback and is slow at adapting to network delay profiles.

The present disclosure provides edge-based traffic management embodiments for low-latency and reliable communication over HetNets, such as edge network 100 and/or any of the other networks discussed herein. The embodiments herein include edge-based delay-aware multi-RAT traffic management (TM) solutions to support delay-sensitive traffic over heterogeneous networks. The delay-aware TM embodiments discussed herein determine how to split and/or steer traffic across different RATs for a control plane of the edge network (e.g., the MEC control plane). The present disclosure also describes signalling that may be used to implement the TM embodiments. The TM embodiments can achieve low latency and higher reliability compared to existing solutions to support delay sensitive applications.

1.2. Multi-RAT System Configurations and Arrangements

Figure 2:
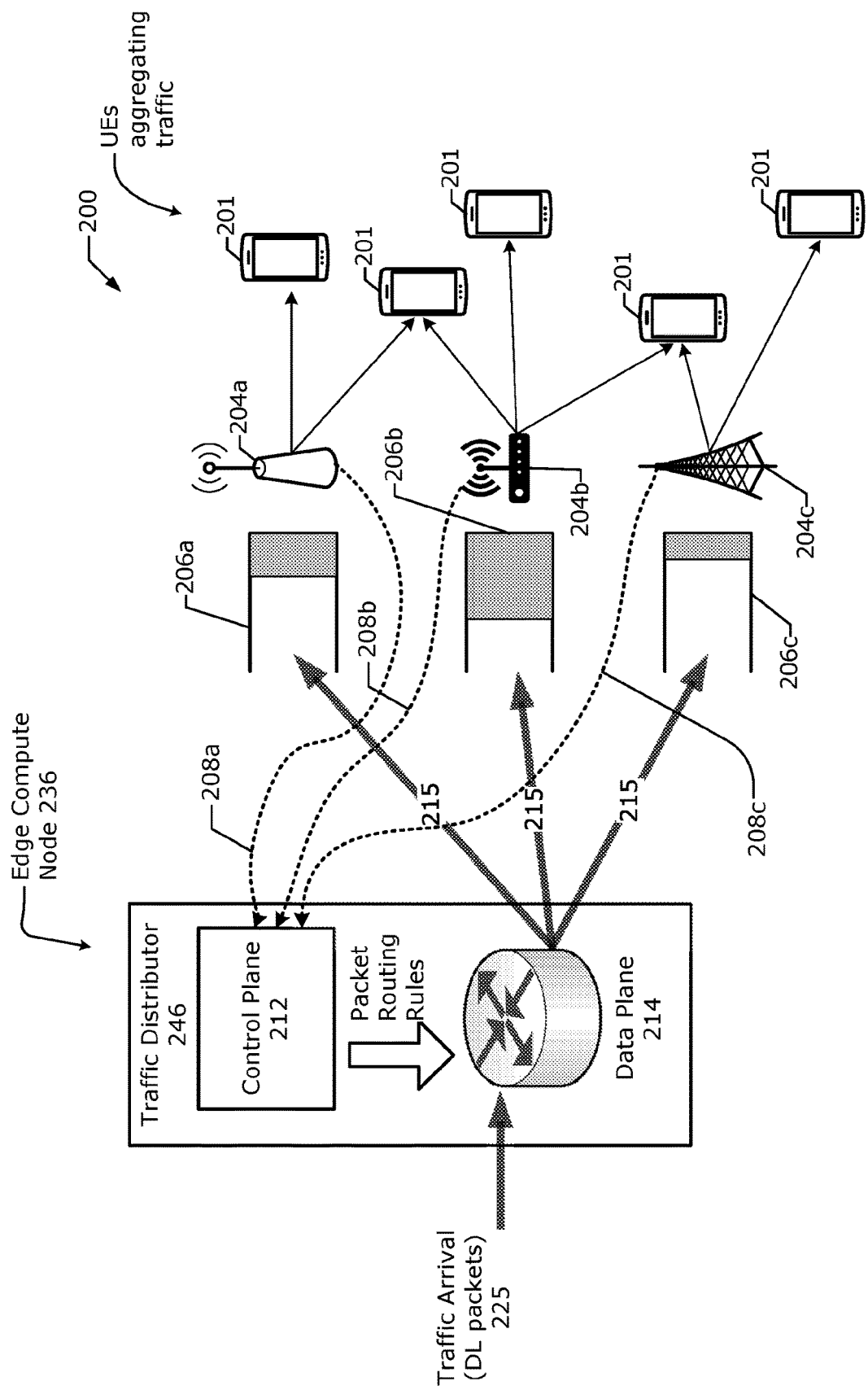
FIG. 2 illustrates an example heterogeneous multi-RAT network according to various embodiments.

FIG. 2 shows an example heterogeneous multi-RAT network 200 according to various embodiments. In the multi-RAT network 200, one or more UEs 201 (which may be the same or similar as compute nodes 101 in FIG. 1) have multiple radio interfaces and are connected with multiple different NANs 204a, 204b, and 204c (which may be the same or similar as NANs 931, 932, and 933 of FIG. 9). The UEs 201 may have the capability to aggregate traffic over multiple APs/RATs. These different NANs 204a, 204b, and 204c may be base stations (BS) (e.g., 3GPP 4G/LTE and/or 5G/NR small cell base stations and/or macro cell base stations), WLAN APs (e.g., WiFi routers, WiMAX APs, and the like), personal area network (PAN) beacons, and/or other like access networks or access technologies, such as those discussed herein. In this example, each NAN 204a, 204b, and 204c has a respective RAT transmission (Tx) queue 206a, 206b, and 206c, which queue/buffer downlink (DL) data from the edge compute node 236 for transmission to intended UEs 201. The RAT Tx queues 206a, 206b, and 206c may also queue/buffer uplink (UL) traffic to the edge compute node 236 from UEs 201.

The multi-RAT network 200 also includes an edge compute node 236 (e.g., which may correspond to edge server 136 in FIG. 1) that utilizes a convergence technology (e.g., [MPTCP], [QUIC], [GMA], and/or the like) at a data plane entity 214 to route downlink packets 225 and aggregate uplink traffic from UEs 201. In the example of FIG. 2, application traffic 225 arrives at the edge compute node 236, and the control plane entity 212 decides how to route the packets of the incoming traffic over the multiple paths 215. In embodiments, an intelligent traffic distributor 246 located at the edge compute node 236 computes traffic distribution decisions at (or in) the control plane entity 212. The traffic distributor 246 at the control plane element 212 also updates traffic distribution rules based on metrics derived from the various feedback 208a, 208b, and 208c obtained from respective NANs 204a, 204b, and 204c. The intelligent traffic distributor 246 informs the data plane entity 214 and the one or more UEs 201 about how to route packets over the multiple paths 215. The data plane entity 214 and the UEs 201 can utilize a convergence technology (e.g., [MPTCP], [QUIC], [GMA], and/or the like) to enable traffic splitting and aggregation. The UEs 201 with multi-RAT connections eventually aggregate the traffic. The UEs 201 can use the same or different convergence technology as the data plane entity 214.

In one example implementation, the intelligent traffic distributer 212 can be (or be part of) a Multi Access Management Services (MAMS) server (see e.g., Kanugovi et al., "Multiple Access Management Services Multi-Access Management Services (MAMS)," IETF RFC 8743 (25 Mar. 2020) ("[MAMS]")) or the like. In any of the embodiments discussed herein, the exchange of data between compute nodes 101, 201 and edge servers 136, 236 can be communicated according to the implemented edge system and/or communication protocols. Such communications techniques can be standardized or otherwise specified in a suitable edge computing standard, such as [ETSIMEC], [ORAN], and/or the like. Additionally or alternatively, the information needed to utilize the embodiments discussed herein can also be inspected/intercepted from respective compute nodes 101, 201 and/or respective edge servers 136, 236. In any of the embodiments discussed herein, computation of edge-based delay-aware TM may take place at the edge servers 136, 236. In some implementations, dedicated hardware at the edge compute nodes 101, 201 and/or the edge servers 136, 236 can be utilized to run the edge-based delay-aware TM embodiments discussed herein.

1.3. Edge Network Control-Plane Delay-Aware Traffic Management Embodiments

The edge control-plane can determine the fraction of $UE_i$'s traffic to be sent over each $RAT_r$, which is denoted by $X_{i,r}$. $UE_i$ may be the same or similar as compute nodes 101, 201 discussed previously, and the $RAT_r$ may be any of the RATs discussed herein (e.g., NANs 204a, 204b, and 204c implementing a particular RAT). The collection of all $UE_i$'s traffic splitting ratio can be represented as vector X. For purposes of the present disclosure, the notation "$RAT_r$" or the like refers to both the access technology (RAT) used by an individual NAN 204 and the individual NANs 204 itself.

In order to support delay-sensitive traffic over HetNets, the traffic management problem is formulated according to equation (1) to minimize the total utility. The utility is a function of collective network delay performance given traffic arrival rate $\Lambda$ at the edge compute node 236.

$$\min_X \{U(X) = f(\Lambda(X))\} \quad (1)$$

$$\text{s.t } \rho_r(X) = \sum_{i \in C_r} X_{i,r} \xi_{i,r} \leq 1$$

$$\sum_r 1(i \in C_r) X_{i,r} = 1, \forall i$$

$$0 \leq X_{i,r} \leq 1, \forall i, r$$

In equation (1), $\rho_r(X)$ is the resource utilization level at $RAT_r$, and $\xi_{i,r}$ is the individual resource utilization level of $UE_i$ with $RAT_r$. The notation $i \in C_r$ indicates that $UE_i$ is under the coverage of $RAT_r$. Since each UE's traffic will be split across associated RATs, the sum of traffic splitting ratio should add up to 1.

The collective network delay performance $f(\Lambda(X))$ is characterized based on measurements provided by edge server/network application programming interface (API) (e.g., MEC API or the like) that collects lower-layer feedback from the NANs 204a, 204b, and 204c.

The following discussion explains the edge-based delay-aware TM embodiments given different types of feedback from individual NANs 204a, 204b, and 204c.

1.3.1. Edge-Based Delay-Aware Traffic Management Signaling Embodiments

According to various embodiments, different types of operational parameters (or combinations of operational parameters) of the edge compute nodes 101, 201, NANs 204a, 204b, and 204c, and/or the edge servers 136, 236 (collectively referred to as "compute nodes") may be used for edge-based delay-aware TM. The operational parameters for the compute nodes include compute node capabilities and operational constraints or contexts.

The compute node capabilities may include, for example, configuration information (e.g., a hardware platform make and model, hardware component types and arrangement within the hardware platform, associated peripheral and/or attached devices/systems, processor architecture, currently running operating systems and/or applications and/or their requirements, subscription data (e.g., data plan and permissions for network access), security levels or permissions (e.g., possible authentication and/or authorization required to access the compute node), etc.); computational capacity (e.g., a total processor speed of one or more processors, a total number of VMs capable of being operated by the compute node, a memory or storage size, an average computation time per workload, a reuse degree of computational resources, etc.); current or predicted computational load and/or computational resources (e.g., processor utilization or occupied processor resources, memory or storage utilization, etc.); current or predicted unoccupied computational resources (e.g., available or unused memory and/or processor resources, available VMs, etc.); network capabilities (e.g., link adaptation capabilities, configured and/or maximum transmit power, achievable data rate per channel usage, antenna configurations, supported radio technologies or functionalities of a device (e.g., whether a UE supports a particular access technology, RAT, etc.; whether an (R)AN node supports LWA and/or LWIP, etc.), subscription information of particular UEs, etc.); energy budget (e.g., battery power budget); and/or other like capabilities.

The operational contexts and/or constraints may be any type of information about how a particular compute node is operating and/or the conditions under which the compute node is operating. The operational contexts and/or constraints include, for example, channel state conditions and/or quality of fronthaul links, and state conditions and/or quality of backhaul links/interfaces; overload conditions experienced by UEs and/or (R)AN nodes; application parameters such as computational needs, input/output characteristics, and volume of exchanged data with an edge server, or the like; conditions of individual hardware components (e.g., temperature, load, utilization, current or predicted available power, energy consumption measurements, etc.); environmental information of an environment surrounding a compute node (e.g., temperature, ambient light, sound/volume, altitude, humidity, moisture, information/data related to geographic objects (e.g., mountains) and/or human-created objects (e.g., buildings, highways, etc.), weather data for a given location, the geolocation or other positioning information, and/or other like environmental measurements); OS and/or application parameters and requirements; and/or other like contextual information. In some embodiments, the operational contexts and/or constraints may be based on a pre-assessment of an operational state of the edge compute nodes, which may be based on previously indicated operational contexts and/or constraints for different offloading opportunities. This may involve, for example, evaluating both computation and communication resources needed for different offloading opportunities. The threshold criteria or a desired level of reliability mentioned previously may be based on a certain amount or type of compute node capabilities (e.g., a certain processor speed) and/or a type of operational constraints under which the compute node is operating (e.g., a desired link quality, a desired surrounding temperature, a desired processor temperature, etc.).

The fronthaul and/or backhaul link conditions may include network performance information related to network traffic measurements (e.g., measurements of the amount and type of traffic flowing through or across one or more network nodes), as well as various performance measurements. The performance measurements may include information/data related to bandwidth (BW); channel/link throughput and/or data rate; latency; jitter, error rate; a number of active UEs and/or user sessions; packet delay; call and/or connection drops; loss rate; data volume measurements; round trip times (RTTs) and/or round-trip delay times (RTDs); QoS and/or QoE parameters; etc. The fronthaul link conditions may include the aforementioned traffic and performance measurements, as well as information/data related to signal strength measurements and/or signal quality measurements such as, for example, BW measurements; 3GPP defined measurement counters and KPIs (e.g., aggregated by cell, QoS type, slice, etc.); network load statistics; cell load statistics (e.g., number of active users or connections, number of scheduled, active users per TTI, PRB utilization, CCE utilization, etc.); latency; jitter; RTT; number of interrupts; out-of-order delivery of data packets; transmission power; bit error rate; bit error ratio (BER); Block Error Rate (BLER); energy per bit to noise power spectral density ratio ($E_b/N_0$); packet loss rate (PLR); packet reception rate (PRR); signal-to-noise ratio (SNR); signal-to-noise and interference ratio (SINR); signal-plus-noise-plus-distortion to noise-plus-distortion (SINBAD) ratio; peak-to-average power ratio (PAPR); Reference Signal Received Power (RSRP); Received Signal Strength Indicator (RSSI); Reference Signal Received Quality (RSRQ); GNSS timing of cell frames for UE positioning for E-UTRAN or 5G/NR (e.g., a timing between a network access nodes reference time and a GNSS-specific reference time for a given GNSS); GNSS code measurements (e.g., The GNSS code phase (integer and fractional parts) of the spreading code of the $i^{th}$ GNSS satellite signal); GNSS carrier phase measurements (e.g., the number of carrier-phase cycles (integer and fractional parts) of the $i^{th}$ GNSS satellite signal, measured since locking onto the signal, also called Accumulated Delta Range (ADR)); channel interference measurements; thermal noise power measurements; received interference power measurements; channel, connection, network access, and/or mobility/handover statistics with indication of handovers (e.g., a number of radio resource control (RRC) connection/setup/reconfiguration attempts, a number of random access and/or random access channel (RACH) attempts, a number of radio link failures (RLFs), a number of attempted, successful, and/or failed handovers, etc.); per user/UE performance statistics (e.g., PDCP throughput, RLC layer latency, MAC layer latency, etc.); and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214, 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the access network elements, and/or used for backhaul link conditions.

According to various embodiments, the following types of operational parameters (e.g., measurements, feedback, etc.) may be used for edge-based delay-aware TM (where r is a RAT index (e.g., for RAT_r) and i is a UE index (e.g., for UE_i)):

(1) per RAT backhaul delay d_r/\backhaul
(2) per RAT per UE utilization $\xi\_(i,r)$
(3) per RAT per UE PHY data rate R_(i,r)
(4) per RAT per UE delay measurement d_r/\measurement Any of the aforementioned operational parameters may be measured or otherwise determined stochastically or deterministically. The stochastic operational parameters (or stochastic components of the operational parameters) may be randomly determined or measured, or may have a random probability distribution or pattern that is analyzed statistically but may not be predicted precisely. The deterministic operational parameters (or deterministic components of the operational parameters) may be measurements or information produced without randomness. In other words, the deterministic operational parameters, when measured or determined, are likely to produce the same outcome given a particular situation and/or context.

In some implementations, the compute nodes 101, 201 may identify their operational parameters using suitable APIs, application binary interfaces (ABIs), middleware, drivers, configuration files, trusted application(s), RF measurement mechanisms (e.g., as defined by suitable standards or specifications), and/or other like mechanisms to obtain or identify their respective operational parameters. In MEC-based implementations, some or all of the operational parameters may be obtained via appropriate MEC APIs (e.g., Edge Platform Application Enablement (see e.g., ETSI GS MEC 011 V1.1.1 (2017-07) ("[MEC011]")), Radio Network Information (RNI) API (see e.g., ETSI GS MEC 012 V1.1.1 (2017-07) ("[MEC012]")), Location API (see e.g., ETSI GS MEC 013 v1.1.1 (2017-07) ("[MEC013]")), UE Identity API (see e.g., ETSI GS MEC 014 V1.1.1 (2018-02) ("[MEC014]")), Traffic Management API (see e.g., ETSI GS MEC 015 V2.1.1 (2020-06) ("[MEC015]")), WLAN Access Information (WAI) API (see e.g., ETSI GS MEC 028 V2.1.1 (2020-06) ("[MEC028]")), Fixed Access Information (FAI) API ETSI GS MEC 029 v2.1.1 (2019-07) ("[MEC029]")), ETSI GS MEC 030 v2.1.1 (2020-04) ("[MEC030]")), and the like).

In various embodiments, new signaling is defined to collect the operational parameters. This new signaling can be proprietary or standardized via [ORAN], 3GPP, ETSI, and/or the like. The traffic distribution intelligence can be part of the edge (e.g., MEC) platform or from edge (e.g., MEC) applications. In MEC implementations, new MEC API message(s) can be defined to pass the new measurement signaling to traffic management MEC APP. The new signaling may be used to compute traffic distribution rules as discussed infra.

1.3.2. Traffic Management Using (1) Per RAT Backhaul Delay $d_r^{backhaul}$ and (2) Per RAT Per UE Utilization $\xi_{i,r}$ In embodiments, the delay-aware TM problem can be solved using two different approaches. The first approach involves explicitly modeling the network delay, and the second approach involves implicitly modeling the network delay.

The first approach (explicitly model the network delay) may include using a queueing theory model to obtain an estimate of the network average delay based on the feedback information. An example of the average network delay based on M/M/1 queueing model is:

$$\sum_{r=1}^{M}\left(\frac{\rho_r(X)}{1-\rho_r(X)} + \Lambda_r(X)d_r\right)$$

In queueing theory, an M/M/1 queue represents a queue length in a system having a single server (e.g., edge compute node 236 of FIG. 2). An M/M/1 queue is a stochastic process whose state space is the set {0,1,2,3, . . . ,} where the value corresponds to the number of UEs and/or RATs in the system (e.g., multi-RAT environment 200 of FIG. 2). Arrivals occur at rate 2 according to a Poisson process and move the process from state i to i+1, and job service times have an exponential distribution with a rate parameter μ (where 1/μ is the mean service time). The server (e.g., edge compute node 236 of FIG. 2) serves clients (e.g., the network elements 204, 206, and 208 and/or UEs 201 of FIG. 2) one at a time from the front of the queue according to a first-come first-served (FIFO) scheme. When the service is complete the client leaves the queue and the number of clients in the system reduces by one. In other implementations, a different queueing model may be used, such as using an M/M/c queueing model where multiple edge servers are involved. Directly minimizing the average network delay may be expressed using equation (2).

$$\min\left\{U(X) = \sum_{r=1}^{M}\left(\frac{\rho_r(X)}{1-\rho_r(X)} + \Lambda_r(X)d_r^{backhaul}\right)\right\} \quad (2)$$

$$\text{s.t } \rho_r(X) = \sum_{k \in C_r} X_{i,r}\xi_{i,r} \leq 1$$

$$\Lambda_r = \sum_{k \in C_r} \lambda_i X_{i,r}$$

$$\sum_r 1(i \in C_r)X_{i,r} = 1, \forall i$$

$$0 \leq X_{i,r} \leq 1, \forall i, r$$

The second approach (implicitly model the network delay) may include estimating the resource utilization level for each RAT based on the per UE utilization feedback and then equalizing the utilization level across the different RATs. The resource utilization estimate for each RAT may be expressed as follows:

$$\rho_r(X) = \sum_{i \in C_r} X_{i,r}\xi_{i,r}$$

This approach is based on the concept that, if a RAT is less utilized, it will cause less queueing delay, as well as a desired to use all radio resources equally across the different RATs. This may be expressed using equation (3).

$$\min\left\{U(X) = \max_r \{\rho_r\}\right\} \quad (3)$$

$$\text{s.t. } \rho_r = \sum_{k \in C_r} X_{i,r}\xi_{i,r}$$

$$\sum_r 1(i \in C_r)X_{i,r} = 1, \forall i$$

$$0 \leq X_{i,r} \leq 1, \forall i, r$$

Equation (3) targets to minimize the queueing delay of individual RATs. Note that there exist scenarios where users contribute similarly to RAT utilization levels or average delay. For example, when $$\frac{\xi_{i,r}}{\xi_{j,r}} = \frac{\xi_{i,s}}{\xi_{j,s}},$$

shuttling traffic allocation for $RAT_r$ and $RAT_s$ between $UE_i$ and $UE_j$ may be expressed as follows:

$$X'_{i,r} = X_{i,r} + \delta, \quad X'_{j,r} = X_{j,r} - \frac{\xi_{i,r}}{\xi_{j,r}}\delta;$$

$$X'_{i,s} = X_{i,s} - \delta, \quad X'_{j,s} = X_{j,s} + \frac{\xi_{i,r}}{\xi_{j,r}}\delta.$$

The above expression has little to no impact to individual RAT utilization. In addition, if traffic loading for $UE_i$ and $UE_j$ satisfies $$\frac{\lambda_i}{\lambda_j} = \frac{\xi_{i,r}}{\xi_{j,r}},$$

traffic adjustment between the two UEs will not affect (or have little effect on the) total average delay. Therefore, for users satisfying the above condition(s), reordering delay caused by out-of-order delivery between RATs can be further reduced by adjusting the traffic splitting ratios among those users, such that most traffic distribution decision steers traffic to a single RAT and minimizes the number of users splitting traffic. In these embodiments, the traffic splitting ratio value $X_{i,r}$ may be set to either 1 or 0.

In various embodiments, a two-step approach may be used to enhance the above mentioned embodiments by minimizing the number of traffic splitting UEs. An example of this two-step approach is shown by FIG. 3.

Figure 3:
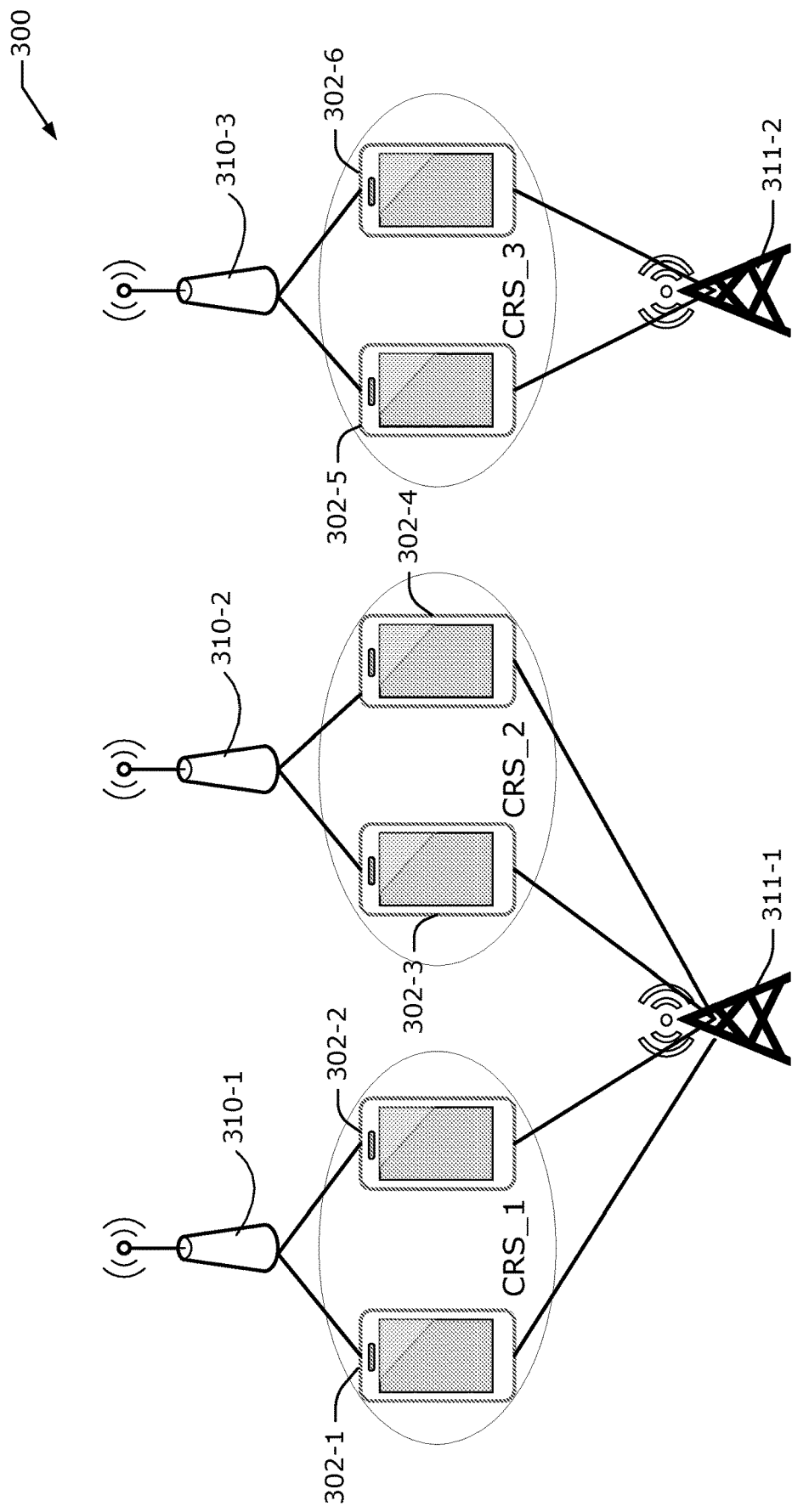
FIG. 3 illustrates another example heterogeneous multi-RAT network according to various embodiments.

FIG. 3 shows an example two-step approach 300 according to various embodiments. In this example, multiple UEs 301 are connected to a first RAT (RAT-1) NAN 310 and a second RAT (RAT-2) NAN 311. The UEs 301 may be the same or similar as UEs 101 and/or 201 discussed previously As an example, the RAT-1 NANs 310 (including NANs 310-1, 310-2, and 310-3) may be WiFi APs, and the RAT-2 access nodes 311 (including NANs 311-1 and 311-2) may be gNBs (in a 5G/NR network) and/or eNBs (in an LTE network).

The first step (Step 1) in the two-step approach involves computing each UE's 301 traffic splitting ratio $X_{i,r}$ based on (2) per RAT per UE utilization $\xi_{i,r}$ and/or (3) per RAT per UE PHY data rate $R_{i,r}$, and obtaining the corresponding per RAT utilization level $\rho_r^*$, (e.g., $\rho_r^* = \Sigma_{i \in C_r} X_{i,r} \xi_{i,r}$). This RAT utilization level is denoted as the "optimal utilization level."

The second step (Step 2) in the two-step approach involves modifying each UE's 301 traffic splitting ratio $X_{i,r}$ to minimize splitting. In this step, a common RAT set (CRS) is determined for each UE 301. The example shown by FIG. 3 includes three CRS sets with UEs 301 and access nodes 310, 311 described by Table 1.3.2-1.

TABLE 1.3.2-1

| CRS | UEs 301 in CRS | Serving RATs/RANs |
|---|---|---|
| CRS_1 | UE 301-1 & UE 301-2 | RAT-1 310-1 & RAT-2 311-1 |
| CRS_2 | UE 301-3 & UE 301-4 | RAT-1 310-2 & RAT-2 311-1 |
| CRS_3 | UE 301-5 & UE 301-6 | RAT-1 310-3 & RAT-2 311-2 |

Next, the traffic splitting ratio obtained in Step 1 is quantized to minimize splitting for reducing reordering delay. Quantization may refer to a process of constraining an input from a continuous or otherwise large set of values to a discrete set of values.

In Step 2, for each CRS, a particular RAT (or particular RAN) is selected for the UEs to use (e.g., either LTE or WiFi in this example), and at most one UE maintains connections to both RATs (or RANs) with traffic splitting. This may involve sorting all UEs within the same CRS, an example of which is shown by FIG. 4.

Figure 4:
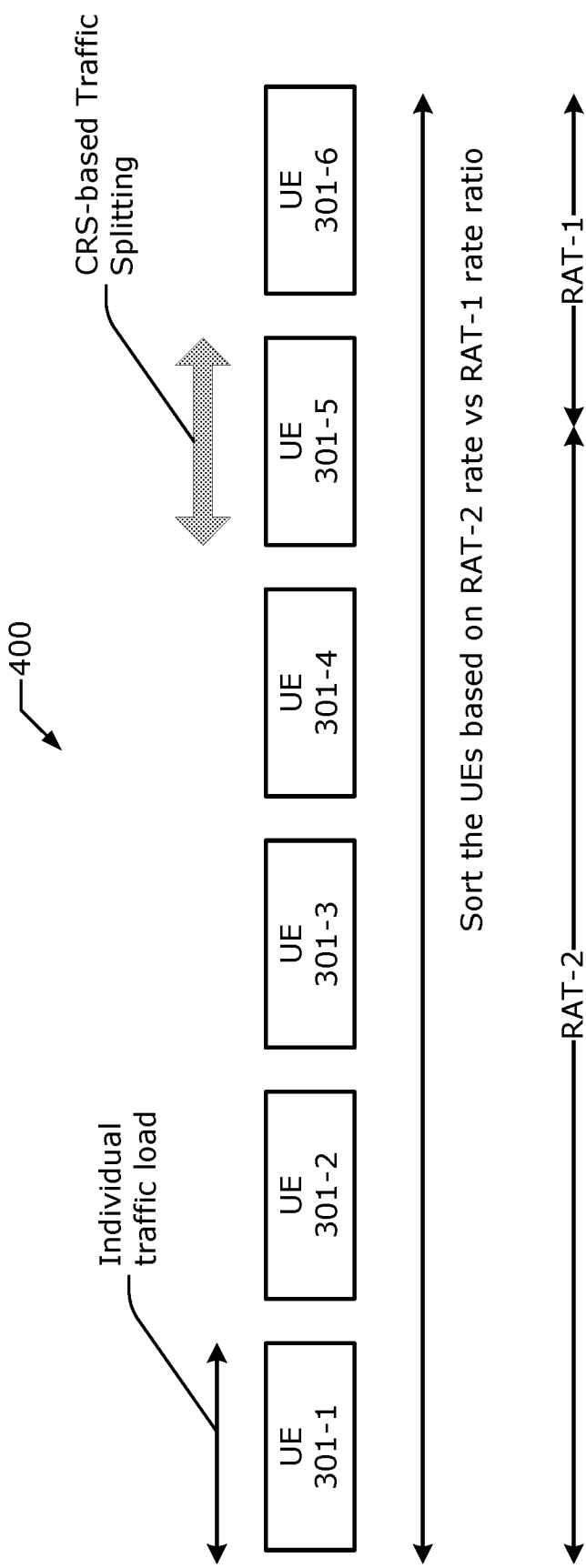
FIG. 4 illustrates an example of sorting user equipment according to a Common RAT Set (CRS) according to various embodiments.

FIG. 4 illustrates an example sorting process 400 according to various embodiments. In this example, the UEs 301 in FIG. 3) are sorted according to CRS. Sorting the UEs 301 can be based on metrics such as the traffic splitting ratio $X_{i,r}$ computed from (2) per RAT per UE utilization $\xi_{i,r}$ and/or (3) per RAT per UE PHY data rate $R_{i,r}$ as follows:

$$X_{i,R_2} \geq X_{i+1,R_2} \geq \ldots \geq X_{i+k,R_2}$$

where: $X_{i,R_1} = 1 - X_{i,R_2}$

In the above expression, $R_1$ is RAT-1, $R_2$ is RAT-2, and UE {i, i+1, . . . , i+k} belong the same CRS. Based on the sorting in the example of FIG. 4, UE 301-1, UE 301-2, UE 301-3, and UE 301-4 are steered to their RAT-2 access nodes 311; UE 301-6 is steered to its RAT-1 access nodes 310; and UE 301-5 uses both its RAT-1 access node 310 and its RAT-2 access node 311. Other ranking methods that can be used may include random ranking, ranking by data rate (for one or all RATs), and/or the like.

Next, for the UEs 301 in a CRS, considering the adjusted traffic assignments (where $R_1$ is RAT-1 and $R_2$ is RAT-2):

$$X'_{i,R_2} = X_{i,R_2} + \delta, \quad X'_{j,R_2} = X_{j,R_2} - \frac{\xi_{i,r}}{\xi_{j,r}}\delta;$$

$$X'_{i,R_1} = X_{i,R_1} - \delta, \quad X'_{j,s} = X_{j,R_1} + \frac{\xi_{i,r}}{\xi_{j,r}}\delta.$$

A determination is made as to whether the following condition holds: $|U'(X) - U^*(X)| \leq \epsilon(\delta)$, where $U'(X)$ is the new network utility based on new traffic distribution $\{X_{i,r}'\}$ and $U^+(X)$ is the optimal network utility. UEs not satisfying the above criteria are removed from the CRS.

Next, for each CRS, UEs with no traffic splitting (e.g., $X_{j,R_2}$ and $X_{j,R_1}$ are either 0 or 1) are removed from the CRS, and the following three operations/procedures are performed:

(I) If there is more than one UE in the CRS, proceed to (II); else stop.

(II) For $UE_i$ with the highest RAT-2 metric (and lowest RAT-1 metric) in a CRS, and $UE_k$ with the lowest RAT-2 metric (and highest RAT-1 metric) in a CRS, compute $\Delta = 1 - X_{i,R_1}$.

a. If $$\frac{\xi_{i,R_2}}{\xi_{k,R_2}}\Delta \leq X_{k,R_2},$$

adjust the splitting ratio as follows:

$$X_{i,R_2} \leftarrow 1 \left(\text{thus } X_{i,R_1} \leftarrow 0\right)$$

$$X_{k,R_2} \leftarrow X_{k,R_2} - \frac{\xi_{i,R_2}}{\xi_{k,R_2}}\Delta \left(\text{thus } X_{k,R_1} \leftarrow X_{k,R_1} + \frac{\xi_{i,R_2}}{\xi_{k,R_2}}\Delta\right)$$

remove $UE_i$ from CRS, and if $$\frac{\xi_{i,R_2}}{\xi_{k,R_2}}\Delta = X_{k,R_2},$$

also remove $UE_k$ from CRS.

b. else, adjust the splitting ratio as follows:

$$X_{i,R_2} \leftarrow X_{i,R_2} + \frac{\xi_{k,R_2}}{\xi_{i,R_2}}X_{k,R_2}\left(\text{thus } X_{i,R_1} \leftarrow X_{i,R_1} - \frac{\xi_{k,R_2}}{\xi_{i,R_2}}X_{k,R_2}\right)$$

$$X_{k,R_2} \leftarrow 0 \left(\text{thus } X_{k,R_1} \leftarrow 1\right)$$

remove $UE_k$ from CRS.

(III) Go back to step I until all UEs 301 in all CRSs are processed.

1.3.3. Traffic Management Using (1) Per RAT Backhaul Delay $d_r^{backhaul}$ and (3) Per RAT Per UE PHY Data Rate $R_{i,r}$ Based on the PHY rate feedback information, calculate the per UE utilization level (e.g., a fraction of $RAT_r$ resources required to support all of $UE_i$'s traffic) may be calculated as follows:

$$\xi_{i,r} = \frac{\text{Traffic Volume of } UE_i}{R_{i,r}}$$

In the above optimization problem, $R_{i,r}$ is the per RAT per UE PHY data rate, and $\xi_{i,r}$ is the per RAT per UE utilization (e.g., the resource utilization level of $UE_i$ with $RAT_r$). The two approaches in case A can be directly applied to case B by substituting the estimation of $\xi_{i,r}$ to the optimization formula above. The above-mentioned optimization problems in case A and case B can be solved using standard convex optimization approaches to obtain the per-RAT traffic splitting ratio at the edge compute node 236. Examples of such convex optimization approaches are discussed in Boyd et al., "Convex Optimization", Cambridge University Press (March 2004), which is hereby incorporated by reference in its entirety.

1.3.4. Traffic Management Using Combination (1) Per RAT Backhaul Delay $d_r^{backhaul}$ and (4) per RAT per UE delay measurement $d_r^{measurement}$ In this embodiment, the delay is equalized across different $RAT_r$'s for each $UE_i$ based on per UE delay measurement feedback, and the TM solution is to solve the following optimization problem for each $UE_i$:

$$\min_{X_{i,r}}\left\{\max_r\left(d_r^{measurement} + d_r^{backhaul}\right)\right\}$$

$$\text{s.t.} \sum_r 1(i \in C_r)X_{i,r} = 1, \forall i$$

$$0 \le X_{i,r} \le 1, \forall i, r$$

In the above optimization problem, $d_r^{backhaul}$ is the per RAT backhaul delay, and $d_r^{measurement}$ is the per RAT per UE delay measurement. The optimization problem can be solved via heuristic algorithm that gradually steers traffic from high latency RATs to low latency RATs to achieve delay balancing. One example implementation includes the following procedure.

(I) $UE_i$ compares its observation of one-way delay (OWD) measurement from all $RAT_r$'s to which it is connected (or capable of being served from) and sorts:

$$d_{i,r_1}^{OWD} \ge d_{i,r_2}^{OWD} \ge \ldots \ge d_{i,r_M}^{OWD}$$

In the above expression, $d_{i,r_M}^{OWD}$ is the OWD measured by $UE_i$ for each $RAT_r$ in a set of RATs 1 to M (where M is a number). $UE_i$ then changes a current traffic distribution rule by steering loading from a highest latency RAT with traffic to lowest latency RAT according to the following:

if $X_{i,r_1} = X_{i,r_2} = \ldots = X_{i,r_{k-1}} = 0$, then move traffic from RAT $r_k$ to RAT $r_M$: $X_{i,r_k} = X_{i,r_k} - \delta$ and $X_{i,r_M} = X_{i,r_M} + \delta$.

In the above, $\delta$ is a traffic adjustment factor, which can be a constant adjustment value (e.g., a constant value) or a function of the delay difference between $d_{i,r_k}^{OWD}$ and $d_{i,r_M}^{OWD}$.

1.3.5. Extensions to the Traffic Management Embodiments

Reordering (e.g., reordering delay) may be avoided to further reduce delay by enforcing $X_{i,r} = \{0, 1\}$, which means that no traffic splitting takes place. As a result, equation (3) is changed into equation (4).

$$\min\{U(X) = \max_r\{\rho_r\}\} \tag{4}$$

$$\text{s.t.} \rho_r = \sum_{k \in C_r} X_{i,r}\xi_{i,r}$$

$$\sum_r 1(i \in C_r)X_{i,r} = 1, \forall i$$

$$X_{i,r} = \{0, 1\}, \forall i, r$$

On the other hand, the utility function may also be changed to total utilization, as shown by equation (5).

$$\min\left\{U(X) = \sum_r \rho_r\right\} \tag{5}$$

$$\text{s.t.} \rho_r = \left(\sum_{k \in C_r} X_{i,r}\xi_{i,r}\right) \le e_r$$

$$\sum_r 1(i \in C_r)X_{i,r} = 1, \forall i$$

$$0 \le X_{i,r} \le 1, \forall i, r$$

In equation (5), $\Sigma_r \rho_r$ is the total utilization, $e_r$ is the (pre-defined) maximum per-RAT utilization limit (e.g., 80%). Similar to equation (4), the no splitting constraint, $X_{i,r} = \{0, 1\}$, may be applied to turn equation (5) into equation (6).

$$\min\left\{U(X) = \sum_r \rho_r\right\} \tag{6}$$

$$\text{s.t.} \rho_r = (\Sigma_{i \in C_r} X_{i,r}\xi_{i,r}) \le e_r$$

$$\Sigma_r 1(i \in C_r)X_{i,r} = 1, \forall i$$

$$X_{i,r} = \{0, 1\}, \forall i, r$$

1.4. Traffic Management Simulation and Performance Evaluation

Figure 5:
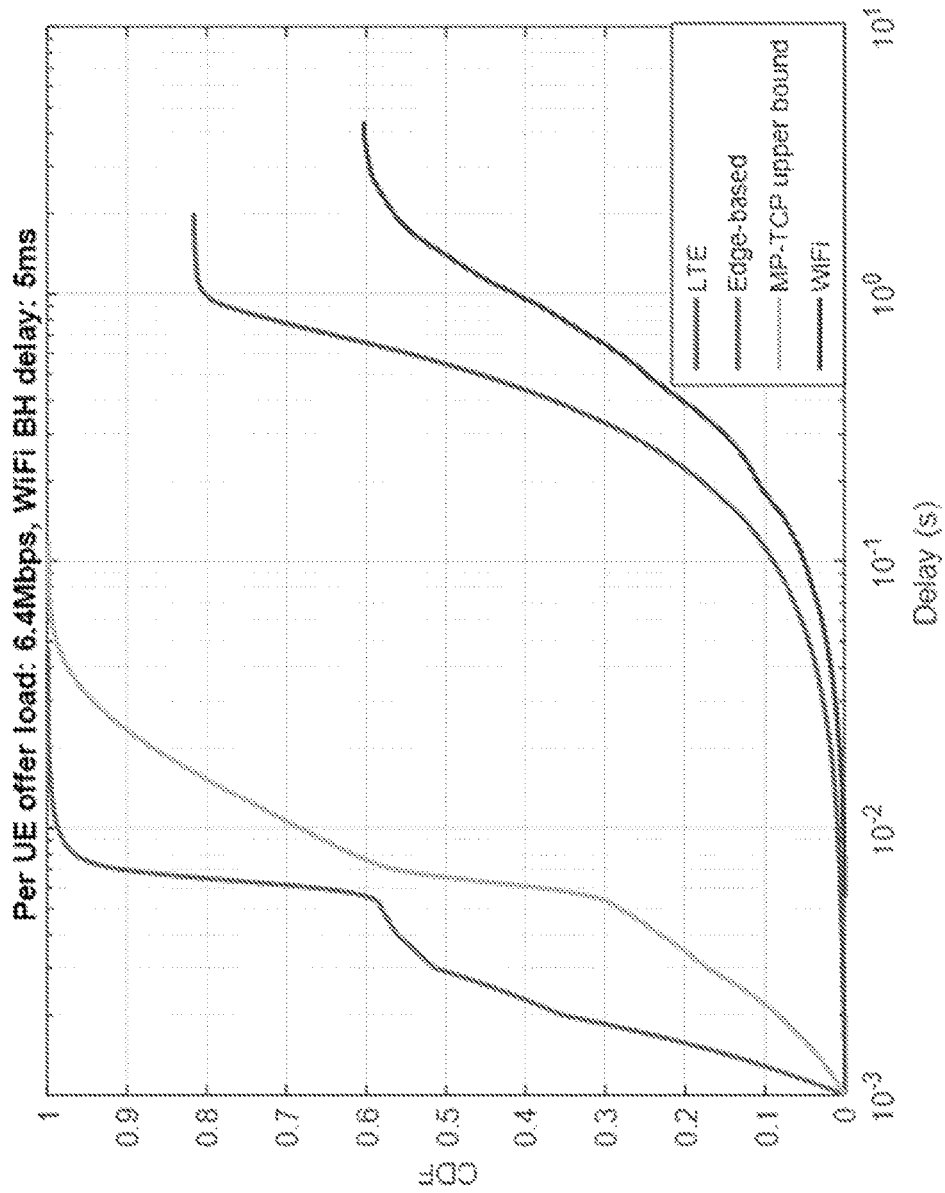
FIG. 5 illustrates simulation results of a simulation of the embodiments discussed herein.

FIG. 5 illustrates graph 500 showing results of a simulation of the TM embodiments discussed herein. The simulation results demonstrate the edge-based delay-aware TM embodiments versus MP-TCP upper bound in an LTE-WiFi system level simulator for a typical indoor hotspot environment, where one LTE small cell base station and four WiFi APs are placed inside a building. Each WiFi AP was simulated to serve three clients (UEs) and all clients are also associated (e.g., connected) with the LTE small cell.

As can be seen from the simulation results graph 500, using multi-RAT can significantly improve the delay performance for traffic volumes that cannot be handled by a single RAT. In particular, the edge-based delay-aware TM embodiments achieve significant delay reductions of 4.27× as compared to the MP-TCP upper bound. Moreover, given a typical 5G packet delay budget for delay-sensitive applications (e.g., 10 ms for AR/VR applications, and discrete automation), the edge-based delay-aware TM embodiments can reduce the packet loss rate (PLR) from 31.66% to 1.35%, providing a 23× reliability improvement.

2. Edge-Based Delay-Aware Multi-RAT Traffic Management Embodiments

2.1. Introduction

As mentioned previously with respect to FIG. 1, when edge compute nodes 101 have multiple radio interfaces (or multiple communication chips/circuitries), a multi-radio convergence point 114 can take place at the edge of the network (e.g., at edge server 136 in FIG. 1) to offer multi-path traffic management for low latency communication. In existing multi-radio convergence approaches, traffic sent across multiple radio paths converges in the network at either the edge or the cloud.

There are multiple existing solutions to realize multi-radio convergence (see e.g., section EDGE-BASED DELAY-AWARE MULTI-RAT TRAFFIC MANAGEMENT EMBODIMENTS, supra). In addition, previous works on multi-radio traffic management focused on maximizing throughput for best effort traffic. Little has been explored for multi-radio traffic management with QoS taken into consideration. TCP layer or application layer solutions such as MP-TCP depend on e2e feedback and are slow in adapting to the network delay profile. The embodiments described in section EDGE-BASED DELAY-AWARE MULTI-RAT TRAFFIC MANAGEMENT EMBODIMENTS provide a general problem formulation and useful signalling, but has a relatively complex algorithm that requires solvers like convex optimization or linear programming tools.

The present disclosure provides utilization threshold-based traffic management embodiments in multi-RAT environments for low-latency and reliable communication over HetNets, such as edge network 100 and/or any of the other networks discussed herein. The embodiments herein include utilization threshold-based mechanisms to achieve delay-aware multi-path traffic management (TM) at the network's edge. Here, "multi-path" includes multi-RAT, multi-access, and/or multi-connectivity communication and/or traffic. The present disclosure provides strategies for sorting UEs for making multi-RAT traffic distribution decisions and for determining utilization threshold(s). Embodiments also include message exchange flows for learning utilization threshold(s) and other useful system properties. The embodiments herein may be implemented as part of ETSI MEC, or some other edge computing technology, such as those discussed herein. In one example, the embodiments herein may be implemented using Intel® Network Edge Virtualization (NEV) SDK (see e.g., Intel® Intel® Network Edge Virtualization (NEV) Software Development Kit (SDK) product brief, available at: https://networkbuilders.intel.com/docs/Intel_Wireless_Product_Brief_for_IDF_v8.pdf; Intel® white paper, "Simplify Application Development for the Network Edge", 338156-001EN, available at: https://www.intel.com/content/dam/www/public/us/en/documents/white-papers/nev-sdk-white-paper.pdf). In another example, the embodiments herein may be implemented using open-source reference code, such as using OpenNESS (see e.g., OpenNESS, available at: https://www.openness.org/) ("[OPENNESS]")). The edge-based traffic management embodiments discussed herein can be easily implemented and can achieve lower latency and higher reliability than existing solutions. The embodiments herein enable more delay sensitive applications to be operated in edge computing networks using less resources than existing solutions.

2.2. Multi-RAT System Configurations and Arrangements

Figure 6:
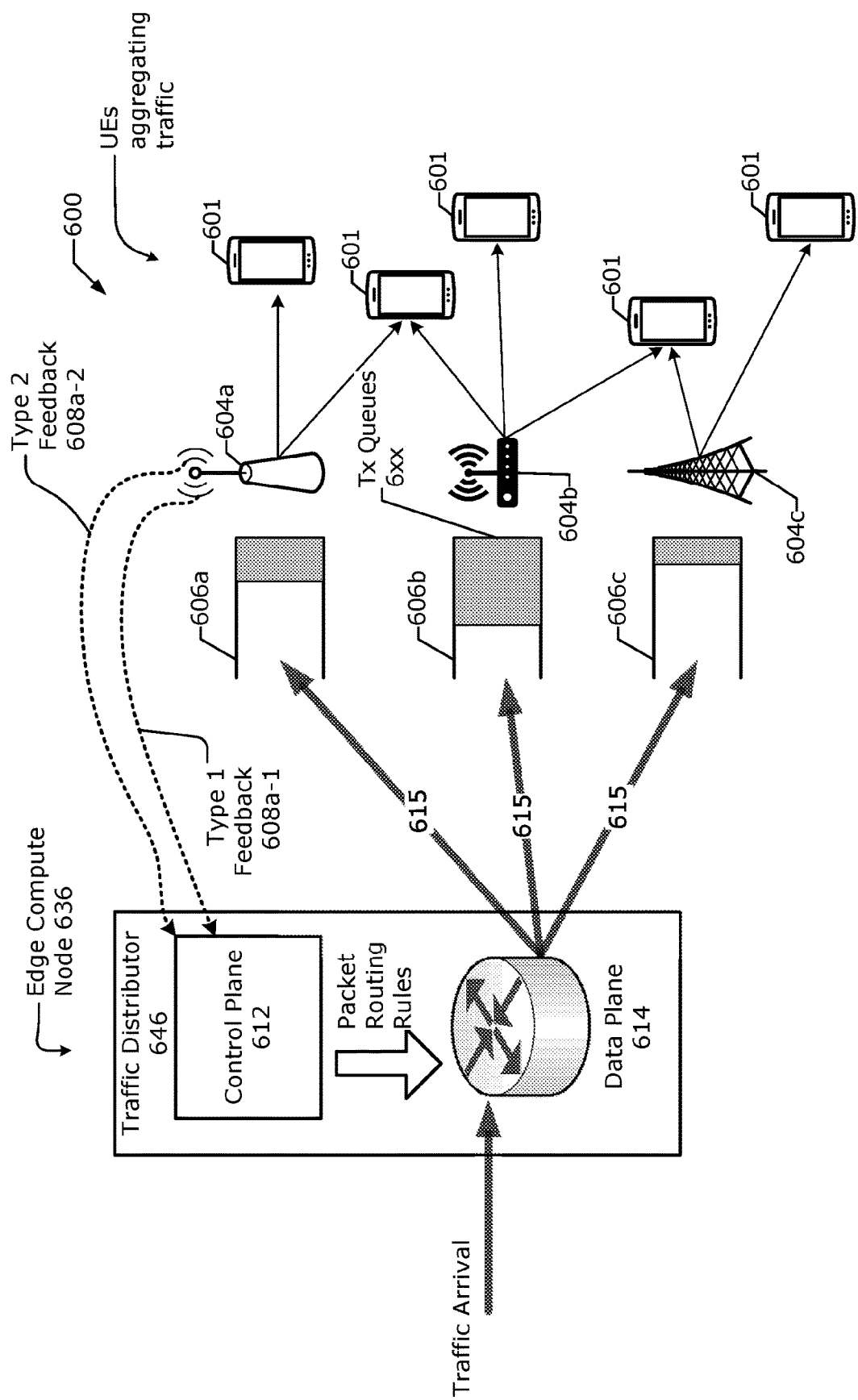
FIG. 6 illustrates an example heterogeneous multi-RAT network according to various embodiments.

FIG. 6 shows an example heterogeneous multi-RAT network 600 according to various embodiments. The multi-RAT network 600 includes multi-RAT last-hop connectivity and one or more UEs 601 (which may be the same or similar as compute nodes 101, 201, and 301 in FIGS. 1 2, and 3, respectively) with multiple radio interfaces. The one or more UEs 601 are connected with multiple different NANs 604a, 604b, and 604c (which may be the same or similar as any of NANs 204a, 204b, and 204c discussed previously). Each NAN 604a, 604b, and 604c has a respective RAT Tx queue 606a, 606b, and 606c (which may be the same or similar as RAT Tx queues 206a, 206b, and 206c discussed previously). The multi-RAT network 600 also includes an edge compute node 636 (e.g., which may be the same or similar as edge compute node 236 of FIG. 2) that utilizes a convergence technology (e.g., [MPTCP], [QUIC], [GMA], and/or the like) at a data plane entity 614 to route downlink packets and aggregate uplink traffic.

In the example of FIG. 6, application traffic arrives at the edge compute node 636, and the control plane entity 612 decides how to route the packets of the incoming traffic over the multiple paths 615. In embodiments, an intelligent traffic distributer 646 located at the edge compute node 636 computes traffic distribution decisions at (or in) the control plane entity 612. The intelligent traffic distributer 646 informs the data plane entity 614 and the one or more UEs 601 about how to route packets over multiple paths 615. The UEs 601 with multi-RAT connections eventually aggregate the traffic. The data plane entity 614 and the UEs 601 can utilize a convergence technology (e.g., [MPTCP], [QUIC], [GMA], and/or the like) to enable traffic splitting and aggregation. The UEs 602 with multi-RAT connections eventually aggregate the traffic. The UEs 602 can use the same or different convergence technology as the data plane entity 614.

The traffic distributor 646 at the control plane element 612 can collect feedback 608a-1 from wireless infrastructure (referred to as "type 1" feedback 608a-1) and/or feedback 608a-2 directly from the UEs 601 (referred to as "type 2" feedback 608a-2). Although FIG. 6 only shows feedback 608a-1 and 608a-2 associated with NAN 604a, the other NANs 604 and other UEs 601 may also provide type-1 and type-2 feedback 608 to the control plane element 612. The traffic distributor 646 (which may be a control plane element) also updates traffic distribution rules based on metrics derived from the various feedback 608.

In one example implementation, the intelligent traffic distributer 612 can be (or be part of) a MAMS server [MAMS] or the like. In any of the embodiments discussed herein, the exchange of data between compute nodes 601 and edge compute nodes 636 can be communicated according to the implemented edge system and/or communication protocols. Such communications techniques can be standardized or otherwise specified in a suitable edge computing standard, such as ETSI MEC (see e.g., ESTI Multi-access Edge Computing Standardization Group, available at: https://www.etsi.org/committee/mec ("[ETSIMEC]"), and FIGS. 23-41 and related discussion in [AC6388Z]), O-RAN alliance (see e.g., O-RAN Alliance, available at: https://www.o-ran.org/("[ORAN]"), and FIGS. 42-43 and related discussion in [AC6388Z]), and/or some other edge computing standards/specifications. Additionally or alternatively, the information needed to utilize the embodiments discussed herein can also be inspected/intercepted from respective edge compute nodes 602 and/or respective edge compute nodes 636. In any of the embodiments discussed herein, computation of utilization threshold-based traffic distribution may take place at the edge compute nodes 636. In some implementations, dedicated hardware at the compute nodes 601 and/or the edge compute node 636 can be utilized to run the utilization threshold-based traffic distribution algorithms discussed herein.

2.3. Utilization Threshold-Based Traffic Management Embodiments at Edge

Network Control-Plane

In various embodiments, a utilization threshold-based traffic distribution algorithm is used to manage traffic. The utilization threshold-based traffic distribution algorithm achieves good latency QoS. The utilization threshold-based traffic distribution algorithm steers as much traffic as possible towards a lowest backhaul latency RAT until that RAT's radio resource utilization level is so high that latency introduced by queueing starts to exceed the latency advantage from the backhaul.

2.3.1. Metrics and Parameters

According to various embodiments, the traffic distributor 646 at the control plane entity 612 obtains or derives different types of operational parameters (or combinations of operational parameters) and/or metrics of the compute nodes 601, NANs 604a, 604b, and 604c (collectively "NANs 604") and/or the edge compute node 636. The traffic distributor 646 uses the obtained/derived operational parameters and/or metrics for the utilization threshold-based traffic distribution embodiments. These operational parameters may be based on the type-1 and/or type-2 feedback 608 and/or local monitoring of traffic flows as discussed previously. The operational parameters for the compute nodes include any of the different types of operational parameters discussed previously and/or other like parameters/data.

In various embodiments, the traffic distributor 646 obtains or derives some or all of the following metrics and parameters based on the type-1 and/or type-2 feedback 608 and/or local traffic flow monitoring:

Utilization threshold for an individual $RAT_r$: $\rho_{TH,r}$. Embodiments for determining and/or obtaining the utilization threshold are provided infra.

Estimate of individual UE/flow traffic loading: $\gamma_i$. This metric can be obtained by monitoring traffic flows over the data plane and/or obtaining such information directly from applications. This metric can be used to estimate the per compute node 601 per RAT resource utilization level.

Resource utilization level of $UE_i$ with $RAT_r$: $\xi_{i,r}$. This metric may be obtained in a same or similar manner as discussed previously. For example, given per UE per RAT data rate ($R_{i,r}$), $$\xi_{i,r} = \frac{\gamma_i}{R_{i,r}}.$$

Backhaul delay for an individual $RAT_r$: $D_{B,r}$. In some embodiments, backhaul-delay can be the minimum delay measured for the individual $RAT_r$. In some embodiments, backhaul-delay can be estimated based on past delay measurements.

Intra-RAT per-UE sorting metric: $\beta_{i,r}$. This metric is used to determine which compute nodes 601 should be considered first for traffic distribution within a RAT. It may require other measurements for computing the sorting metric. As examples, the sorting metric can include one or a combination of the following metrics: signal strength and/or quality measurement(s) (e.g., RSSI, RSRQ, RSRP, etc.), interference measurements, and/or other like signal/channel or session-related measurements such as those discussed herein; estimated data rate for a given RAT (e.g., derived from the signal quality measurement(s) and/or provided by the network (e.g., NANs 604) and/or compute node 601); impact to RAT utilization level (e.g., $\beta_{i,r} = -\xi_{i,r}$), where compute nodes 601 with less impact are prioritized; resource utilization level of $UE_i$ with RAT r ($\xi_{i,r}$) ratio (e.g., $$\beta_{i,r} = \frac{\min_{r' \neq r} \xi_{i,r'}}{\xi_{i,r}})$$

where compute nodes 601 whose relative resource requirement for a current RAT is the lowest are prioritized and/or compared against other low resource requirement RATs; load adjusted β: this metric may include identifying one competing $$\hat{r} = \underset{r' \neq r}{\operatorname{argmin}} \xi_{i,r'},$$

wherein all above sorting metrics can be scaled by $\alpha(\Sigma_{i':R_{i',r}>0}(1-\Sigma_{r' \neq r}X_{i',r'}))$ to form new $\beta_{i,r}$, where $\alpha$ is an arbitrary scaling constant; and/or the like. In some embodiments, the sorting metric can be scaled with the remaining load of the competing RAT $\hat{r}$ (or "$RAT_{\hat{r}}$") ensures that remaining loads of higher backhaul latency RATs are balanced.

For purposes of the present disclosure, the notation "$RAT_r$" refers to both the access technology (RAT) used by an individual NAN 604 and the individual NAN 604 itself. For example, in a system with two LTE small cell BSs and 4 WiFi APs, there are a total of six "RATs" in the below formulation. To enforce the constraint that one compute node 601 (UE i) can only connect to one of the NANs 604 belonging to the same access technology, it can be set $\xi_{i,r} \leftarrow \infty$ or $R_{i,r} \leftarrow 0$ if $UE_i$ does not associate with a $RAT_r$. Also, i can be used to indicate different traffic flows.

With aforementioned metrics and parameters, the traffic distributor 646 can run/operate the utilization threshold-based traffic distribution algorithm to compute traffic distribution decision. In some embodiments, the traffic volume of a UE is the fraction of $UE_i$ traffic to be sent over $RAT_r$, which is denoted as $X_{i,r}$, for all compute nodes 601 (e.g., UEs) and RATs. Note that $0 \leq X_{i,r} \leq 1$ and $\Sigma_r X_{i,r} = 1$.

Any of the aforementioned operational parameters may be measured or otherwise determined stochastically or deterministically. The stochastic operational parameters (or stochastic components of the operational parameters) may be randomly determined or measured, or may have a random probability distribution or pattern that is analyzed statistically but may not be predicted precisely. The deterministic operational parameters (or deterministic components of the operational parameters) may be measurements or information produced without randomness. In other words, the deterministic operational parameters, when measured or determined, are likely to produce the same outcome given a particular situation and/or context.

Embodiments for deriving the utilization threshold are discussed infra. Other metrics/operational parameters may be obtained, derived, and/or otherwise made available at the edge traffic distributor 646 using existing mechanisms. In some implementations, the compute nodes may identify, determine, or obtain operational parameters/metrics using suitable APIs, application binary interfaces (ABIs), middleware, drivers, configuration files, trusted application(s), RF measurement mechanisms (e.g., as defined by suitable standards or specifications), and/or other like mechanisms to obtain or identify their respective operational parameters. In MEC-based implementations, some or all of the operational parameters may be obtained via appropriate MEC APIs (e.g., [MEC011], [MEC012], [MEC013], [MEC014], [MEC015], [MEC028], [MEC029], [MEC030], and the like).

In some implementations, new signaling and/or messages is/are defined to collect the operational parameters/metrics. This new signaling can be proprietary or standardized via [ORAN], 3GPP, ETSI (e.g., [ETSIMEC]), [OPENNESS], [MAMS], and/or the like. The traffic distribution intelligence can be part of the edge (e.g., MEC) platform or from edge applications (e.g., MEC apps). In MEC implementations, new MEC API message(s) can be defined to pass the new measurement signaling to traffic management MEC App.

2.3.2. Utilization Threshold-Based Traffic Management Algorithm Aspects

Figure 7A:
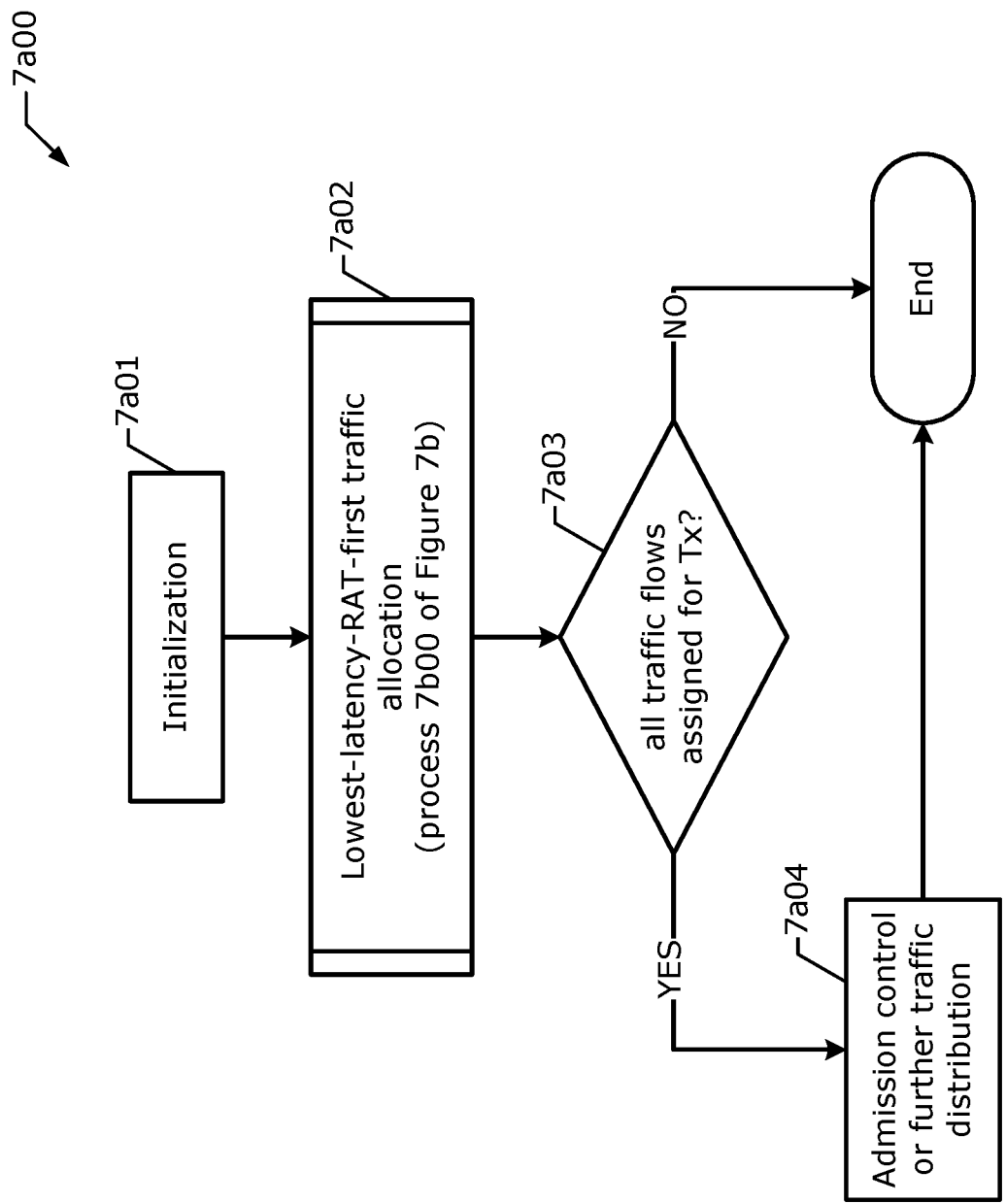
FIGS. 7a, 7b, 7c illustrate an example utilization-threshold delay-aware traffic distribution processes according to various embodiments.
Figure 7B:
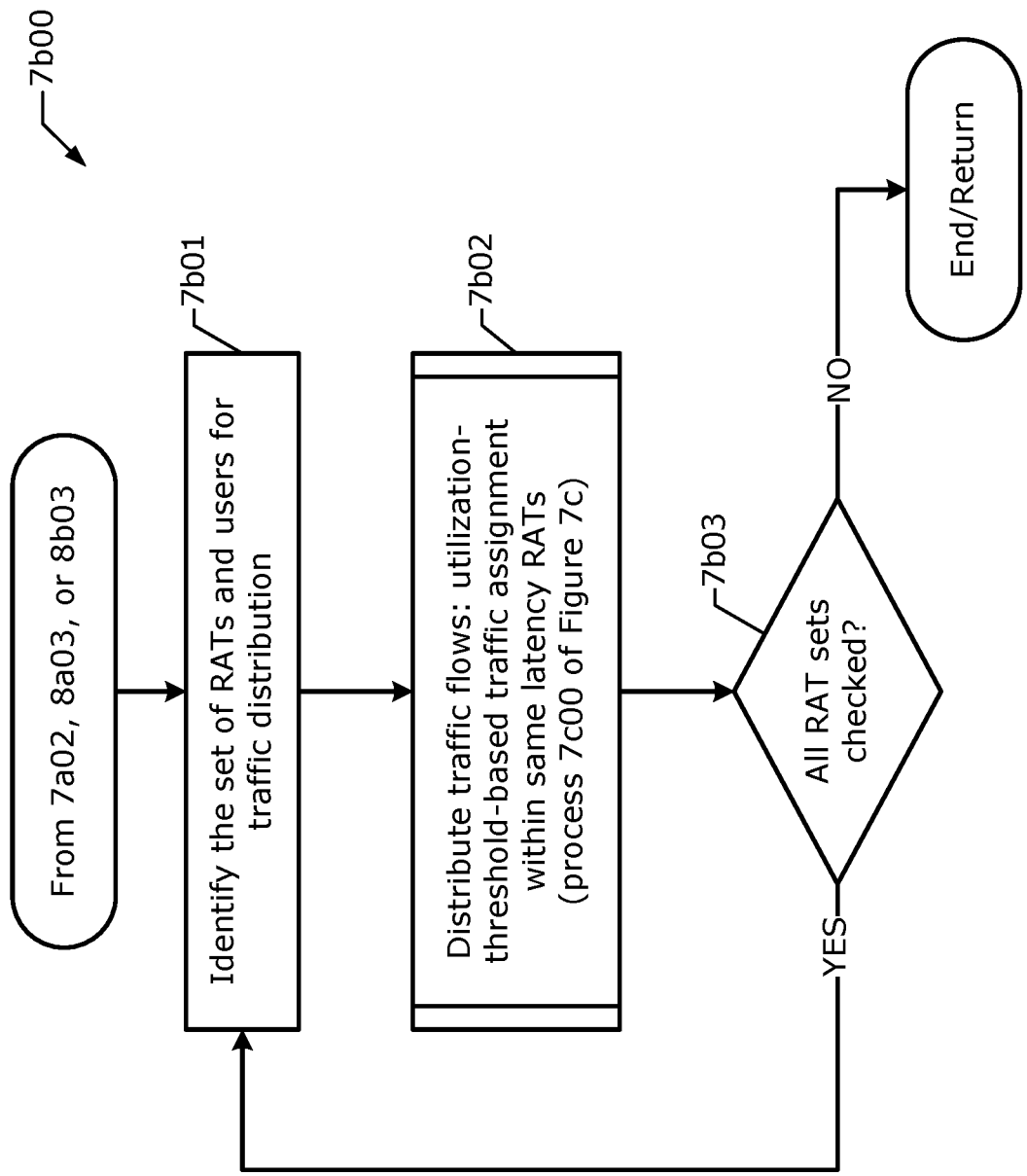

FIGS. 7a, 7b, and 7a illustrate example utilization-threshold delay-aware traffic distribution processes 7a00, 7b00, and 7c00 according to various embodiments. Process 7a00 is the overall utilization-threshold delay-aware traffic distribution process. In embodiments, the traffic distributor 646 may perform processes 7a00, 7b00, and 7c00, however, in other embodiments some other entity/element may perform processes 7a00, 7b00, and 7c00. Process 7b00 is a lowest-latency-RAT-first traffic distribution RAT prioritization process. Here, the "latency" is dominated by backhaul, and does not take into account queueing. Process 7c00 is a utility-threshold-based traffic allocation process within same latency-RATs, where compute nodes 601 are sorted within a same latency-RAT group to perform utilization-threshold-based traffic assignment.

Referring to FIG. 7a, process 7a00 begins at operation 7a01 where the traffic distributor 646 performs initialization. In embodiments, the initialization (operation 7a01) includes the traffic distributor 646 grouping RATs with the same estimated backhaul delay, for example:

$$\text{for } r' \in \mathcal{S}_m, D_{B,r'} = D_{B,\mathcal{S}_m}$$

Then, the traffic distributor 646 sorts RAT sets in ascending order of backhaul delay, for example:

$$D_{B,\mathcal{S}_1} < D_{B,\mathcal{S}_2} < \ldots < D_{B,\mathcal{S}_M}$$

wherein M is the number of RAT sets, and m is a RAT set of the M RAT sets. Next, the traffic distributor 646 constructs a set of UEs 601 with traffic to send, for example:

$$\mathcal{U} \leftarrow \{i' | \gamma_{i'} > 0\}$$

Then, the traffic distributor 646 derives individual RAT utilization threshold based backhaul delay statistics and traffic QoS requirements: $\rho_{TH,r'}$. Then, the traffic distributor 646 initializes $X_{i',r'} \leftarrow 0$, $\forall i',r'$. In some embodiments, operation 7a01 can be extended to scenarios where some traffic has a predetermined allocation and the algorithm is only used to distribute remaining traffic. For such embodiments, the traffic distributor 646 updates $X_{i',r'}$ according to the predetermined allocation and updates the UE set as follows: $\mathcal{U} \leftarrow \{i' | \gamma_{i'}'(1-\Sigma_r X_{i',r'}) > 0\}$.

At operation 7a02, the traffic distributor 646 performs a lowest-latency-RAT-first traffic allocation process (e.g., process 7b00 of FIG. 7b). In embodiments, operation 7a02 involves setting m←1, and then the traffic distributor 646 proceeds to process 7b00, which is described infra with respect to FIG. 7b.

At operation 7a03, the traffic distributor 646 determines if all traffic flows are assigned for transmission. In embodiments, if $\Sigma_{i \in \mathcal{U}} (1-\Sigma_r X_{i,r}) > 0$, then there is still remaining traffic to be sent, and the traffic distributor 646 proceeds to operation 7a04; else ($\Sigma_{i \in \mathcal{U}} (1-\Sigma_r X_{i,r}) = 0$), then all traffic is allocated and the traffic distributor 646 ends process 7a00.

At operation 7a04, the traffic distributor 646 performs admission control or continues to distribute remaining traffic, depending on rules and/or implementation. Possible implementations of step operation 7a04 can include allowing UEs 601 with remaining traffic perform client-based dynamic traffic splitting algorithm as discussed in U.S. Provisional App. No. 63/025,086 filed 14 May 2020 ("[AC6987Z]"). Additionally or alternatively, implementations of step operation 7a04 can include distributing remaining traffic with the objective to minimize the maximal RAT resource utilization (e.g., using a suitable objective function) as discussed in section "EDGE-BASED DELAY-AWARE MULTI-RAT TRAFFIC MANAGEMENT EMBODIMENTS."

Additionally or alternatively, implementations of step operation 7a04 can include performing traffic admission control. For example, scaling down traffic volume for all flows by a certain ratio, and then perform the overall utilization-threshold-based delay-aware traffic distribution algorithm again.

Referring to FIG. 7b, the Lowest-latency-RAT-first Traffic Distribution process 7b00 begins at operation 7b01 where the traffic distributor 646 performs identifies the set of RATs and UEs 601 for traffic distribution, which may be as follows:

$$\mathcal{S}' \leftarrow \mathcal{S}_m$$

$$\mathcal{U}' \leftarrow \{i' | i' \in \mathcal{U}', \Sigma_r X_{i',r'} < 1 \text{ and } \Sigma_{r' \in \mathcal{S}'} R_{i',r'} > 0\}:$$

In the above equations, constraint $\Sigma_r X_{i',r'} < 1$ indicates $UE_i'$ has remaining traffic for distribution, and constraint $\Sigma_{r' \in \mathcal{S}'} R_{i',r'} > 0$ indicates UE has non-zero rate for at least one of the RATs within $\mathcal{S}'$, (e.g., $UE_i'$ is associated to/with at least one of the RATs within $\mathcal{S}'$).

Figure 7C:
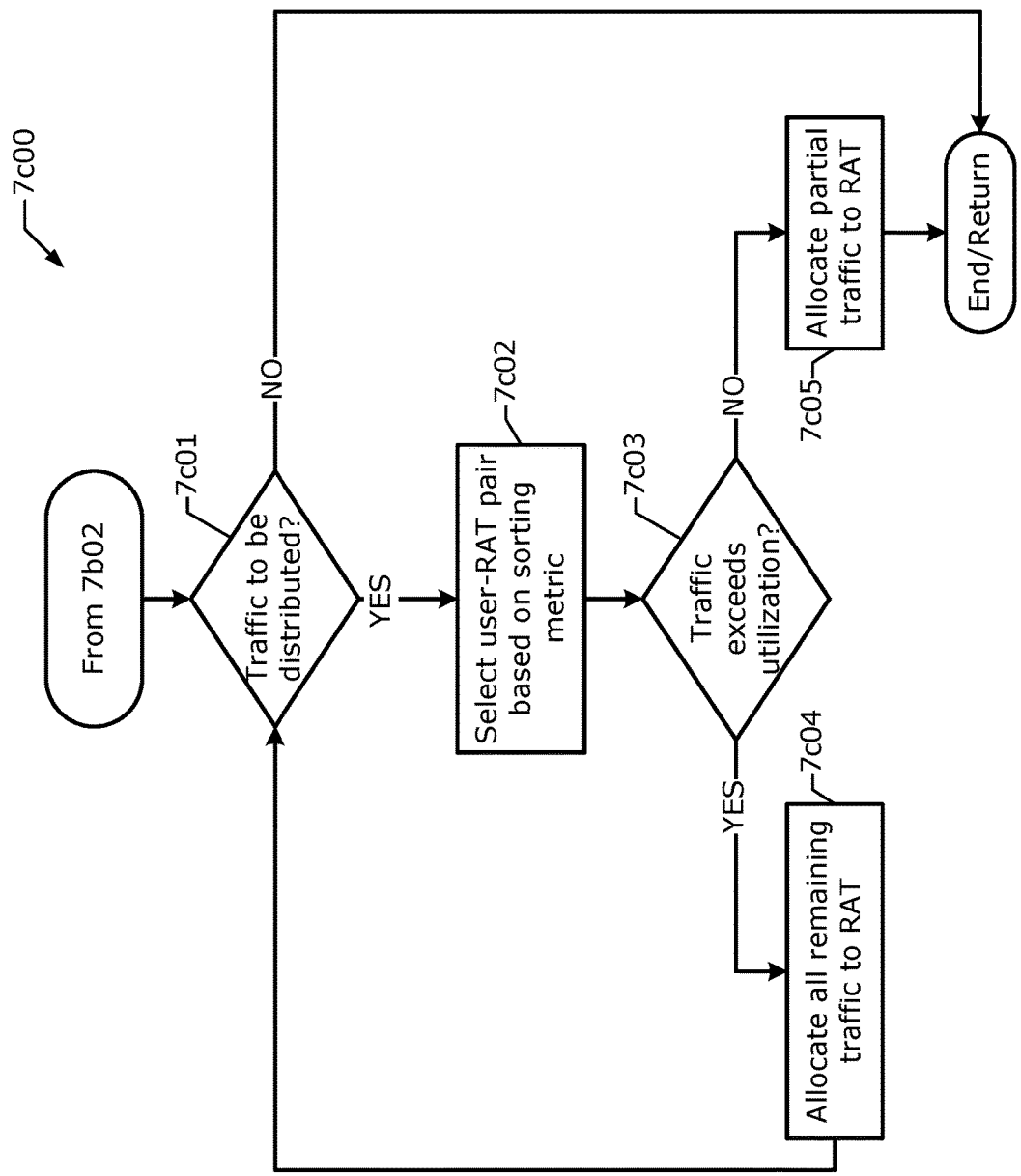

At operation 7b02, the traffic distributor 646 distributes traffic flows to individual RATs and/or UEs by performing a utilization-threshold-based traffic assignment within same latency RATs process (e.g., process 7c00 of FIG. 7c discussed infra).

At operation 7b03, the traffic distributor 646 determines if all RAT sets are checked. In embodiments, if m<M, the traffic distributor 646 checks the next RAT set (e.g., m←m+1) by proceeding back to operation 7b01; else (m=M), which means all RATs are checked, and therefore, the traffic distributor 646 ends process 7b00 and proceeds to operation 7a03 of process 7a00 (see e.g., FIG. 7a).

Referring to FIG. 7c, the Utilization-threshold-based Traffic Assignment within same latency RATs process 7c00 begins at operation 7c01 where the traffic distributor 646 determines if there is traffic to be distributed within a current RAT set. In embodiments, if $|\mathcal{U}'| > 0$, then the traffic distributor 646 proceeds to operation 7c02; else, there is no traffic for distribution over current RAT set, and therefore, the traffic distributor 646 ends process 7c00 and proceeds back to operation 7b03 of process 7b00 (see e.g., FIG. 7b).

At operation 7c02, the traffic distributor 646 selects a (UE, RAT) pair based on sorting metric β, for example:

$$(i, r) \leftarrow \arg\max_{i' \in \mathcal{U}', r' \in \mathcal{S}'} (\beta_{i',r'})$$

At operation 7c03, the traffic distributor 646 determines if assigning all remaining traffic of $UE_i$ to $RAT_r$ would exceed a utilization threshold for $RAT_r$. For example:

if $(1-\Sigma_r X_{i,r}) \xi_{i,r} \leq \rho_{TH,r} - \rho_r$, then the traffic distributor 646 assigns all $UE_i$ traffic to $RAT_r$, and the traffic distributor 646 assigns proceeds to operation 7c04; else, the traffic distributor 646 assigns partial $UE_i$ traffic to $RAT_r$ and proceeds to operation 7c05. In some embodiments, there can be alternative implementation of operation 7c03 to avoid traffic splitting (see e.g., the second variation (var2) discussed infra.)

At operation 7c04, the traffic distributor 646 allocates all remaining UE$_i$ traffic to RAT$_r$ and updates ρ$_r$ and $\mathcal{U}'$, for example:

$$\rho_r \leftarrow \rho_r + (1 - \Sigma_{r'} X_{i,r'}) \xi_{i,r}$$

$$X_{i,r} \leftarrow X_{i,r} + \left(1 - \sum_{r'} X_{i,r'}\right)$$

Then, the traffic distributor 646 removes UE$_i$ from set $\mathcal{U}'$, and continues to distribute traffic by proceeding back to operation 7c01.

At operation 7c05, the traffic distributor 646 allocates partial UE$_i$ traffic to RAT$_r$ until utilization threshold, for example:

$$X_{i,r} \leftarrow X_{i,r} + \frac{\rho_{TH,r} - \rho_r}{\xi_{i,r}}$$

$$\rho_r \leftarrow \rho_{TH,r}.$$

When the traffic distributor 646 reaches the utilization threshold, the traffic distributor 646 ends process 700c and returns to operation 7b03 of process 7b00 (see e.g., FIG. 7b).

Variations of process 7c00 include a first variation (var1), a second variation (var2), and a third variation (var3). Var1 involves scenarios with more than one (UE, RAT) pairs having the largest β metric. In a first option of var1, the traffic distributor 646 randomly selects one of the (UE, RAT) pairs. In a second option of var1, the traffic distributor 646 selects one of the (UE, RAT) pairs based on secondary sorting metric. In a first example, the secondary sorting metric may be a least utilization impact, such as:

$$\min(1 - \Sigma_{r'} X_{i,r'}) \xi_{i,r}.$$

In a second example, the secondary sorting metric may be a most utilization margin before assignment, for example:

$$\max(\rho_{TH,r} - \rho_r).$$

In a third example, the secondary sorting metric may be the most utilization margin after assignment, for example:

$$\max\left(\rho_{TH,r} - \rho_r - \left(1 - \sum_{r'} X_{i,r'}\right) \xi_{i,r}\right)$$

Var2 involves minimizing reordering delay to avoid partial traffic allocation. In var2, the else condition portion of operation 7c03 may be modified by directly ending process 7c00 and returning back to operation 7b03 of process 7b00. Alternatively, the else condition portion of operation 7c03 may be modified by skipping UE$_i$ and continuing to assign traffic, such as, for example, removing UE$_i$ from set $\mathcal{U}'$ and proceeding back to operation 7c01.

Var3 involves scenarios where the sorting metric β also reflects loading condition, and in such scenarios, extra steps may be required in operation 7c04 and operation 7c05 to update β. In one example, the recalculation of traffic distribution rules can be periodic or trigger-based. The trigger may be, for example, detection of substantial change in $\xi_{i,r}$ metrics ($|\Delta\xi_{i,r}| > \varepsilon_\xi$), detection of substantial change in $\beta_{i,r}$ metrics ($|\Delta\beta_{i,r}| > \varepsilon_\beta$), and/or the like. Additionally or alternatively, traffic distribution decisions may be provided to the data plane (via internal edge network (e.g., MEC) signaling) and UEs (e.g., via UE plane message exchange) so traffic can be forwarded accordingly.

Figure 8A:
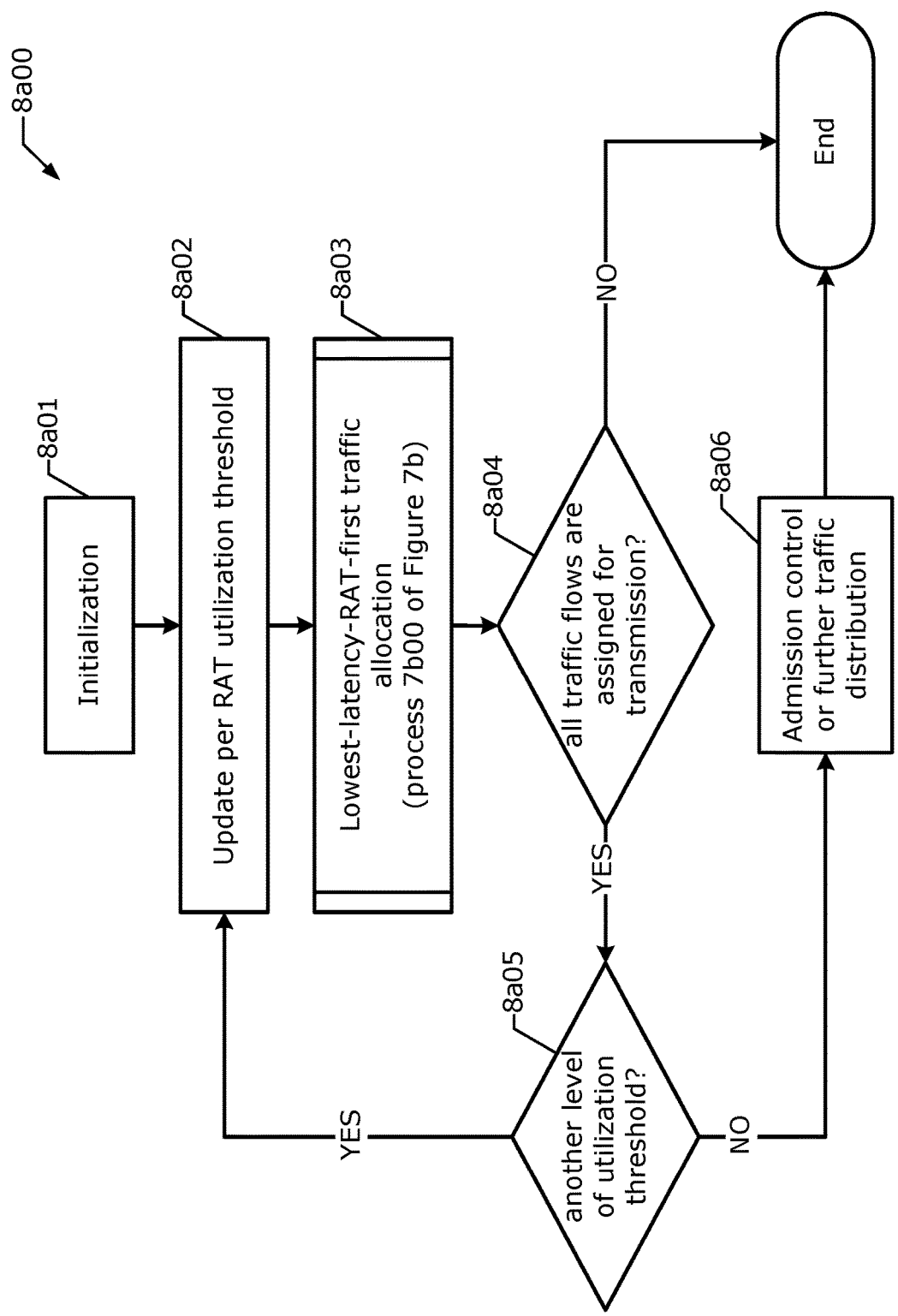
FIGS. 8a and 8b illustrate an example multi-utilization-threshold-level traffic distribution process and a multi-traffic-class traffic distribution process according to various embodiments.
Figure 8B:
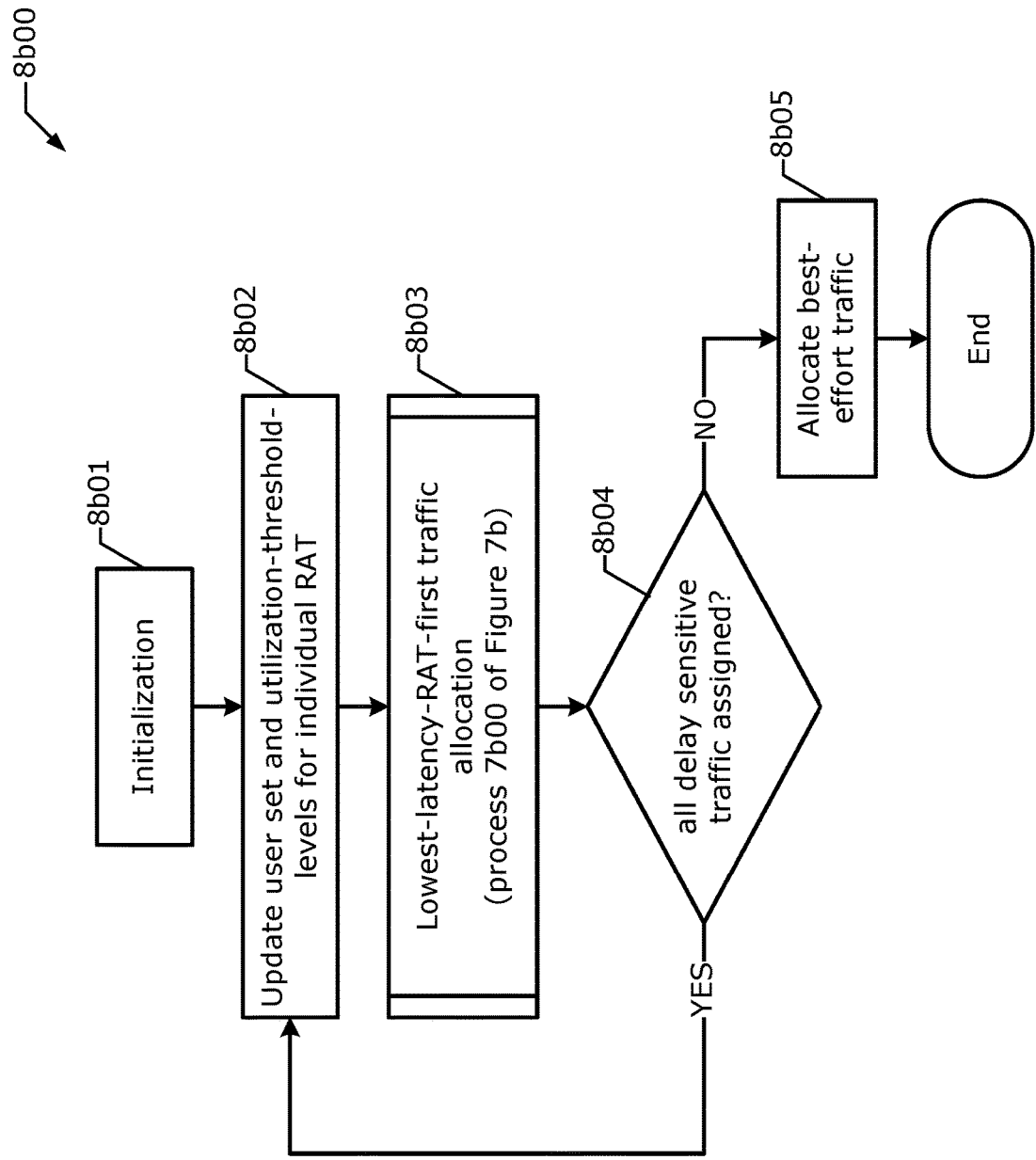

2.3.3. Extension/Adaptations of the Utilization Threshold-Based Traffic Management Embodiments FIGS. 8a and 8b illustrate an extension of the utilization-threshold-based delay-aware traffic distribution processes, according to various embodiments. In particular, FIG. 8a shows an example multi-utilization-threshold-level traffic distribution process 8a00 and FIG. 8b shows an example multi-traffic-class extension process 8b00.

2.3.3.1. Multi-Threshold Embodiments

Process 8a00 is an adaptation or extension of the overall process 7a00 of FIG. 7a into multi-threshold-level traffic distribution algorithm. Process 8a00a begins at operation 8a01 where initialization takes place. Operation 8a01 is the same as operation 7a01 except the utilization threshold derivation portion is different. For example, the utilization threshold derivation portion may involve the traffic distributor 646 deriving one or more multi-level per RAT utilization thresholds based backhaul delay statistics and traffic QoS, for example:

$$\{TH_{r,n}\}, n=1 \sim N$$

Set n←1.

where $TH_{r,n'} < TH_{r,n'+1}$ and N is the number of total threshold levels. At operation 8a02, the traffic distributor 646 updates the per RAT utilization threshold, for example:

$$\rho_{TH,r'} \leftarrow TH_{r',n} \forall r'$$

At operation 8a03, the traffic distributor 646 performs a lowest-latency-RAT-first traffic allocation process in the same or similar manner as operation 7a02 (e.g., performing process 7b00 of FIG. 7b). After completion of process 7b00, the traffic distributor 646 proceeds to operation 8a04.

At operation 8a04, the traffic distributor 646 determines if all traffic flows are assigned for transmission. In embodiments, if $\Sigma_{i \in \mathcal{U}} (1 - \Sigma_{r'} X_{i,r'}) > 0$, then there is still remaining traffic to be sent, and then the traffic distributor 646 proceeds to operation 8a05; else ($\Sigma_{i \in \mathcal{U}} (1 - \Sigma_{r'} X_{i,r'}) = 0$), which means that all traffic is allocated, and therefore, the traffic distributor 646 ends process 8a00.

At operation 8a05, the traffic distributor 646 determines if there is another level of utilization threshold. In embodiments, if n<N, then the traffic distributor 646 allocates traffic based on next utilization-threshold-level, sets n←n+1, and then proceeds back to operation 8a02. Otherwise, all threshold-levels are used, and the traffic distributor 646 proceeds to operation 8a06. At operation 8a06, the traffic distributor 646 performs admission control or continues to distribute remaining traffic, depending on rules and/or implementation. Operation 8a06 may be performed in a same or similar manner as operation 7a04.

Process 8a00 is a special case of the multi-threshold-level traffic distribution process 7a00 (e.g., the special case may be: (N=1)).

2.3.3.2. Multi-Traffic Class Embodiments

FIG. 8b illustrates an example multi-traffic-class traffic distribution process 8b00 according to various embodiments. Process 8b00 is an adaptation/extension of the utilization-threshold-based delay-aware traffic distribution process 7a00 for use in systems with multi-traffic class. This embodiment considers the case when there are a total of L classes of traffic (where L is a number). The first L−1 classes are delay-sensitive traffic and the last class is best-effort traffic. Smaller classes of traffic have higher priority to be transmitted than higher classes of traffic. may operate as follows:

Process 8b00 begins at operation 8b01 where initialization takes place. Operation 8b01 is similar to operation 7a01, except for the user set initialization and the utilization threshold derivation portions may be somewhat different. For the user set initialization, the traffic distributor 646 constructs the set of UEs/flows for each class of traffic, for example:

$\mathcal{U}_l \leftarrow \{i' | \gamma_i > 0$ and user i' traffic belongs to traffic class l$\}$.

Additionally, the traffic distributor 646 constructs L−1 sets of utilization threshold levels, for example:

$\{TH_{r,n}\}_l, l=1 \sim L-1$.

Then, the traffic distributor 646 starts from the top priority traffic class: $l \leftarrow 1$.

At operation 8b02. Update user set and utilization-threshold-levels for individual RAT:

$\mathcal{U} \leftarrow \mathcal{U}_l$ $\{TH_{r,n}\} \leftarrow \{TH_{r,n}\}_l$

At operation 8b03, the traffic distributor 646 performs a lowest-latency-RAT-first traffic allocation process in the same or similar manner as operation 7a02 (e.g., performing process 7b00 of FIG. 7b). In some embodiments, the traffic distributor 646 performs process 7b00 for a single-threshold-level. In other embodiments, the traffic distributor 646 sets $n \leftarrow 1$ and performs operation 8a02 (e.g., process 7b00 for multi-threshold-level), and then proceeds to operation 8b04.

At operation 8b04, the traffic distributor 646 determines if all delay sensitive traffic is assigned. In embodiments, if l<L−1, the traffic distributor 646 distributes delay sensitive traffic of a next priority: $l \leftarrow l+1$, and proceeds to operation 8b02. Otherwise, all delay sensitive traffic is assigned, and therefore, the traffic distributor 646 starts to distribute best effort traffic at operation 8b05. In one example, the algorithm described in [SINGH] can be used for distributing best effort traffic. After distribution of best effort traffic at operation 8b05, the traffic distributor 646 ends process 8b00.

2.4. Embodiments for Deriving Utilization Level Threshold

Embodiments for deriving the utilization level threshold $\rho\_(TH,r)$ include model-based utilization threshold derivation embodiment, an observation and learning embodiment, and a combination of these embodiments.

The first embodiment involves model-based utilization threshold derivation. The utilization level threshold can be approximated by solving the delay optimization problem (see e.g., section EDGE-BASED DELAY-AWARE MULTI-RAT TRAFFIC MANAGEMENT EMBODIMENTS ). For example, if the average system queue delay is a function of utilization level, $Q(\rho)$, the average per file delay for $RAT_r$ is:

$$\frac{1}{\left(\sum_{i:R_{i,r}>0} X_{i,r} \lambda_i\right)} Q_r(\rho_r) + D_{B,r}$$

In the above equation, $\lambda_i$ is the file arrival rate of user i. For example, for M/M/1 traffic arrival/departure model:

$$Q(\rho) = \frac{\rho}{1-\rho}.$$

Based on the optimization problem formulation, solve for the utilization threshold for low latency RAT such that latency introduced by queueing exceeds delay difference between low and high latency RATs. Consider two RAT systems with low latency $RAT_r$ and high latency $RAT_s$ with delay difference $\Delta D = D_{B,s} - D_{B,r}$.

Optimization objective 1: minimization of the maximal average per file delay of the two RATs. Here, $\rho_{TH,r}$ is derived via solving:

$$\frac{1}{\left(\sum_{i:R_{i,r}>0} \lambda_i\right)} Q_r(\rho_{TH,r}) = \Delta D \Rightarrow \rho_{TH,r} = Q_r^{-1}\left(\left(\sum_{i:R_{i,r}>0} \lambda_i\right) \Delta D\right),$$

where $Q_r^{-1}(\cdot)$ is the inverse function of $Q_r(\cdot)$.

$$M/M/1 \text{ example}: \rho_{TH,r} = \frac{\left(\sum_{i:R_{i,r}>0} \lambda_i\right) \Delta D}{1 + \left(\sum_{i:R_{i,r}>0} \lambda_i\right) \Delta D}.$$

Optimization objective 2: minimization of average per file delay of both RATs. Here, $\rho_{TH,r}$ is derived via solving:

$$Q_r'(\rho_{TH,r}) = \Delta D\left(\sum_{i:R_{i,r}>0} \lambda_i\right),$$

where $Q_r'(\cdot)$ is the derivative of $Q_r(\cdot)$. $\Rightarrow \rho_{TH,r} =$ $Q_r'^{-1}\left(\left(\sum_{i:R_{i,r}>0} \lambda_i\right) \Delta D\right)$, where $Q_r'^{-1}(\cdot)$ is the inverse of $Q_r'(\cdot)$.

$$M/M/1 \text{ example}: \rho_{TH,r} = \frac{\sqrt{\left(\sum_{i:R_{i,r}>0} \lambda_i\right) \Delta D} - 1}{\sqrt{\left(\sum_{i:R_{i,r}>0} \lambda_i\right) \Delta D}}$$

For other optimization objectives, similar equations can be derived to compute $\rho_{TH,r}$.

The above examples show how the threshold for the lower latency RAT can be computed. For general multi-RAT systems, the following can be changed:

$\Delta D = D\_Target - D\_(B,r)$, where $D\_Target$ is the queueing plus backhaul delay latency target for the system.

The above examples also included "M/M/1 examples." In queueing theory, an M/M/1 queue represents a queue length in a system having a single server (e.g., edge compute node 636). An M/M/1 queue is a stochastic process whose state space is the set $\{0,1,2,3,\ldots,\}$ where the value corresponds to the number of UEs and/or RATs in the system (e.g., system 600). Arrivals occur at rate $\lambda$ according to a Poisson process and move the process from state i to i+1, and job service times have an exponential distribution with a rate parameter $\mu$ (where $1/\mu$ is the mean service time). The server (e.g., edge compute node 636) serves clients (e.g., the NANs 604 and/or UEs 601) one at a time from the front of the queue according to a first-come first-served (FIFO) scheme. When the service is complete the client leaves the queue and the number of clients in the system reduces by one. In other implementations, a different queueing model may be used, such as using an M/M/c queueing model where multiple edge servers are involved.

The second embodiment involves using Observation and Learning to obtain utilization threshold. This approach may require signaling exchange(s) between the traffic distributor 646 and Tx/Rx-end. Signaling between UE 601 and traffic distributor 646 can be realized via data plane message exchange as described in [GMA]. Signaling between the edge data plane 614 and traffic distributor 646 can involve internal signaling, suitable APIs, and/or other connectors.

In embodiments, the Rx-end monitors one-way-delay (OWD) for received packets. Based on reporting rules provided by the traffic distributor 646, the Rx-end notifies the traffic distributor 646 when a predefined OWD condition is met. The traffic distributor 646 then maps the OWD conditions with RAT utilization level(s) from the NANs' 604 feedback and/or from local estimation, and constructs a look-up table mapping the RAT utilization level(s) and OWD conditions. With proper selection of OWD conditions for reporting, entries in this look-up table can be used to derive utilization level threshold(s).

In embodiments, the traffic distributor 646 signals measurement configurations for (1) the number of packets to be sent with time stamps for OWD measurements and (2) reporting rules.

The configuration for number of packets to be sent with time stamps for OWD measurements can include or indicate (a) the exact number of packets with timestamps within certain time interval, and/or (b) a percentage of packets with timestamps. The traffic distributor 646 can change this configuration based on confidence levels of entries in the OWD-Utilization look-up table and current loading levels. In a first example, the traffic distributor 646 indicates that more packets with timestamps for measurement when all entries of the OWD-Utilization look-up table are unknown. In a second example, the traffic distributor 646 increases the number of packets with timestamps when RAT utilization is close to one of the OWD conditions utilization values in the table. In a third example, the traffic distributor 646 increases the number of packets with timestamps when RAT utilization is close to one of the OWD conditions/utilization values in the table and the age of that entry is old. In a fourth example, the traffic distributor 646 decreases the number of packets with timestamps when all entries of the look-up table are fresh. Note: age info (e.g., a last update time) for table entries may be required.

The configuration for the reporting rules can include OWD conditions for reporting. In a first example, the OWD conditions for reporting can include x out of y packets exceed certain delay target (e.g., $OWD > OWD_{min} + D_{target}$. Where $OWD_{min}$ is the minimum past OWD measurement), where x and y are configurable numbers. In a second example, the OWD conditions for reporting can include a moving average of OWD exceeding a certain threshold (e.g., $OWD_{avg} > OWD_{min} + D_{target}$). In this example, the traffic distributor 646 may also provide the averaging configurations such as window size or autoregression factor(s). In a second example, the OWD conditions for reporting can include detecting a relatively rapid increase in OWD measurement (e.g., $OWD_i > OWD_{i-1} + \delta$). In these embodiments, the Rx-end can send a warning message when one or some of the aforementioned conditions are met. The Rx-end can further provide recent OWD measurements to the traffic distributor 646.

Alternatively, an individual RAT monitor queueing delay could be used, and the mapping (Queuing Delay-Utilization look up table) between queuing delay and utilization level can be learned. In this alternative implementation, local scheduler of individual NANs 604 measures an average waiting time of individual packets (e.g., starting from when packet arrives at local NANs 604 to a time when the packet is scheduled for over-the-air transmission) and measures percentage of radio resources being utilized for transmission. Individual NANs 604 may then create a queueing delay and utilization level mapping table and provide an entire or partial table to the edge compute node 636.

The third embodiment is a combination of the first and second embodiments discussed previously. In this embodiment, the model-based approach is used to approximate utilization thresholds initially, and the second embodiment uses observation plus learning approach to update the thresholds.

3. Example Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, the embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

Figure 9:
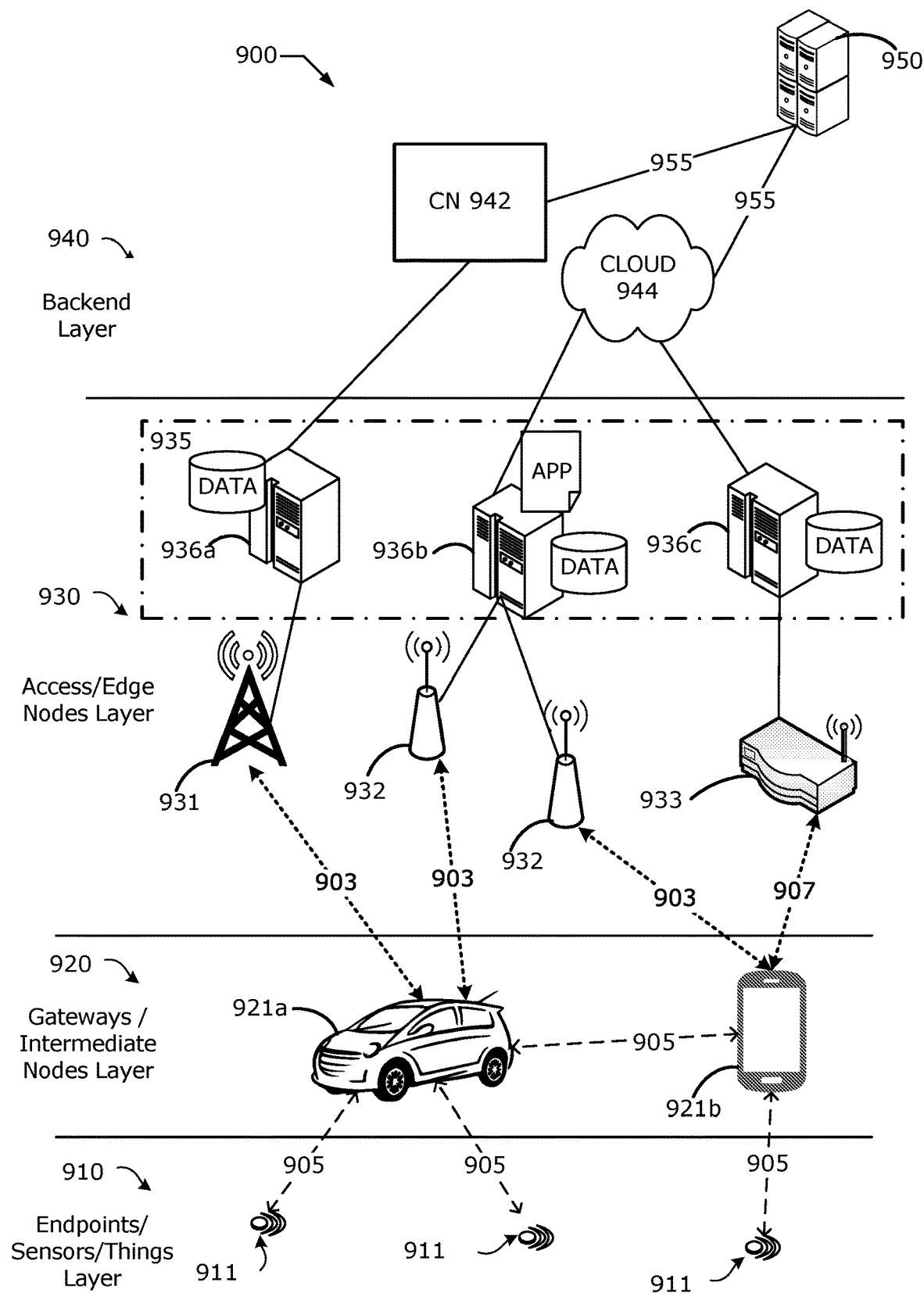
FIG. 9 illustrates an example edge computing environment in accordance with various embodiments.

FIG. 9 illustrates an example edge computing environment 900 in accordance with various embodiments. FIG. 9 specifically illustrates the different layers of communication occurring within the environment 900, starting from endpoint sensors or things layer 910 (e.g., operating in an Internet of Things (IoT) network topology) comprising one or more IoT devices 911 (also referred to as edge endpoints 910 or the like); increasing in sophistication to gateways or intermediate node layer 920 comprising one or more user equipment (UEs) 921a and 921b (also referred to as intermediate nodes 920 or the like), which facilitate the collection and processing of data from endpoints 910; increasing in processing and connectivity sophistication to access node layer 930 (or "edge node layer 930") comprising a plurality of network access nodes (NANs) 931, 932, and 933 (collectively referred to as "NANs 931-933" or the like) and a plurality of edge compute nodes 936a-c (collectively referred to as "edge compute nodes 936" or the like) within an edge computing system 935; and increasing in connectivity and processing sophistication to a backend layer 910 comprising core network (CN) 942 and cloud 944. The processing at the backend layer 910 may be enhanced by network services as performed by a remote application server 950 and/or other cloud services. Some or all of these elements may be equipped with or otherwise implement some or all aspects of the various embodiments discussed herein.

The environment 900 is shown to include end-user devices, such as intermediate nodes 920 and endpoints 910, which are configured to connect to (or communicatively couple with) one or more multiple communication networks (also referred to as "access networks," "radio access networks," or the like) based on different access technologies (or "radio access technologies") for accessing application services. These access networks may include one or more of NANs 931, 932, and/or 933. The NANs 931-933 are arranged to provide network connectivity to the end-user devices via respective links 903, 907 between the individual NANs and the one or more UEs 911, 921.

As examples, the communication networks and/or access technologies may include cellular technology such as LTE, MuLTEfire, and/or NR/5G (e.g., as provided by Radio Access Network (RAN) node 931 and/or RAN nodes 932), WiFi or wireless local area network (WLAN) technologies (e.g., as provided by access point (AP) 933 and/or RAN nodes 932), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 920 include UE 921a and UE 921b (collectively referred to as "UE 921" or "UEs 921"). In this example, the UE 921a is illustrated as a vehicle UE, and UE 921b is illustrated as a smartphone (e.g., handheld touchscreen mobile computing device connectable to one or more cellular networks). However, these UEs 921 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 910 include UEs 911, which may be IoT devices (also referred to as "IoT devices 911"), which are uniquely identifiable embedded computing devices (e.g., within the Internet infrastructure) that comprise a network access layer designed for low-power IoT applications utilizing short-lived UE connections. The IoT devices 911 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 911 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 911 can utilize technologies such as M2M or MTC for exchanging data with an MTC server (e.g., a server 950), an edge server 936 and/or edge computing system 935, or device via a PLMN, ProSe or D2D communication, sensor networks, or IoT networks. The M2M or MTC exchange of data may be a machine-initiated exchange of data.

The IoT devices 911 may execute background applications (e.g., keep-alive messages, status updates, etc.) to facilitate the connections of the IoT network. Where the IoT devices 911 are, or are embedded in, sensor devices, the IoT network may be a WSN. An IoT network describes an interconnecting IoT UEs, such as the IoT devices 911 being connected to one another over respective direct links 905. The IoT devices may include any number of different types of devices, grouped in various combinations (referred to as an "IoT group") that may include IoT devices that provide one or more services for a particular user, customer, organizations, etc. A service provider (e.g., an owner/operator of server 950, CN 942, and/or cloud 944) may deploy the IoT devices in the IoT group to a particular area (e.g., a geolocation, building, etc.) in order to provide the one or more services. In some implementations, the IoT network may be a mesh network of IoT devices 911, which may be termed a fog device, fog system, or fog, operating at the edge of the cloud 944. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 944 to Things (e.g., IoT devices 911). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 930) and/or a central cloud computing service (e.g., cloud 944) for performing heavy computations or computationally burdensome tasks. On the other hand, edge cloud computing consolidates human-operated, voluntary resources, as a cloud. These voluntary resource may include, inter-alia, intermediate nodes 920 and/or endpoints 910, desktop PCs, tablets, smartphones, nano data centers, and the like. In various implementations, resources in the edge cloud may be in one to two-hop proximity to the IoT devices 911, which may result in reducing overhead related to processing data and may reduce network delay.

In some embodiments, the fog may be a consolidation of IoT devices 911 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 944. The fog operating at the edge of the cloud 944 may overlap or be subsumed into an edge network 930 of the cloud 944. The edge network of the cloud 944 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 936 or edge devices). The Fog layer resides on top of the edge layer and is a consolidation of networking devices such as the intermediate nodes 920 and/or endpoints 910 of FIG. 9.

Data may be captured, stored/recorded, and communicated among the IoT devices 911 or, for example, among the intermediate nodes 920 and/or endpoints 910 that have direct links 905 with one another as shown by FIG. 9. Analysis of the traffic flow and control schemes may be implemented by aggregators that are in communication with the IoT devices 911 and each other through a mesh network. The aggregators may be a type of IoT device 911 and/or network appliance. In the example of FIG. 9, the aggregators may be edge nodes 930, or one or more designated intermediate nodes 920 and/or endpoints 910. Data may be uploaded to the cloud 944 via the aggregator, and commands can be received from the cloud 944 through gateway devices that are in communication with the IoT devices 911 and the aggregators through the mesh network.

Unlike the traditional cloud computing model, in some implementations, the cloud 944 may have little or no computational capabilities and only serves as a repository for archiving data recorded and processed by the fog. In these implementations, the cloud 944 centralized data storage system and provides reliability and access to data by the computing resources in the fog and/or edge devices. Being at the core of the architecture, the Data Store of the cloud 944 is accessible by both Edge and Fog layers of the aforementioned edge-fog network.

As mentioned previously, the access networks provide network connectivity to the end-user devices 920, 910 via respective NANs 931-933. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 931, 932. This virtualized framework allows the freed-up processor cores of the NANs 931, 932 to perform other virtualized applications, such as virtualized applications for the various embodiments discussed herein.

The UEs 921, 911 may utilize respective connections (or channels) 903, each of which comprises a physical communications interface or layer. The connections 903 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 911, 921 and the NANs 931-933 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 911, 921 and NANs 931-933 may operate using LAA, enhanced LAA (eLAA), and/or further eLAA (feLAA) mechanisms. The UEs 921, 911 may further directly exchange communication data via respective direct links 905, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

In various embodiments, individual UEs 921, 911 provide radio information to one or more MEC Hosts 936 in response to a trigger event and/or on a periodic basis. In some embodiments, individual UEs 921, 911 report radio information either at a low periodicity or a high periodicity depending on a data transfer that is to take place, and/or other information about the data transfer. The radio information may be in the form of one or more measurement reports, and/or may include, for example, signal strength measurements, signal quality measurements, and/or the like. Each measurement report is tagged with a timestamp and the location of the measurement (e.g., the UEs 921, 911 current location). As examples, the measurements collected by the vUEs and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/ WiFi networks. Other measurements may be additionally or alternatively used, such as those discussed in 3GPP TS 36.214 v15.3.0 (2018-09-27) ("[T536214]"), 3GPP TS 38.215 v15.4.0 (2019-01-11) ("[T538215]"), IEEE 802.11, Part 11: "Wireless LAN Medium Access Control (MAC) and Physical Layer (PHY) specifications, IEEE Std." CREEE802111"), and/or the like. Additionally or alternatively, any of the aforementioned measurements (or combination of measurements) may be collected by one or more NANs and provided to the MEC Host. In these embodiments, the MEC Host may request the measurements from the NANs at low or high periodicity, or the NANs may provide the measurements to the MEC Host at low or high periodicity. Additionally or alternatively, the MEC host may obtain other relevant data from other MEC Hosts, core network functions, and/or other vUEs, for determining the QoS predictions and/or generating the composite information. For example, other Key Performance Indicators (KPIs) may be collected from other MEC hosts via suitable MEC APIs and/or from core network functions via network exposure functions, and used for predicting the QoS along the planned route and/or generating composite information (discussed infra). Additionally or alternatively, the vUEs may obtain the other relevant information, and provide this information to the MEC Host with the measurement reports or separately from the measurement reports.

The UE 921b is shown to be configured to access an access point (AP) 933 via a connection 907. In this example, the AP 933 is shown to be connected to the Internet without connecting to the CN 942 of the wireless system. The connection 907 can comprise a local wireless connection, such as a connection consistent with any IEEE 802.11 protocol, wherein the AP 933 would comprise a wireless fidelity (WiFi®) router. In embodiments, the UEs 921 and IoT devices 911 can be configured to communicate using suitable communication signals with each other or with any of the AP 933 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 931 and 932 that enable the connections 903 may be referred to as "RAN nodes" or the like. The RAN nodes 931, 932 may comprise ground stations (e.g., terrestrial access points) or satellite stations providing coverage within a geographic area (e.g., a cell). The RAN nodes 931, 932 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 931 is embodied as a NodeB, evolved NodeB (eNB), or a next generation NodeB (gNB), and the RAN nodes 932 are embodied as relay nodes, distributed units, or Road Side Unites (RSUs). Any other type of NANs can be used.

Any of the RAN nodes 931, 932 can terminate the air interface protocol and can be the first point of contact for the UEs 921 and IoT devices 911. In some embodiments, any of the RAN nodes 931/932 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 911, 921 can be configured to communicate using OFDM communication signals with each other or with any of the NANs 931, 932 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 931-932 organize downlink transmissions (e.g., from any of the RAN nodes 931, 932 to the UEs 911, 921) and uplink transmissions (e.g., from the UEs 911, 921 to RAN nodes 931, 932) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 911, 921 at each transmission time interval (TTI). A TTI is the duration of a transmission on a radio link 903, 905, and is related to the size of the data blocks passed to the radio link layer from higher network layers.

The NANs 931/932 may be configured to communicate with one another via respective interfaces or links (not shown), such as an X2 interface for LTE implementations (e.g., when CN 942 is an Evolved Packet Core (EPC)), an Xn interface for 5G or NR implementations (e.g., when CN 942 is an Fifth Generation Core (5GC)), or the like. The NANs 931 and 932 are also communicatively coupled to CN 942. In embodiments, the CN 942 may be an evolved packet core (EPC) network, a NextGen Packet Core (NPC) network, a 5G core (5GC), or some other type of CN. The CN 942 may comprise a plurality of network elements, which are configured to offer various data and telecommunications services to customers/subscribers (e.g., users of UEs 921 and IoT devices 911) who are connected to the CN 942 via a RAN. The components of the CN 942 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 942 may be referred to as a network slice, and a logical instantiation of a portion of the CN 942 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 942 components/functions.

The CN 942 is shown to be communicatively coupled to an application server 950 and a network 950 via an IP communications interface 955. the one or more server(s) 950 comprise one or more physical and/or virtualized systems for providing functionality (or services) to one or more clients (e.g., UEs 921 and IoT devices 911) over a network. The server(s) 950 may include various computer devices with rack computing architecture component(s), tower computing architecture component(s), blade computing architecture component(s), and/or the like. The server(s) 950 may represent a cluster of servers, a server farm, a cloud computing service, or other grouping or pool of servers, which may be located in one or more datacenters. The server(s) 950 may also be connected to, or otherwise associated with one or more data storage devices (not shown). Moreover, the server(s) 950 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 950 offer applications or services that use IP/network resources. As examples, the server(s) 950 may provide traffic management services, cloud analytics, content streaming services, immersive gaming experiences, social networking and/or microblogging services, and/or other like services. In addition, the various services provided by the server(s) 950 may include initiating and controlling software and/or firmware updates for applications or individual components implemented by the UEs 921 and IoT devices 911. The server(s) 950 can also be configured to support one or more communication services (e.g., Voice-over-Internet Protocol (VoIP) sessions, PTT sessions, group communication sessions, social networking services, etc.) for the UEs 921 and IoT devices 911 via the CN 942.

The cloud 944 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 944 include application capabilities type, infrastructure capabilities type, and platform capabilities type. A cloud capabilities type is a classification of the functionality provided by a cloud service to a cloud service customer (e.g., a user of cloud 944), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 944 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud 944 may represent a network such as the Internet, a local area network (LAN) or a wide area network (WAN) including proprietary and/or enterprise networks for a company or organization, or combinations thereof. The cloud 944 may be a network that comprises computers, network connections among the computers, and software routines to enable communication between the computers over network connections. In this regard, the cloud 944 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 944 may be via a wired or a wireless connection using the various communication protocols discussed infra. More than one network may be involved in a communication session between the illustrated devices. Connection to the cloud 944 may require that the computers execute software routines which enable, for example, the seven layers of the OSI model of computer networking or equivalent in a wireless (cellular) phone network. Cloud 944 may be used to enable relatively long-range communication such as, for example, between the one or more server(s) 950 and one or more UEs 921 and IoT devices 911. In some embodiments, the cloud 944 may represent the Internet, one or more cellular networks, local area networks, or wide area networks including proprietary and/or enterprise networks, TCP/Internet Protocol (IP)-based network, or combinations thereof. In such embodiments, the cloud 944 may be associated with network operator who owns or controls equipment and other elements necessary to provide network-related services, such as one or more base stations or access points, one or more servers for routing digital data or telephone calls (e.g., a core network or backbone network), etc. The backbone links 955 may include any number of wired or wireless technologies, and may be part of a LAN, a WAN, or the Internet. In one example, the backbone links 955 are fiber backbone links that couple lower levels of service providers to the Internet, such as the CN 912 and cloud 944.

In embodiments, the edge compute nodes 936 may include or be part of an edge system 935 (or edge network 935). The edge compute nodes 936 may also be referred to as "edge hosts 936" or "edge servers 936." The edge system 935 includes a collection of edge servers 936 (e.g., MEC hosts/servers 936-1 and 936-2 of Figure XP1) and edge management systems (not shown by FIG. 9) necessary to run edge computing applications (e.g., MEC Apps XP136 of Figure XP1) within an operator network or a subset of an operator network. The edge servers 936 are physical computer systems that may include an edge platform (e.g., MEC platform XP137 of Figure XP1) and/or virtualization infrastructure (e.g., VI XP138 of Figure XP1), and provide compute, storage, and network resources to edge computing applications. Each of the edge servers 936 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 920 and/or endpoints 910. The VI of the edge servers 936 provide virtualized environments and virtualized resources for the edge hosts, and the edge computing applications may run as VMs and/or application containers on top of the VI. One example implementation of the edge system 935 is a MEC system 935, which is discussed in more detail infra with respect to Figures XP1-XP2. It should be understood that the disclosed MEC systems and services deployment examples are only one illustrative example of edge computing systems/networks 935, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 9, each of the NANs 931, 932, and 933 are co-located with edge compute nodes (or "edge servers") 936a, 936b, and 936c, respectively. These implementations may be small-cell clouds (SCCs) where an edge compute node 936 is co-located with a small cell (e.g., pico-cell, femto-cell, etc.), or may be mobile micro clouds (MCCs) where an edge compute node 936 is co-located with a macro-cell (e.g., an eNB, gNB, etc.). The edge compute node 936 may be deployed in a multitude of arrangements other than as shown by FIG. 9. In a first example, multiple NANs 931-933 are co-located or otherwise communicatively coupled with one edge compute node 936. In a second example, the edge servers 936 may be co-located or operated by RNCs, which may be the case for legacy network deployments, such as 3G networks. In a third example, the edge servers 936 may be deployed at cell aggregation sites or at multi-RAT aggregation points that can be located either within an enterprise or used in public coverage areas. In a fourth example, the edge servers 936 may be deployed at the edge of CN 942. These implementations may be used in follow-me clouds (FMC), where cloud services running at distributed data centers follow the UEs 921 as they roam throughout the network.

In any of the aforementioned embodiments and/or implementations, the edge servers 936 provide a distributed computing environment for application and service hosting, and also provide storage and processing resources so that data and/or content can be processed in close proximity to subscribers (e.g., users of UEs 921, 911) for faster response times The edge servers 936 also support multitenancy runtime and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 936 from the UEs 911/921, CN 942, cloud 944, and/or server(s) 950, or vice versa. For example, a device application or client application operating in a UE 921/911 may offload application tasks or workloads to one or more edge servers 936. In another example, an edge server 936 may offload application tasks or workloads to one or more UE 921/911 (e.g., for distributed ML computation or the like).

Figure 10:
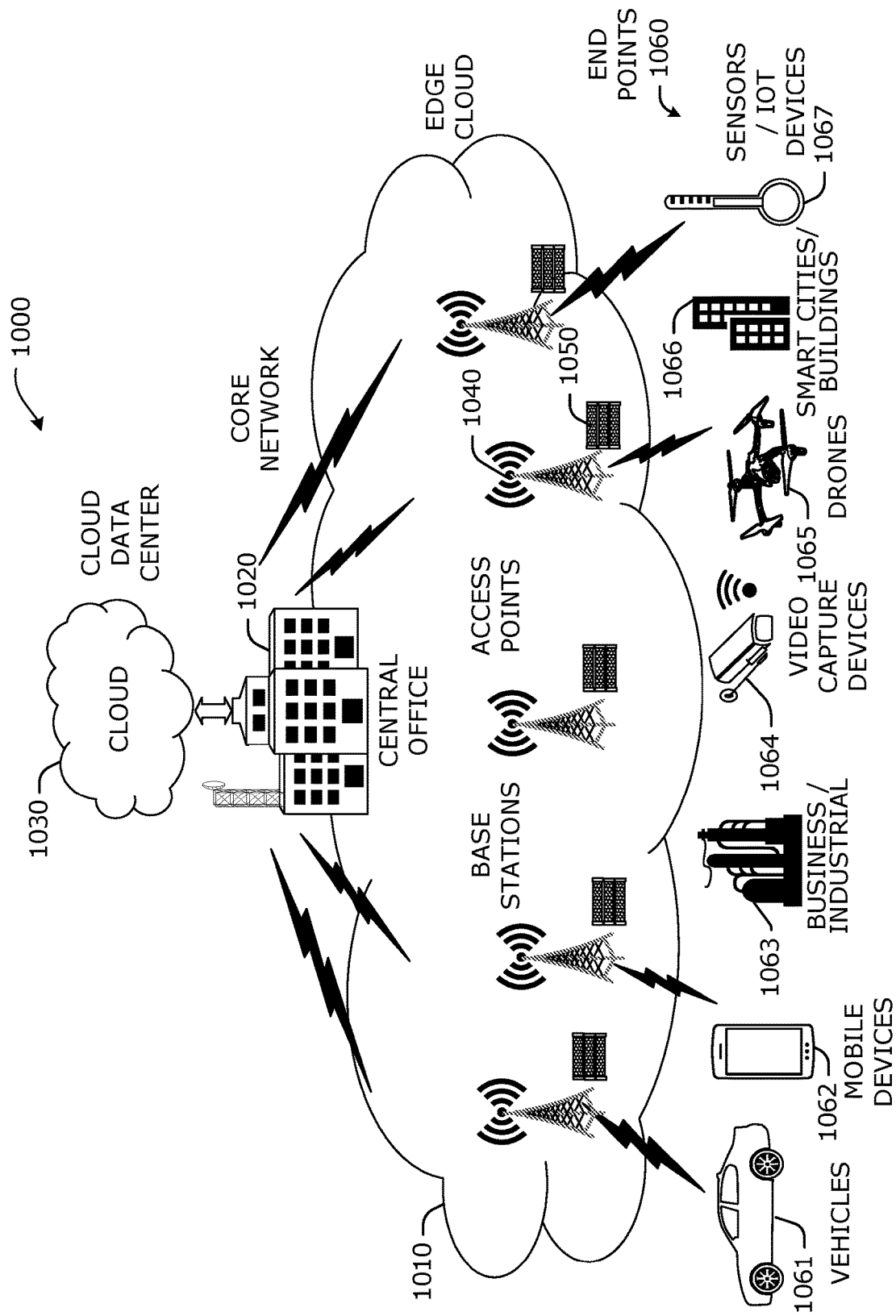
FIG. 10 illustrates an overview of an edge cloud configuration for edge computing.

FIG. 10 shows an overview of an edge computing configuration 1000, which includes a layer of processing referred to in many of the following examples as an "edge cloud". An "Edge Cloud" may refer to an interchangeable cloud ecosystem encompassing storage and compute assets located at a network's edge and interconnected by a scalable, application-aware network that can sense and adapt to changing needs, in real-time, and in a secure manner. An Edge Cloud architecture is used to decentralize computing resources and power to the edges of one or more networks (e.g., end point devices and/or intermediate nodes such as client devices/UEs). Traditionally, the computing power of servers is used to perform tasks and create distributed systems. Within the cloud model, such intelligent tasks are performed by servers (e.g., in a data center) so they can be transferred to other devices with less or almost no computing power. In the edge cloud 1010, some or all of these processing tasks are shifted to endpoint nodes and intermediate nodes such as client devices, IoT devices, network devices/appliances, and/or the like. It should be noted that an endpoint node may be the end of a communication path in some contexts, while in other contexts an endpoint node may be an intermediate node; similarly, an intermediate node may be the end of a communication path in some contexts, while in other contexts an intermediate node may be an endpoint node.

As shown, the edge cloud 1010 is co-located at an edge location, such as an access point or base station 1040, a local processing hub 1050, or a central office 1020, and thus may include multiple entities, devices, and equipment instances. The edge cloud 1010 is located much closer to the endpoint (consumer and producer) data sources 1060 (e.g., autonomous vehicles 1061, user equipment 1062, business and industrial equipment 1063, video capture devices 1064, drones 1065, smart cities and building devices 1066, sensors and IoT devices 1067, etc.) than the cloud data center 1030. Compute, memory, and storage resources which are offered at the edges in the edge cloud 1010 are critical to providing ultra-low latency response times for services and functions used by the endpoint data sources 1060 as well as reduce network backhaul traffic from the edge cloud 1010 toward cloud data center 1030 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 11:
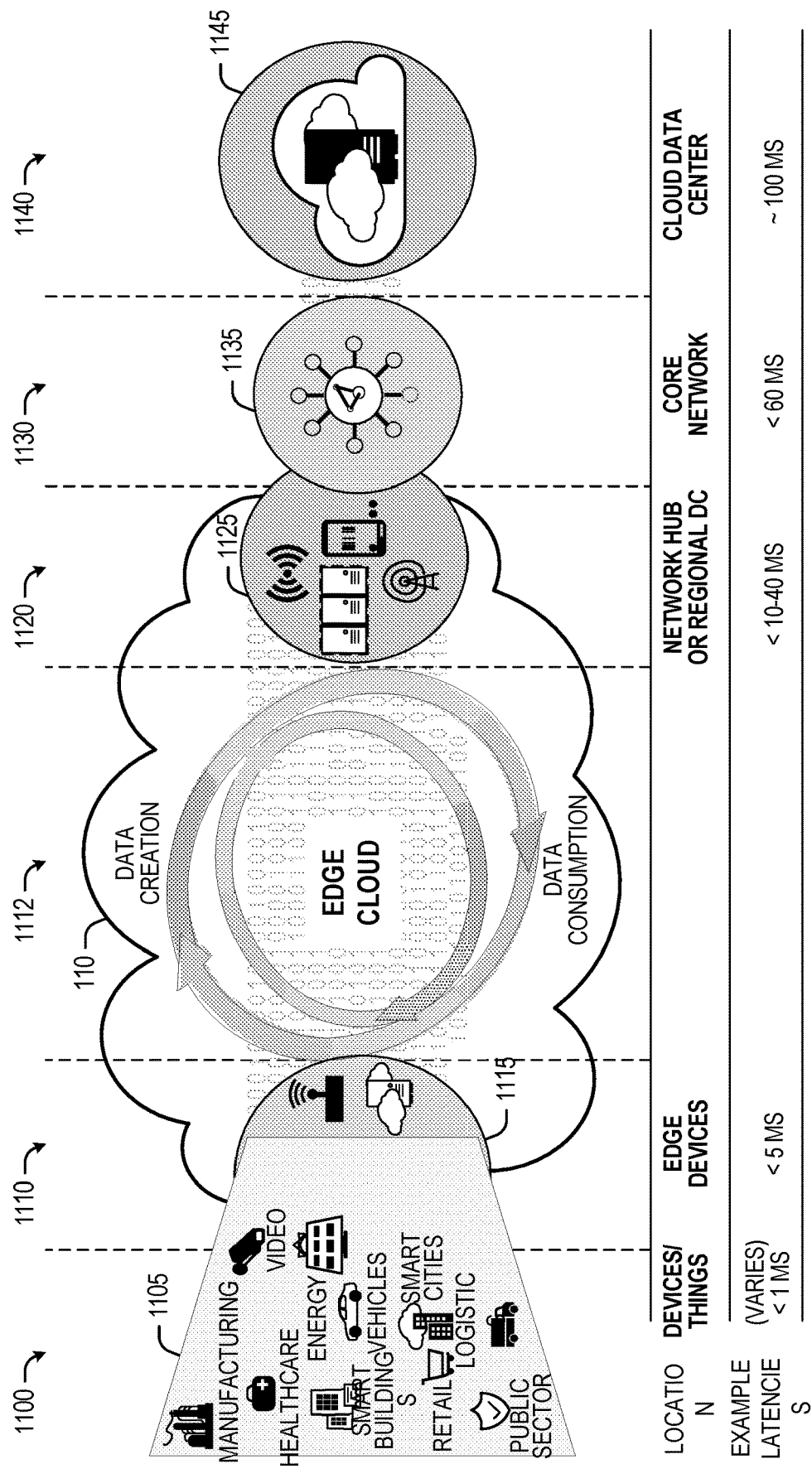
FIG. 11 illustrates operational layers among endpoints, an edge cloud, and cloud computing environments.

FIG. 11 illustrates operational layers among endpoints, an edge cloud, and cloud computing environments. Specifically, FIG. 11 depicts examples of computational use cases 1105, utilizing the edge cloud 1010 among multiple illustrative layers of network computing. The layers begin at an endpoint (devices and things) layer 1100, which accesses the edge cloud 1010 to conduct data creation, analysis, and data consumption activities. The edge cloud 1010 may span multiple network layers, such as an edge devices layer 1110 having gateways, on-premise servers, or network equipment (nodes 1115) located in physically proximate edge systems; a network access layer 1120, encompassing base stations, radio processing units, network hubs, regional data centers (DC), or local network equipment (equipment 1125); and any equipment, devices, or nodes located therebetween (in layer 1112, not illustrated in detail). The network communications within the edge cloud 1010 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1100, under 5 ms at the edge devices layer 1110, to even between 10 to 40 ms when communicating with nodes at the network access layer 1120. Beyond the edge cloud 1010 are core network 1130 and cloud data center 1140 layers, each with increasing latency (e.g., between 50-60 ms at the core network layer 1130, to 100 or more ms at the cloud data center layer). As a result, operations at a core network data center 1135 or a cloud data center 1145, with latencies of at least 50 to 100 ms or more, will not be able to accomplish many time-critical functions of the use cases 1105. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1135 or a cloud data center 1145, a central office or content data network may be considered as being located within a "near edge" layer ("near" to the cloud, having high latency values when communicating with the devices and endpoints of the use cases 1105), whereas an access point, base station, on-premise server, or network gateway may be considered as located within a "far edge" layer ("far" from the cloud, having low latency values when communicating with the devices and endpoints of the use cases 1105). It will be understood that other categorizations of a particular network layer as constituting a "close", "local", "near", "middle", or "far" edge may be based on latency, distance, number of network hops, or other measurable characteristics, as measured from a source in any of the network layers 1100-1140.

The various use cases 1105 may access resources under usage pressure from incoming streams, due to multiple services utilizing the edge cloud. To achieve results with low latency, the services executed within the edge cloud 1010 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1010 may provide the ability to serve and respond to multiple applications of the use cases 1105 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1010 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1010 (network layers 1100-1140), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1010.

As such, the edge cloud 1010 is formed from network components and functional features operated by and within edge gateway nodes, edge aggregation nodes, or other edge compute nodes among network layers 1110-1130. The edge cloud 1010 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1010 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1010 may be servers, multi-tenant servers, appliance computing devices, and/or any other type of computing devices. For example, the edge cloud 1010 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs.

Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 14-15. The edge cloud 1010 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 12:
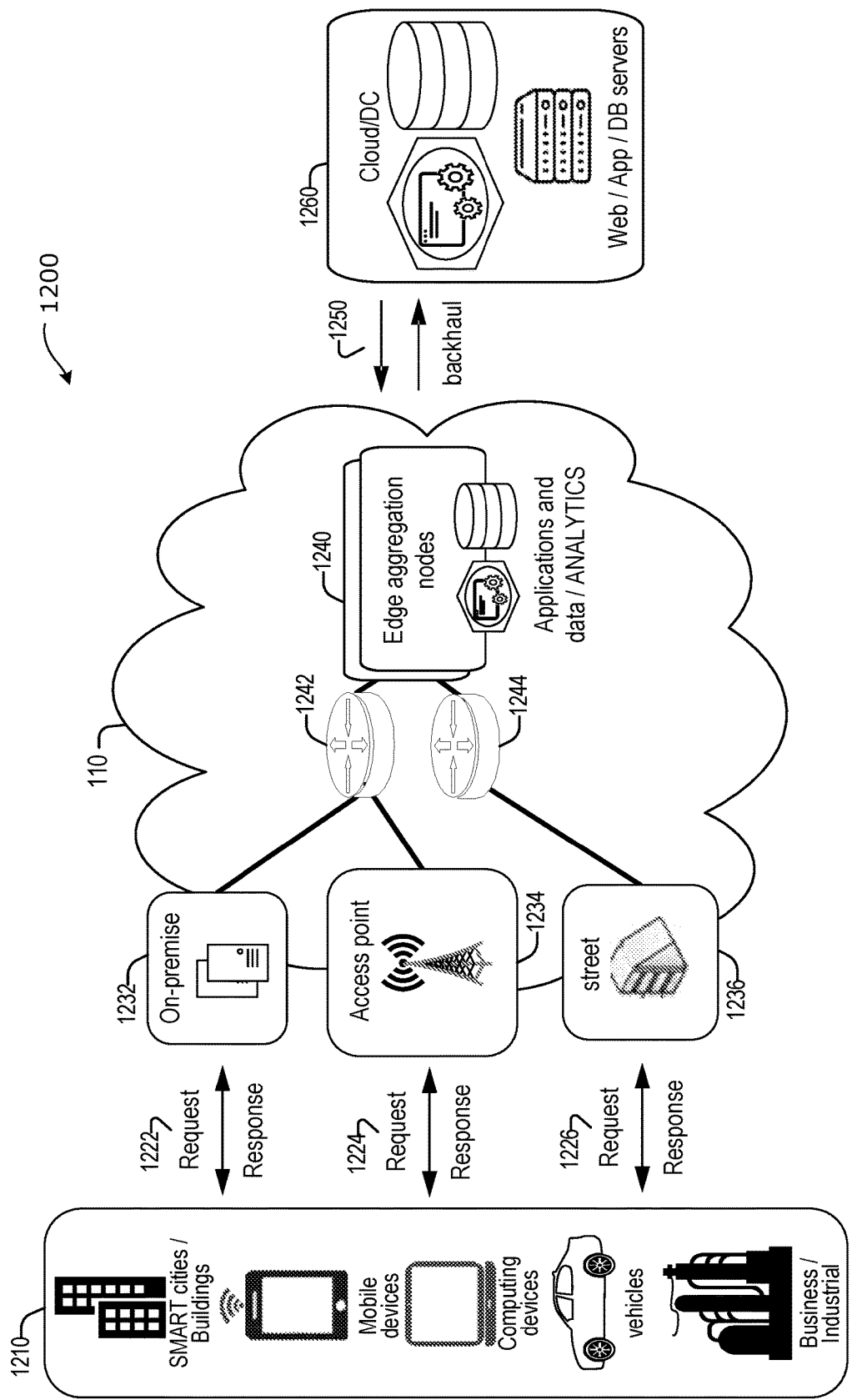
FIG. 12 illustrates an example approach for networking and services in an edge computing system.

In FIG. 12, various client endpoints 1210 (in the form of mobile devices, computers, autonomous vehicles, business computing equipment, industrial processing equipment) exchange requests and responses that are specific to the type of endpoint network aggregation. For instance, client endpoints 1210 may obtain network access via a wired broadband network, by exchanging requests and responses 1222 through an on-premise network system 1232. Some client endpoints 1210, such as mobile computing devices, may obtain network access via a wireless broadband network, by exchanging requests and responses 1224 through an access point (e.g., cellular network tower) 1234. Some client endpoints 1210, such as autonomous vehicles may obtain network access for requests and responses 1226 via a wireless vehicular network through a street-located network system 1236. However, regardless of the type of network access, the TSP may deploy aggregation points 1242, 1244 within the edge cloud 1010 to aggregate traffic and requests. Thus, within the edge cloud 1010, the TSP may deploy various compute and storage resources, such as at edge aggregation nodes 1240, to provide requested content. The edge aggregation nodes 1240 and other systems of the edge cloud 1010 are connected to a cloud or data center 1260, which uses a backhaul network 1250 to fulfill higher-latency requests from a cloud/data center for websites, applications, database servers, etc. Additional or consolidated instances of the edge aggregation nodes 1240 and the aggregation points 1242, 1244, including those deployed on a single server framework, may also be present within the edge cloud 1010 or other areas of the TSP infrastructure.

Figure 13:
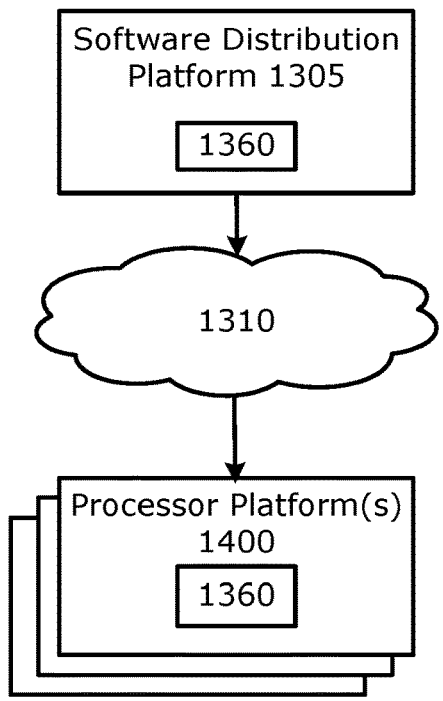
FIG. 13 illustrates an example software distribution platform according to various embodiments.
Figure 15:
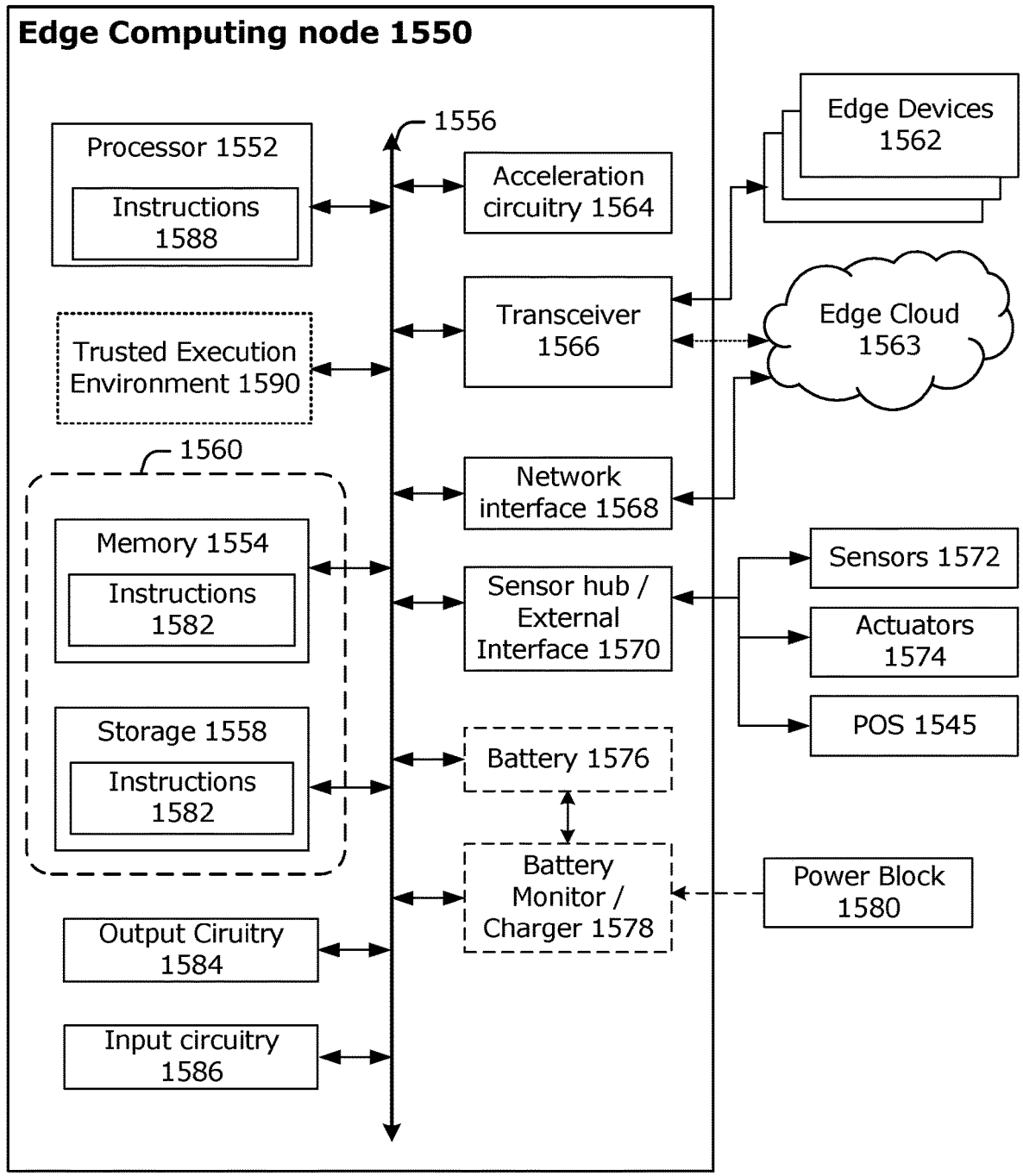

FIG. 13 illustrates an example software distribution platform 1305 to distribute software 1360, such as the example computer readable instructions 1560 of FIG. 15, to one or more devices, such as example processor platform(s) 1300 and/or example connected edge devices 1562 (see e.g., FIG. 15) and/or any of the other computing systems/devices discussed herein. The example software distribution platform 1305 may be implemented by any computer server, data facility, cloud service, etc., capable of storing and transmitting software to other computing devices (e.g., third parties, the example connected edge devices 1562 of FIG. 15). Example connected edge devices may be customers, clients, managing devices (e.g., servers), third parties (e.g., customers of an entity owning and/or operating the software distribution platform 1305). Example connected edge devices may operate in commercial and/or home automation environments. In some examples, a third party is a developer, a seller, and/or a licensor of software such as the example computer readable instructions 1560 of FIG. 15. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 13, the software distribution platform 1305 includes one or more servers and one or more storage devices. The storage devices store the computer readable instructions 1360, which may correspond to the example computer readable instructions 1560 of FIG. 15, as described above. The one or more servers of the example software distribution platform 1305 are in communication with a network 1310, which may correspond to any one or more of the Internet and/or any of the example networks 100, 200, 600, 1010, 1030, 1110, 1210, and/or the like as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1360 from the software distribution platform 1305. For example, the software 1360, which may correspond to the example computer readable instructions 1560 of FIG. 15, may be downloaded to the example processor platform(s) 1300, which is/are to execute the computer readable instructions 1360 to implement Radio apps and/or the embodiments discussed herein.

In some examples, one or more servers of the software distribution platform 1305 are communicatively connected to one or more security domains and/or security devices through which requests and transmissions of the example computer readable instructions 1360 must pass. In some examples, one or more servers of the software distribution platform 1305 periodically offer, transmit, and/or force updates to the software (e.g., the example computer readable instructions 1560 of FIG. 15) to ensure improvements, patches, updates, etc. are distributed and applied to the software at the end user devices.

In the illustrated example of FIG. 13, the computer readable instructions 1360 are stored on storage devices of the software distribution platform 1305 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 1305 are in a first format when transmitted to the example processor platform(s) 1300. In some examples, the first format is an executable binary in which particular types of the processor platform(s) 1300 can execute. However, in some examples, the first format is uncompiled code that requires one or more preparation tasks to transform the first format to a second format to enable execution on the example processor platform(s) 1300. For instance, the receiving processor platform(s) 1300 may need to compile the computer readable instructions 1360 in the first format to generate executable code in a second format that is capable of being executed on the processor platform(s) 1300. In still other examples, the first format is interpreted code that, upon reaching the processor platform(s) 1300, is interpreted by an interpreter to facilitate execution of instructions.

4. Hardware Components

Figure 14:
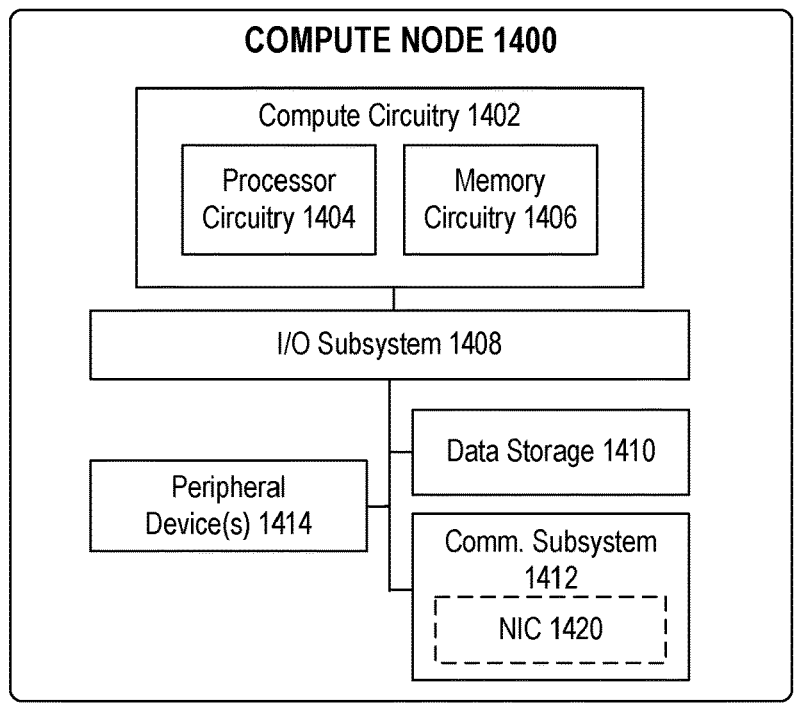
FIGS. 14 and 15 depict example components of various compute nodes in edge computing system(s).

FIGS. 14 and 15 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, the edge computing systems of FIGS. 14 and 15 may correspond to UEs 101, 201, 601, edge compute nodes 136, 236, 636, and/or some other device/component of FIGS. 1-6. Additionally or alternatively, the edge computing systems of FIGS. 14 and 15 may be embodied as a smartphone, a mobile compute device, a smart appliance, an in-vehicle compute system (e.g., a navigation system), or other device or system capable of performing the described functions.

In FIG. 14, an edge compute node 1400 includes a compute engine (also referred to herein as "compute circuitry") 1402, an input/output (I/O) subsystem 1408, data storage 1410, a communication circuitry subsystem 1412, and, optionally, one or more peripheral devices 1414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1400 may be embodied as any type of engine, device, or collection of devices capable of performing various compute functions. In some examples, the compute node 1400 may be embodied as a single device such as an integrated circuit, an embedded system, an FPGA, a System-on-Chip (SoC), or other integrated system or device. The compute node 1400 includes or is embodied as a processor 1404 and a memory 1406. The processor 1404 may be embodied as any type of processor capable of performing the functions described herein (e.g., executing an application). For example, the processor 1404 may be embodied as a multi-core processor(s), a microcontroller, or other processor or processing/controlling circuit. In some examples, the processor 1404 may be embodied as, include, or be coupled to an FPGA, an application specific integrated circuit (ASIC), reconfigurable hardware or hardware circuitry, or other specialized hardware to facilitate performance of the functions described herein.

The main memory 1406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1406 may be integrated into the processor 1404. The main memory 1406 may store various software and data used during operation such as one or more applications, data operated on by the application(s), libraries, and drivers.

The compute circuitry 1402 is communicatively coupled to other components of the compute node 1400 via the I/O subsystem 1408, which may be embodied as circuitry and/or components to facilitate input/output operations with the compute circuitry 1402 (e.g., with the processor 1404 and/or the main memory 1406) and other components of the compute circuitry 1402. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1408 may form a portion of a system-on-a-chip (SoC) and be incorporated, along with one or more of the processor 1404, the main memory 1406, and other components of the compute circuitry 1402, into the compute circuitry 1402.

The one or more illustrative data storage devices 1410 may be embodied as any type of devices configured for short-term or long-term storage of data such as, for example, memory devices and circuits, memory cards, hard disk drives, solid-state drives, or other data storage devices. Individual data storage devices 1410 may include a system partition that stores data and firmware code for the data storage device 1410. Individual data storage devices 1410 may also include one or more operating system partitions that store data files and executables for operating systems depending on, for example, the type of compute node 1400.

The communication circuitry 1412 may be embodied as any communication circuit, device, or collection thereof, capable of enabling communications over a network between the compute circuitry 1402 and another compute device (e.g., an edge gateway node or the like). The communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1412 includes a network interface controller (NIC) 1420, which may also be referred to as a host fabric interface (HFI). The NIC 1420 may be embodied as one or more add-in-boards, daughter cards, network interface cards, controller chips, chipsets, or other devices that may be used by the compute node 1400 to connect with another compute device. In some examples, the NIC 1420 may be embodied as part of a system-on-a-chip (SoC) that includes one or more processors, or included on a multichip package that also contains one or more processors. In some examples, the NIC 1420 may include a local processor (not shown) and/or a local memory (not shown) that are both local to the NIC 1420. In such examples, the local processor of the NIC 1420 may be capable of performing one or more of the functions of the compute circuitry 1402 described herein. Additionally, or alternatively, in such examples, the local memory of the NIC 1420 may be integrated into one or more components of the client compute node at the board level, socket level, chip level, and/or other levels.

Additionally, in some examples, a respective compute node 1400 may include one or more peripheral devices 1414. Such peripheral devices 1414 may include any type of peripheral device found in a compute device or server such as audio input devices, a display, other input/output devices, interface devices, and/or other peripheral devices, depending on the particular type of the compute node 1400. In further examples, the compute node 1400 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 15 illustrates an example of components that may be present in an edge computing node 1550 for implementing the techniques (e.g., operations, processes, methods, and methodologies) described herein. This edge computing node 1550 provides a closer view of the respective components of node 1500 when implemented as or as part of a computing device (e.g., as a mobile device, a base station, server, gateway, etc.). The edge computing node 1550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 1550, or as components otherwise incorporated within a chassis of a larger system.

The edge computing node 1550 includes processing circuitry in the form of one or more processors 1452. The processor circuitry 1552 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1552 may include one or more hardware accelerators (e.g., same or similar to acceleration circuitry 1564), which may be microprocessors, programmable processing devices (e.g., FPGA, ASIC, etc.), or the like. The one or more accelerators may include, for example, computer vision and/or deep learning accelerators. In some implementations, the processor circuitry 1552 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 1552 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 1552 may be coupled with or may include memory/storage and may be configured to execute instructions stored in the memory/storage to enable various applications or operating systems to run on the platform 1550. The processors (or cores) 1552 is configured to operate application software to provide a specific service to a user of the platform 1550. In some embodiments, the processor(s) 1552 may be a special-purpose processor(s)/controller(s) configured (or configurable) to operate according to the various embodiments herein.

As examples, the processor(s) 1552 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1552 may be a part of a system on a chip (SoC), System-in-Package (SiP), a multi-chip package (MCP), and/or the like, in which the processor(s) 1552 and other components are formed into a single integrated circuit, or a single package, such as the Edison™ or Galileo™ SoC boards from Intel® Corporation. Other examples of the processor(s) 1552 are mentioned elsewhere in the present disclosure.

The processor(s) 1552 may communicate with system memory 1554 over an interconnect (IX) 1556. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the IX 1556. In an example, the storage 1558 may be implemented via a solid-state disk drive (SSDD) and/or high-speed electrically erasable memory (commonly referred to as "flash memory"). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1554 and/or storage circuitry 1558 may also incorporate three-dimensional (3D) cross-point (XPOINT) memories from Intel® and Micron®.

In low power implementations, the storage 1558 may be on-die memory or registers associated with the processor 1552. However, in some examples, the storage 1458 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components of edge computing device 1550 may communicate over the IX 1556. The IX 1556 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 1556 may be a proprietary bus, for example, used in a SoC based system.

The IX 1556 couples the processor 1552 to communication circuitry 1566 for communications with other devices, such as a remote server (not shown) and/or the connected edge devices 1562. The communication circuitry 1566 is a hardware element, or collection of hardware elements, used to communicate over one or more networks (e.g., cloud 1563) and/or with other devices (e.g., edge devices 1562).

The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge computing node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1563 via local or wide area network protocols. The wireless network transceiver 1566 may be an LPWA transceiver that follows the IEEE 802.15.4, or IEEE 802.15.4g standards, among others. The edge computing node 1563 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP specifications, such as LTE and 5G/NR communication systems, discussed in further detail at the end of the present disclosure. A network interface controller (NIC) 1568 may be included to provide a wired communication to nodes of the edge cloud 1563 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 151468, or 1570. Accordingly, in various examples, applicable means for communicating (e.g., receiving, transmitting, etc.) may be embodied by such communications circuitry.

The edge computing node 1550 may include or be coupled to acceleration circuitry 1564, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1564 may comprise logic blocks or logic fabric and other interconnected resources that may be programmed (configured) to perform various functions, such as the procedures, methods, functions, etc. of the various embodiments discussed herein. In such implementations, the acceleration circuitry 1564 may also include memory cells (e.g., EPROM, EEPROM, flash memory, static memory (e.g., SRAM, anti-fuses, etc.) used to store logic blocks, logic fabric, data, etc. in LUTs and the like.

The IX 1556 also couples the processor 1552 to a sensor hub or external interface 1570 that is used to connect additional devices or subsystems. The additional/external devices may include sensors 1572, actuators 1574, and positioning circuitry 1545.

The sensor circuitry 1572 includes devices, modules, or subsystems whose purpose is to detect events or changes in its environment and send the information (sensor data) about the detected events to some other a device, module, subsystem, etc. Examples of such sensors 1572 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1574, allow platform 1550 to change its state, position, and/or orientation, or move or control a mechanism or system. The actuators 1574 comprise electrical and/or mechanical devices for moving or controlling a mechanism or system, and converts energy (e.g., electric current or moving air and/or liquid) into some kind of motion. The actuators 1574 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1574 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1550 may be configured to operate one or more actuators 1574 based on one or more captured events and/or instructions or control signals received from a service provider and/or various client systems The positioning circuitry 1545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-Technology for Positioning, Navigation, and Timing (Micro-PNT) IC that uses a master timing clock to perform position tracking/estimation without GNSS assistance. The positioning circuitry 1545 may also be part of, or interact with, the communication circuitry 1566 to communicate with the nodes and components of the positioning network. The positioning circuitry 1545 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1545 is, or includes an INS, which is a system or device that uses sensor circuitry 1572 (e.g., motion sensors such as accelerometers, rotation sensors such as gyroscopes, and altimimeters, magentic sensors, and/or the like to continuously calculate (e.g., using dead by dead reckoning, triangulation, or the like) a position, orientation, and/or velocity (including direction and speed of movement) of the platform 1550 without the need for external references.

In some optional examples, various input/output (I/O) devices may be present within or connected to, the edge computing node 1550, which are referred to as input circuitry 1586 and output circuitry 1584 in FIG. 15. The input circuitry 151486 and output circuitry 1584 include one or more user interfaces designed to enable user interaction with the platform 1550 and/or peripheral component interfaces designed to enable peripheral component interaction with the platform 1550. Input circuitry 1586 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1584 may be included to show information or otherwise convey information, such as sensor readings, actuator position(s), or other like information. Data and/or graphics may be displayed on one or more user interface components of the output circuitry 1584. Output circuitry 1584 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1550. The output circuitry 1584 may also include speakers or other audio emitting devices, printer(s), and/or the like. In some embodiments, the sensor circuitry 151472 may be used as the input circuitry 1584 (e.g., an image capture device, motion capture device, or the like) and one or more actuators 1574 may be used as the output device circuitry 1584 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge computing node 1550, although, in examples in which the edge computing node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge computing node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1578 may communicate the information on the battery 1576 to the processor 1552 over the IX 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1482 provided via the memory 1554, the storage 1558, or the processor 1552 may be embodied as a non-transitory, machine-readable medium 1560 including code to direct the processor 1552 to perform electronic operations in the edge computing node 1550. The processor 1552 may access the non-transitory, machine-readable medium 1560 over the IX 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 16:
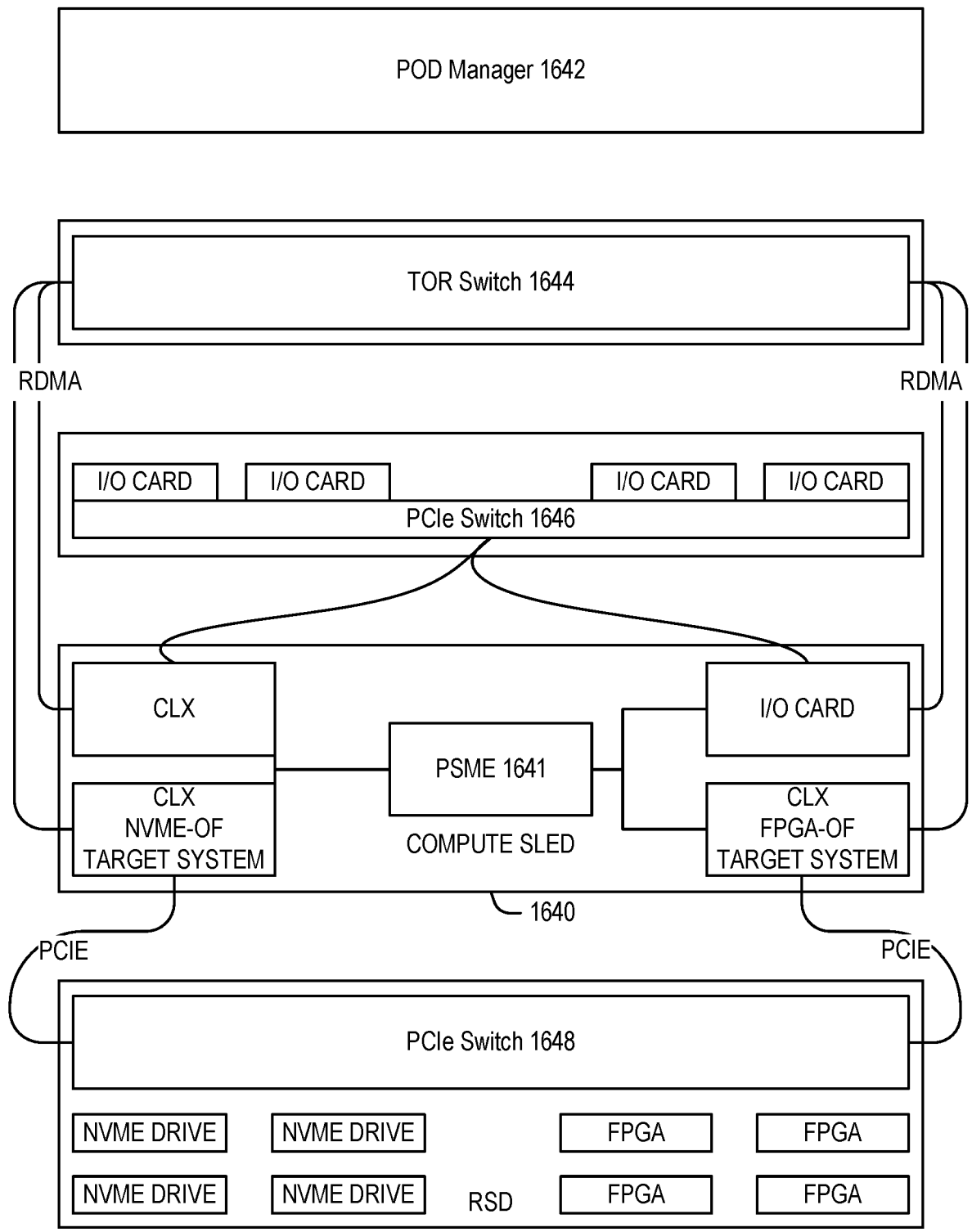
FIG. 16 depicts an example of a configurable server rack in an edge computing system.

FIG. 16 illustrates Rack Scale Design (RSD) components that may be included a part of a server or other discrete compute node in an edge platform architecture. This arrangement provides a closer view of the configurable processing components of node 1400 or device 1550 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible NFs. This architecture enables scaling network interfaces according to the expected data rate or network load for a particular VNF. This architecture also enables flexibility to map different network cards to compute nodes depending on the type of network processing happening at a given node.

The illustrated RSD architecture includes a point of delivery (POD) Manager 1642. The POD Manager 1642 is responsible of managing the resources—including compute and disaggregated resources—within a POD (e.g., one or more racks). The POD Manager 1642 exposes interfaces to an orchestrator in order to create, manage, or destroy composed nodes. Managing a composed node includes the feature of scaling up or down the amount of pooled resources 1648 connected to a particular compute sled 1640. The POD Manager 1642 typically runs on a node controller. The POD Manager 1642 is responsible for discovery of resources in the POD, configuring and managing the resources, and composing a logical server. In an example, the POD Manager 1642 is an optional separate component and will not be required in-rack. However, in an example, to be "RSD conformant" a Rack is manageable by a certified POD Manager.

The following are some example attributes of a POD Manager 1642. For example, a rack may include a set of compute sleds 1640 used to execute edge services and other related system software stacks (e.g., such as orchestration or other system services). One type of compute sled 1640 may be a Pooled Resources Sled. This compute sled 1640 may manage a set of disaggregated resources. Here, a compute sled 1440 may include a pooled System Management Engine software (PSME) 1641. The PSME 1641 provides a management interface to manage the modules or blades at a drawer level. In an example, a rack contains one or more logical PSME(s). For example, each drawer may have a PSME or server drawers may share a PSME, or a PSME may run on a top-of-rack (TOR) 1644 switch or on a separate host. In an example, the PSME 1641 supports the RSD APIs.

In an example, the compute sled 1640 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 1646 providing access to the target resources (FPGA or NVME in the RSD 1648).

Various RSD edge-composed node flavors may be used in the compute sled 1640 to run edge services. Services running on those nodes may use client software libraries or drivers to provide transparent access to the disaggregated FPGAS and NVME in the RSD 1648. In a further example, the rack includes one or more PCIe switches connecting the compute sleds 1640 to a set of disaggregated resources (e.g., RSD 1648).

The illustrations of FIGS. 14, 15, and 16 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 14, 15, and 16 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

5. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes a method for multi-Radio Access Technology (RAT) traffic management in edge computing networks, the method comprising: collecting operational parameters of one or more user equipment (UEs) capable communicating using a plurality of RATs that are different from one another; determining respective traffic steering instructions for each UE of the one or more UEs based on the collected operational parameters, the respective traffic steering instructions indicating whether a corresponding UE should steer network traffic towards an individual RAT of the plurality of RATs or split traffic among at least RATs of the plurality of RATs; and sending the respective traffic steering instructions to the corresponding UEs.

Example 2 includes the method of example 1 and/or some other example(s) herein, wherein collecting operational parameters comprises: sending a request to one or more network access nodes (NANs) for the operational parameters of the one or more UEs, each NAN of the one or more NANs implementing at least one RAT of the plurality of RATs; and receiving the operational parameters from the one or more NANs.

Example 3 includes the method of examples 1-2 and/or some other example(s) herein, wherein the collected operational parameters for each UE includes backhaul delay per RAT and the UE utilization per RAT, and the method comprises: explicitly modeling a network delay using a queueing theory model; estimating an average network delay using the explicit model of the network delay based on the collected operational parameters; and directly minimizing the average network delay.

Example 4 includes the method of example 3 and/or some other example(s) herein, wherein the queueing theory model is an M/M/1 queueing model.

Example 5 includes the method of examples 1-2 and/or some other example(s) herein, wherein the collected operational parameters for each UE includes backhaul delay per RAT and UE utilization per RAT, and the method comprises: implicitly modeling a network delay including: estimating a resource utilization level for each RAT based on the UE utilization per RAT; and equalizing the estimated resource utilization level across each RAT.

Example 6 includes the method of examples 3-5 and/or some other example(s) herein, wherein determining respective traffic steering instructions comprises: determining a traffic splitting ratio for each UE such that a minimum number of UEs among the one or more UEs split traffic among the plurality of RATs; and generating the traffic steering instructions to include the traffic splitting ratio for a corresponding UE.

Example 7 includes the method of example 6 and/or some other example(s) herein, wherein determining the traffic splitting ratio for each UE comprises: adjusting the traffic splitting ratios for individual UEs of the one or more UEs that have a threshold amount of backhaul delay per RAT, a threshold amount of utilization per RAT, or contribute a threshold amount to RAT utilization levels or average delay.

Example 8 includes the method of examples 6-7 and/or some other example(s) herein, wherein determining the traffic splitting ratio for each UE comprises: determining a traffic splitting ratio for each UE based on the UE utilization per RAT for a respective UE and/or a UE physical layer (PHY) data rate per RAT for the respective UE; and obtaining the RAT utilization level for each RAT of the plurality of RATs.

Example 9 includes the method of example 8 and/or some other example(s) herein, wherein determining the traffic splitting ratio for each UE further comprises: determining a common RAT set (CRS) for each UE based on the determined traffic splitting ratios for each UE, each CRS including one or more NANs that operate according to one or more RATs of the plurality of RATs; and selecting, for each UE in a CRS, one or more RATs in the CRS to use.

Example 10 includes the method of examples 1-2 and/or some other example(s) herein, wherein the collected operational parameters for each UE include backhaul delay per RAT and UE PHY data rate per RAT, and the method comprises: determining the UE utilization level for each UE based on a ratio of a total traffic volume of each UE for each RAT to the UE PHY data rate of each RAT; and determining a traffic splitting ratio for each UE by solving a convex optimization problem.

Example 11 includes the method of examples 1-2 and/or some other example(s) herein, wherein the collected operational parameters for each UE include backhaul delay per RAT and UE delay per RAT, and the method comprises: equalizing a delay across each RAT for each UE based on the UE delay per RAT of each UE; and operating a heuristic algorithm to gradually steer traffic from high latency RATs of the plurality of RATs to low latency RATs of the plurality of RATs.

Example 12 includes the method of example 11, wherein the UE delay per RAT is based on a one-way delay (OWD) measurement between each UE and each RAT, as measured by each UE.

Example 13 includes the method of example 12 and/or some other example(s) herein, wherein determining respective traffic steering instructions for each UE comprises: generating the respective traffic steering instructions for each UE to include a traffic adjustment factor and an indication indicating that each UE is to adjust a traffic distribution rule based on its measured OWD and the traffic adjustment factor.

Example 14 includes the method of examples 1-2, wherein collecting operational parameters comprises: sending a request for the operational parameters to the one or more UEs; and receiving the operational parameters from the one or more UEs.

Example 15 includes the method of example 14 and/or some other example(s) herein, wherein the request for the operational parameters is sent to the one or more UEs via the individual NANs, and the operational parameters are received from the one or more UEs via the individual NANs.

Example 16 includes the method of examples 14-15 and/or some other example(s) herein, further comprising: sending a request for operational parameters of the individual NANs to the individual NANs; and receiving the operational parameters from the individual NANs.

Example 17 includes the method of examples 14-16 and/or some other example(s) herein, further comprising: deriving metrics based on the received operational parameters; and updating the traffic distribution rules based on derived metrics.

Example 18 includes the method of examples 14-17 and/or some other example(s) herein, wherein determining the traffic distribution rules comprises: grouping the plurality of NANs into one or more NAN sets based on an estimated backhaul delay of each NAN; sorting the one or more NAN sets according to the estimated backhaul delay of each NAN set; constructing a set of UEs with traffic to send; and deriving a NAN utilization threshold for each NAN in each NAN set of the one or more NAN sets based backhaul delay statistics and traffic quality of service (QoS) requirements.

Example 19 includes the method of example 18 and/or some other example(s) herein, wherein determining the traffic distribution rules further comprises: identifying the NANs in each NAN set and UEs for traffic distribution; and for each NAN set of the one or more NAN sets: determining if there is traffic to be distributed within a current NAN set, selecting a UE-NAN pair based on a sorting metric, the UE-NAN pair comprising a UE and a NAN in the current NAN set to which the UE is attached; assigning an entire traffic volume of the UE in the UE-NAN pair to the NAN in the UE-NAN pair if doing so would not exceed a NAN utilization threshold of the NAN in the UE-NAN pair; assigning only a portion of the traffic volume of the UE in the UE-NAN pair to the NAN in the UE-NAN pair if assigning the entire traffic volume would exceed the NAN utilization threshold of the NAN in the UE-NAN pair, and updating the NAN utilization threshold of the NAN in the UE-NAN pair based on the amount of traffic volume of the UE to the NAN in the UE-NAN pair.

Example 20 includes the method of example 19 and/or some other example(s) herein, wherein assigning only a portion of the traffic volume of the UE in the UE-NAN pair to the NAN in the UE-NAN pair comprises: allocating an amount of the traffic volume to the NAN in the UE-NAN pair up to the NAN utilization threshold of the NAN in the UE-NAN pair.

Example 21 includes the method of examples 19-20 and/or some other example(s) herein, further comprising: randomly selecting the UE-NAN pair from among one or more UE-NAN pairs in the current NAN set.

Example 22 includes the method of examples 19-20 and/or some other example(s) herein, wherein the sorting metric is a primary sorting metric used to determine which UE should be considered first for traffic distribution within a NAN set, and the method further comprises: selecting the UE-NAN pair from among one or more UE-NAN pairs in the current NAN set based on a secondary sorting metric, wherein: the primary sorting metric includes one or more of one or more signal quality measurements, an estimated data rate for each NAN in a NAN set, a utilization impact to each NAN, a resource utilization level of a UE to NAN ratio, and a load adjust sorting metric; and the secondary sorting metric is one or more of a utilization impact, a utilization margin before assignment, and a utilization margin after assignment.

Example 23 includes the method of example 22 and/or some other example(s) herein, further comprising: recalculating the traffic distribution rules on a periodic basis.

Example 24 includes the method of example 22 and/or some other example(s) herein, further comprising: recalculating the traffic distribution rules in response to detecting a trigger, wherein the trigger is one or more of detecting a predefined change in resource utilization level of a UE attached to a particular NAN and detecting a predefined change in the primary sorting metric.

Example 25 includes the method of examples 18-24 and/or some other example(s) herein, wherein deriving the NAN utilization threshold for each NAN comprises: solving a delay optimization problem for the NAN utilization threshold of low latency NANs such that latency introduced by queueing incoming traffic at the low latency NANs exceeds a delay difference between the low latency NANs and high latency NANs.

Example 26 includes the method of example 27 and/or some other example(s) herein, wherein solving the delay optimization problem comprises: solving a first optimization objective including minimizing a maximal average per file delay of the low latency NANs and high latency NANs; and solving a second optimization objective including minimizing an average per file delay of both the low latency NANs and high latency NANs.

Example 27 includes the method of examples 18-26 and/or some other example(s) herein, wherein deriving the NAN utilization threshold for each NAN comprises: receiving, from individual UEs of the one or more UEs, a notification that a one way delay (OWD) condition has been met at the individual UEs; determining RAT utilization levels based on operational parameters received from the plurality of NANs or based on derivation of the RAT utilization levels from monitoring traffic flows; generating a look-up table including a mapping of each OWD condition to respective RAT utilization levels; and deriving the NAN utilization thresholds using the generated look-up table.

Example 28 includes the method of example 27 and/or some other example(s) herein, further comprising: generating a OWD configuration for the one or more UEs, the OWD configuration indicating when and how to report OWD measured by the one or more UEs, and the OWD configuration indicates a number of packets to be sent with timestamps for OWD measurements and reporting rules indicating one or more OWD conditions for reporting measured OWD; and sending the OWD configuration to the one or more UEs.

Example 29 includes the method of examples 1-28 and/or some other example(s) herein, wherein the plurality of RATs includes a 3GPP Long Term Evolution (LTE) RAT, a 3GPP Fifth Generation (5G) RAT, a WiFi RAT, a WiMAX RAT, and a personal area network (PAN) RAT, and the plurality of NANs include one or more evolved NodeBs (eNBs), one or more next generation NodeBs (gNBs), one or more WiFi access points, one or more WiMAX base stations, and one or more PAN beacons.

Example 30 includes the method of examples 1-29 and/or some other example(s) herein, wherein: the method is performed by an edge computing server or a cluster of edge computing servers.

Example Z01 includes one or more computer readable media comprising instructions, wherein execution of the instructions by processor circuitry is to cause the processor circuitry to perform the method of any one of examples 1-30. Example Z02 includes a computer program comprising the instructions of example Z01. Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples 1-30 or portions thereof, or otherwise related to any of examples 1-30 or portions thereof.

Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object. Example Z12 includes a signal encoded with the data unit of examples Z10 and/or Z11. Example Z13 includes an electromagnetic signal carrying the instructions of example Z01. Example Z14 includes an apparatus comprising means for performing the method of any one of examples 1-30 and/or some other example(s) herein. Example Z15 includes a Multi-access Edge Computing (MEC) host executing a service as part of one or more MEC applications instantiated on a virtualization infrastructure, the service being related to any of examples 1-30 or portions thereof and/or some other example(s) herein, and wherein the MEC host is configurable or operable to operate according to a standard from one or more ETSI MEC standards families.

An example implementation is an edge computing system, including respective edge processing devices and nodes to invoke or perform the operations of examples 1-30, or other subject matter described herein. Another example implementation is a client endpoint node, operable to invoke or perform the operations of examples 1-30, or other subject matter described herein. Another example implementation is an aggregation node, network hub node, gateway node, or core data processing node, within or coupled to an edge computing system, operable to invoke or perform the operations of examples 1-30, or other subject matter described herein. Another example implementation is an access point, base station, road-side unit, street-side unit, or on-premise unit, within or coupled to an edge computing system, operable to invoke or perform the operations of examples 1-30, or other subject matter described herein. Another example implementation is an edge provisioning node, service orchestration node, application orchestration node, or multi-tenant management node, within or coupled to an edge computing system, operable to invoke or perform the operations of examples 1-30, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples 1-30, or other subject matter described herein. Another example implementation is an edge computing system operable as an edge mesh, as an edge mesh with side car loading, or with mesh-to-mesh communications, operable to invoke or perform the operations of examples 1-30, or other subject matter described herein. Another example implementation is an edge computing system including aspects of network functions, acceleration functions, acceleration hardware, storage hardware, or computation hardware resources, operable to invoke or perform the use cases discussed herein, with use of examples 1-30, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples 1-30, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples 1-30, or other subject matter described herein. Another example implementation is an edge computing system adapted for supporting xApps and operating according to O-RAN specifications, operable to invoke or perform the use cases discussed herein, with use of examples 1-30, or other subject matter described herein.

6. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

As used herein, the term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies (RATs).

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11 ay, etc.), V2X communication technologies (including C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The term "Quality of Service" or "QoS' refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS refers to traffic prioritization and resource reservation control mechanisms rather than the achieved perception of service quality. In these cases, QoS is the ability to provide different priorities to different applications, users, or data flows, or to guarantee a certain level of performance to a data flow. In either case, QoS is characterized by the combined aspects of performance factors applicable to one or more services such as, for example, service operability performance, service accessibility performance; service retain ability performance; service reliability performance, service integrity performance, and other factors specific to each service.

Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code.

The term "optimization problem" refers to a problem or function to find the best solution from a set of possible or candidate solutions; a "discrete optimization" is an optimization problem with discrete variables, and a "continuous optimization" is an optimization problem n which an optimal value from a continuous function must be found. The term "objective function" refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values.

The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "ego ITS-S" refers to an ITS-S that is under consideration, the term "ego vehicle" refers to a vehicle embedding an ITS-S being considered, and the term "neighbors" refers to other ITS-Ss different than the ego ITS-S and ego vehicle.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for multi-Radio Access Technology (RAT) traffic management in an edge computing network, the apparatus comprising:
interface circuitry to communicatively couple the apparatus to a set of network access nodes (NANs), wherein each NAN of the set of NANs implements at least one RAT of a plurality of RATs that are different from one another, and the interface circuitry is to:
receive operational parameters related to quality of service (QoS) requirements of a set of user equipment (UE) via a subset of NANs of the set of NANs, wherein individual UEs of the set of UEs are capable of communicating using one or more RATs of the plurality of RATs; and
send, via the subset of NANs, respective traffic steering messages to corresponding UEs of the set of UEs; and
processor circuitry connected to memory circuitry and the interface circuitry, wherein the processor circuitry is to:
identify a delay parameter or a utilization parameter related to a RAT of the plurality of RATS;
determine a NAN utilization threshold for each NAN in each NAN subset of one or more NAN subsets based on backhaul delay statistics and traffic quality of service requirements of each NAN subset;
determine respective traffic steering instructions for each UE of the set of UEs based on (A) the operational parameters, (B) the delay parameter or the utilization parameter, and (C) the NAN utilization threshold, wherein the respective traffic steering instructions indicate whether a corresponding UE should steer network traffic toward an individual RAT of the plurality of RATs or split traffic among at least two RATs of the plurality of RATs; and
generate the respective traffic steering messages to include the respective traffic steering instructions for each UE.

2. The apparatus of claim 1, wherein the processor circuitry is to:
determine metrics based on the received operational parameters; and
determine traffic distribution rules based on derived metrics.

3. The apparatus of claim 2, wherein, to determine the NAN utilization threshold, the processor circuitry is to:
group the set of NANs into one or more NAN subsets based on an estimated backhaul delay of each NAN;
sort the one or more NAN subsets according to the estimated backhaul delay of each NAN subset; and
construct a set of UEs with traffic to send.

4. The apparatus of claim 3, wherein, for a current NAN subset of the one or more NAN subsets, the processor circuitry is to:
determine whether there is traffic to be distributed within the current NAN subset;
select a UE-NAN pair, wherein the UE-NAN pair includes a UE of the set of UEs in the current NAN subset and a NAN in the current NAN subset to which the UE is attached;
assign an entire traffic volume of the UE in the UE-NAN pair to the NAN in the UE-NAN pair when the entire traffic volume would not exceed a NAN utilization threshold of the NAN in the UE-NAN pair;
when assigning the entire traffic volume to the NAN would exceed the NAN utilization threshold,
assign only a predefined portion of the traffic volume of the UE in the UE-NAN pair to the NAN in the UE-NAN pair, or
allocate an amount of the traffic volume to the NAN in the UE-NAN pair up to the NAN utilization threshold; and
update the NAN utilization threshold based on the amount of traffic volume of the UE to the NAN in the UE-NAN pair.

5. The apparatus of claim 4, wherein, to select the UE-NAN pair, the processor circuitry is to:
randomly select the UE-NAN pair from among one or more UE-NAN pairs in the current NAN subset.

6. The apparatus of claim 4, wherein, to select the UE-NAN pair, the processor circuitry is to:
select the UE-NAN pair in the current NAN subset according to a primary sorting metric, wherein the primary sorting metric includes one or more of signal quality measurements, an estimated data rate for each NAN in the current NAN subset, a utilization impact to each NAN in the current NAN subset, a resource utilization level of a UE to NAN ratio, and a load adjust sorting metric.

7. The apparatus of claim 6, wherein the processor circuitry is to:
select, based on a secondary sorting metric, the UE-NAN pair from among one or more UE-NAN pairs in the current NAN subset having a same primary sorting metric, wherein the secondary sorting metric is one or more of a utilization impact, a utilization margin before assignment, and a utilization margin after assignment.

8. The apparatus of claim 6, wherein the processor circuitry is to:
recalculate the traffic distribution rules on a periodic basis; or
recalculate the traffic distribution rules in response to a trigger, wherein the trigger is one or both of detection of a predefined change in resource utilization level of a UE attached to a NAN and detection of a predefined change in the primary sorting metric.

9. The apparatus of claim 3, wherein, to determine the NAN utilization threshold for each NAN, the processor circuitry is to:
solve a delay optimization problem for the NAN utilization threshold of low-latency NAN subsets of the one or more NAN subsets such that latency introduced by queueing incoming traffic at low-latency NANs in the low-latency NAN subsets exceeds a delay difference between the low-latency NANs and high-latency NANs in high-latency NAN subsets of the one or more NAN subsets.

10. The apparatus of claim 9, wherein, to solve the delay optimization problem, the processor circuitry is to:
solve a first optimization objective, including minimizing a maximal average per file delay of the low-latency NANs and the high-latency NANs; and
solve a second optimization objective, including minimizing an average per file delay of both the low-latency NANs and the high-latency NANs.

11. The apparatus of claim 3, wherein, to determine the NAN utilization threshold for each NAN, the processor circuitry is to:
receive, from individual UEs of the set of UEs, a notification that a one-way delay (OWD) condition has been met at the individual UEs;
determine NAN utilization levels based on the received operational parameters or based on other NAN utilization levels derived from monitoring traffic flows;
generate a lookup table, including a mapping of each OWD condition to respective NAN utilization levels; and
determine the NAN utilization thresholds using the generated lookup table.

12. The apparatus of claim 11, wherein the processor circuitry is to:
generate an OWD configuration for individual UEs in the set of UEs, wherein the OWD configuration includes instructions for when and how to collect OWD measurements, a number of packets to be sent with timestamps for OWD measurements, and OWD trigger conditions, including one or more OWD conditions that trigger reporting of measured OWD; and
send, via the interface circuitry, the OWD configuration to the individual UEs.

13. The apparatus of claim 1, wherein:
the apparatus is implemented by an edge computing server or a cluster of edge computing servers;
the plurality of RATs includes a 3GPP Long Term Evolution RAT, a 3GPP Fifth Generation RAT, a Wireless Local Area Network (WLAN) RAT, a non-3GPP cellular communication RAT, and a personal area network (PAN) RAT; and
the set of NANs includes one or more evolved NodeBs, one or more next-generation NodeBs, one or more WLAN access points, one or more non-3GPP cellular base stations, and one or more PAN beacons.

14. One or more non-transitory computer-readable media (NTCRM) comprising instructions for operating a traffic distributor for multi-Radio Access Technology (RAT) traffic management, wherein execution of the instruction by one or more processors is to cause a compute node to:
collect operational parameters of one or more user equipment (UEs) capable communicating using a plurality of RATs that are different from one another, wherein the operational parameters include respective quality of service (QoS) parameters of respective UEs of the one or more UEs;
explicitly model a network delay using a queueing theory model;
estimate an average network delay using the explicitly modeled network delay based on the collected operational parameters;
minimize the average network delay:
collect one or more parameters related to delay or utilization of a RAT of the plurality of RATs;
determine respective traffic steering instructions for respective UEs of the one or more UEs based on: (A) the collected operational parameters, and (B) the one or more parameters related to delay or utilization of the RAT, and (C) the average network delay, the respective traffic steering instructions indicating whether a corresponding UE should steer network traffic toward an individual RAT of the plurality of RATs or split traffic among multiple RATs of the plurality of RATs; and
send the respective traffic steering instructions to the corresponding UEs.

15. The one or more NTCRM of claim 14, wherein execution of the instructions is to cause the compute node to:
send a request to a set of network access nodes (NANs) for the operational parameters of the one or more UEs, wherein each NAN of the set of NANs implements at least one RAT of the plurality of RATs; and
receive the operational parameters from the set of NANs.

16. The one or more NTCRM of claim 15, wherein:
the compute node is an edge computing server or a cluster of edge computing servers;
the plurality of RATs includes a 3GPP Long Term Evolution RAT, a 3GPP Fifth Generation RAT, a Wireless Local Area Network (WLAN) RAT, a non-3GPP cellular communication RAT, and a personal area network (PAN) RAT; and
the set of NANs includes one or more evolved NodeBs, one or more next-generation NodeBs, one or more WLAN access points, one or more non-3GPP cellular base stations, and one or more PAN beacons.

17. The one or more NTCRM of claim 15, wherein execution of the instructions is to cause the compute node to:

implicitly model a network delay, including:
  estimate a resource utilization level for each RAT based on the collected operational parameters; and
  equalize the estimated resource utilization level across each RAT.

18. The one or more NTCRM of claim 14, wherein execution of the instructions is to cause the compute node to:
  determine a traffic-splitting ratio for each UE such that a minimum number of UEs among the one or more UEs split traffic among the plurality of RATs; and
  generate the traffic-steering instructions to include the traffic-splitting ratio for a corresponding UE.

19. The one or more NTCRM of claim 18, wherein execution of the instructions is to cause the compute node to:
  determine the traffic-splitting ratios for individual UEs of the one or more UEs that contribute to one or more of:
  a threshold amount of backhaul delay per RAT,
  a threshold amount of utilization per RAT,
  a threshold amount to RAT utilization levels, and
  a threshold amount to an average delay.

20. The one or more NTCRM of claim 18, wherein execution of the instructions is to cause the compute node to:
  determine the traffic-splitting ratio for each UE based on one or both of a UE utilization per RAT of respective UEs and a UE physical layer (PHY) data rate per RAT for the respective UEs.

21. The one or more NTCRM of claim 20, wherein execution of the instructions is to cause the compute node to:
  determine a common RAT set (CRS) for each UE based on the determined traffic-splitting ratios for each UE, each CRS including a subset of NANs of the set of NANs that operate according to one or more RATs of the plurality of RATs; and
  select, for each UE in a CRS, one or more RATs in the CRS to use.

22. The one or more NTCRM of claim 20, wherein the collected operational parameters for each UE include the UE PHY data rate per RAT, and execution of the instructions is to cause the compute node to:
  determine the UE utilization for each UE based on a ratio of a total traffic volume of each UE for each RAT to the UE PHY data rate of each RAT; and
  determine a traffic-splitting ratio for each UE by solving a convex optimization problem.

23. The one or more NTCRM of claim 14, wherein execution of the instructions is to cause the compute node to:
  equalize a delay across each RAT for each UE based on a UE delay per RAT of each UE; and
  operate a heuristic algorithm to gradually steer traffic from high-latency RATs of the plurality of RATs to low-latency RATs of the plurality of RATs, wherein the high-latency RATs and the low-latency RATs are determined based on the equalized delay across each RAT.

24. The one or more NTCRM of claim 23, wherein the UE delay per RAT is based on one-way delay (OWD) measurements between each UE and each RAT, as measured by each UE, and wherein execution of the instructions is to cause the compute node to:
  generate the respective traffic-steering instructions for each UE to include a traffic-adjustment factor and an indication indicating that each UE is to adjust a traffic-distribution rule based on its OWD measurements and the traffic-adjustment factor.

* * * * *